(12) United States Patent
Xing et al.

(10) Patent No.: US 11,265,903 B2
(45) Date of Patent: Mar. 1, 2022

(54) UPLINK TRANSMISSION METHOD AND APPARATUS

(71) Applicant: HUAWEI TECHNOLOGIES CO., LTD., Shenzhen (CN)

(72) Inventors: Shuangshuang Xing, Shanghai (CN); Lei Wang, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 16/938,587

(22) Filed: Jul. 24, 2020

(65) Prior Publication Data

US 2020/0359402 A1 Nov. 12, 2020

Related U.S. Application Data

(63) Continuation of application No. PCT/CN2019/073522, filed on Jan. 28, 2019.

(30) Foreign Application Priority Data

Jan. 27, 2018 (CN) .......................... 201810080499.X

(51) Int. Cl.
*H04W 72/12* (2009.01)
*H04L 5/00* (2006.01)
*H04W 72/04* (2009.01)

(52) U.S. Cl.
CPC .......... *H04W 72/1284* (2013.01); *H04L 5/005* (2013.01); *H04W 72/0413* (2013.01);
(Continued)

(58) Field of Classification Search
CPC ......... H04W 72/1284; H04W 72/0453; H04W 72/04; H04W 72/0446; H04W 72/0413;
(Continued)

(56) References Cited

U.S. PATENT DOCUMENTS 11,025,384 B2 * 6/2021 Manolakos ........... H04L 5/0051
2013/0242882 A1 * 9/2013 Blankenship ......... H04L 5/0041
370/329
(Continued)

FOREIGN PATENT DOCUMENTS

CN 106453182 A 2/2017
CN 106559844 A 4/2017
(Continued)

OTHER PUBLICATIONS

ASUSTeK, Multiplexing of UL eMBB and URLLC in NR. 3GPP TSG RAN WG1 Meeting AH 1801, Vancouver, Canada, Jan. 22-26, 2018, R1-1800218, 3 pages.
(Continued)

*Primary Examiner* — Brian D Nguyen
(74) *Attorney, Agent, or Firm* — Hauptman Ham, LLP

(57) ABSTRACT

An uplink transmission method includes obtaining control information useable for uplink transmission with dynamic scheduling, determining based on information about a first time-frequency resource allocated to the uplink transmission and configuration information of a first reference signal useable for the uplink transmission, a second time-frequency resource useable to send the first reference signal, obtaining first information of a semi-statically configured resource useable for the uplink transmission, and in response to performing the uplink transmission based on the control information, sending, by the communications apparatus on an overlapping time-frequency resource of a second time-frequency resource and a third time-frequency resource, a reference signal generated based on configuration information of a second reference signal or failing to send a signal. The control information includes information about the first time-frequency resource allocated to the uplink transmission
(Continued)

and configuration information of the first reference signal useable for the uplink transmission.

20 Claims, 32 Drawing Sheets

(52) U.S. Cl.
CPC ... *H04W 72/0446* (2013.01); *H04W 72/0453* (2013.01); *H04W 72/1268* (2013.01)

(58) Field of Classification Search
CPC ....... H04L 5/0094; H04L 5/003; H04L 5/005; H04L 5/0051; H04L 5/0073
See application file for complete search history.

(56) References Cited

U.S. PATENT DOCUMENTS

| | | | |
|---|---|---|---|
| 2017/0353342 A1 | 12/2017 | Baskaran et al. | |
| 2017/0359807 A1 | 12/2017 | Hong et al. | |
| 2018/0098225 A1* | 4/2018 | Damnjanovic | H04W 16/14 |
| 2018/0109297 A1* | 4/2018 | Furuskog | H04B 7/0417 |
| 2018/0338254 A1* | 11/2018 | Ho | H04B 7/0695 |
| 2019/0260549 A1* | 8/2019 | McCoy | H04L 5/0051 |
| 2021/0068138 A1* | 3/2021 | Baldemair | H04W 72/0413 |

FOREIGN PATENT DOCUMENTS

| | | |
|---|---|---|
| CN | 107637006 A | 1/2018 |
| WO | 2017195702 A1 | 11/2017 |
| WO | 2018004246 A1 | 1/2018 |

OTHER PUBLICATIONS

Huawei, HiSilicon, Discussion on UL multiplexing of URLLC and eMBB. 3GPP TSG RAN WG1 Ad Hoc Meeting, Vancouver, Canada, Jan. 22-26, 2018, R1-1800057, 8 pages.
Institute for Information Industry (III), Considerations for UCI for URLLC. 3GPP TSG RAN WG1 Meeting 91, Reno, USA, Nov. 27 Dec. 1, 2017, R1-1720840, 4 pages.
LG Electronics, Discussion on eMBB and URLLC multiplexing for uplink. 3GPP TSG RAN WG1 Meeting #90, Prague, Czech Republic Aug. 21-25, 2017, R1-1713199, 3 pages.
Huawei, HiSilicon, Discussion on UL multiplexing of grant-based eMBB and grant-free URLLC. 3GPP TSG RAN WG1 Meeting #90, Prague, Czech Republic, Aug. 21-25, 2017, R1-1712218, 6 pages.
Intel Corporation, eMBB/URLLC multiplexing for UL. 3GPP TSG RAN1 WG Meeting #88bis, Spokane, USA Apr. 3-7, 2017, R1-1704764, 6 pages.
Intel Corporation, Uplink Multiplexing of eMBB and URLLC Transmissions. 3GPP TSG RAN WG1 NR Ad-Hoc Meeting, Spokane, USA, Jan. 16-20, 2017, R1-1700377, 8 pages.
European Search Report issued in corresponding European Patent Application No. 19743247.9, dated Dec. 11, 2020, pp. 1-12, European Patent Office, Munich, Germany.
Qualcomm Incorporated, UL data transmission procedures. 3GPP TSG RAN WG1 Meeting 90bis, Prague, CZ, Oct. 9-13, 2017, R1-1718571, 8 pages.
ZTE, ZTE Microelectronics, eMBB/URLLC multiplexing for uplink. 3GPP TSG RAN WG1 Meeting #88bis, Spokane, USA Apr. 3-7, 2017, R1-1704427, 4 pages.
Chinese Office Action issued in corresponding Chinese Application No. 201810080499.X dated Nov. 23, 2020, pp. 1-5.
3GPP TS 38.212 V15.0.0 (Dec. 2017);3rd Generation Partnership Project;Technical Specification Group Radio Access Network;NR;Multiplexing and channel coding(Release 15);total 82 pages.
Vivo,"On UL data transmission procedure",3GPP TSG RAN WG1 Meeting 91 R1-1719796,Reno, USA, Nov. 27 Dec. 1, 2017,total 12 pages.
Vivo,"Remaining issues on multiplexing data with different transmission durations",3GPP TSG RAN WG1 Meeting 91 R1-1719798,Reno, USA, Nov. 27 Dec. 1, 2017,total 11 pages.
ASUSTeK,"Multiplexing of UL eMBB and URLLC in NR",3GPP TSG RAN WG1 Meeting 91 R1-1719961,Reno, USA, Nov. 27 Dec. 1, 2017,total 3 pages.
Intel Corporation,"Remaining details of multiplexing of different data channel durations",3GPP TSG RAN WG1 Meeting 91 R1-1720099,Reno, USA, Nov. 27 Dec. 1, 2017,total 8 pages.
Qualcomm Incorporated,"URLLC DL pre-emption and UL suspension indication channel design",3GPP TSG-RAN WG1 #91 R1-1720692,Nov. 27 Dec. 1, 2017,total 10 pages.
International Search Report issued in corresponding International Application No. PCT/CN2019/073522, dated Mar. 22, 2019, pp. 1-9, State Intellectual Property Office of the P.R. China, Beijing, China.

* cited by examiner represents a first time-frequency resource represents a third time-frequency resource represents a reference signal in the third time-frequency resource represents a reference signal generated based on configuration information of a first reference signal represents a first time-frequency resource
represents a third time-frequency resource
represents a reference signal and a first reference signal simultaneously exist in the third time-frequency resource

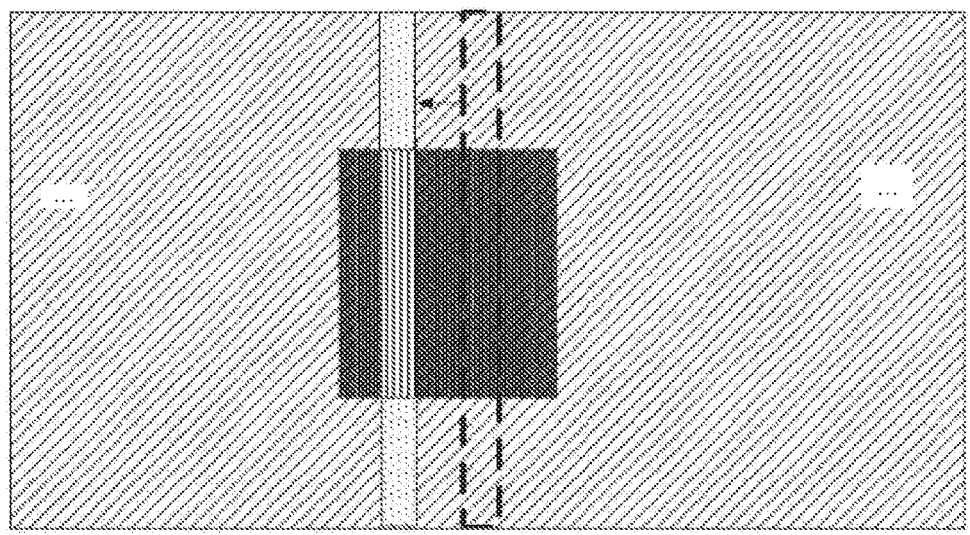

represents a first time-frequency resource represents a third time-frequency resource represents a location at which a reference signal associated with the third time-frequency resource is located represents a located at which a reference signal generated based on configuration information of a first reference signal is located after mapping represents an original location at which the reference signal generated based on the configuration information of the first reference signal is located

FIG. 27

UPLINK TRANSMISSION METHOD AND APPARATUS

CROSS-REFERENCE TO RELATED APPLICATIONS

This application is a continuation of International Application No. PCT/CN2019/073522, filed on Jan. 28, 2019, which claims priority to Chinese Patent Application No. 201810080499.X, filed on Jan. 27, 2018, The disclosures of the aforementioned applications are hereby incorporated by reference in their entireties.

TECHNICAL FIELD

This application relates to the field of communications technologies, and in particular, to an uplink transmission method and an apparatus.

BACKGROUND

In a fifth generation (the fifth generation, 5G) mobile communications system, an enhanced mobile broadband (enhanced mobile broadband, eMBB) service has features of a high data rate and high density, and a main application scenario includes big data transmission such as high-definition video transmission. An ultra-reliable and low latency communications (ultra-reliable and low latency communications, URLLC) service has features of a sporadic service and a relatively small data packet, and main application scenarios include self-driving, remote control, and the like. The two services have different latency and reliability requirements. Compared with the eMBB service, the URLLC service requires a low latency and high reliability.

5G transmission supports a plurality of numerologies. The eMBB service may use a numerology with a small subcarrier spacing and a long slot, for example, the subcarrier spacing is 15 KHz, and a corresponding slot is 1 ms. To meet a low latency requirement of URLLC, the URLLC service may use a numerology with a large subcarrier spacing and a short slot, for example, the subcarrier spacing is 60 KHz, and a corresponding slot is 0.125 ms. The URLLC service may further reduce a latency by using a transmission mechanism of grant-free transmission.

Different numerologies are used for the eMBB service and the URLLC service, and the eMBB service and the URLLC service need to be transmitted on different frequency band resources. When the URLLC service uses the grant-free transmission, a resource needs to be pre-configured for the URLLC service. Because the URLLC service has the features of the sporadic service and the relatively small data packet, resource utilization of a frequency band resource corresponding to the URLLC service is extremely low.

Currently, during downlink transmission, to improve system resource utilization, multiplex transmission of the eMBB service and the URLLC service on a shared downlink resource is supported. To be specific, a base station usually does not reserve a resource for the downlink transmission of the URLLC service. When a downlink URLLC service arrives, the base station may directly occupy a resource allocated to the eMBB service, to transmit the URLLC service. The base station notifies, by using a pre-emption indication (pre-emption indication, PI), user equipment (user equipment, UE) having the eMBB service of a resource occupied by the URLLC service and a retransmission location of an interrupted eMBB service.

To implement multiplex transmission of the eMBB service and the URLLC service on a shared resource during uplink transmission, a dynamic resource sharing manner in which the PI is used for notification during the downlink transmission may be applied to multiplex transmission of an uplink eMBB service and an uplink URLLC service on a shared resource.

However, indicating the occupied resource of the eMBB service by using the PI requires that the URLLC service is also transmitted based on uplink grant. In the process, both an SR for requesting a transmission resource by the UE from the base station and the UL grant delivered by the base station may increase the latency of the URLLC service. When the URLLC service uses uplink grant-free transmission, the base station cannot obtain information about the resource occupied by the URLLC service in advance, and cannot notify, by using the PI, the occupied resource of the eMBB service. Therefore, during the uplink transmission, how to implement the multiplex transmission of the eMBB service and the URLLC service on the shared resource is a technical problem that urgently needs to be resolved in a future communications system.

SUMMARY

This application provides an uplink transmission method and an apparatus, to improve utilization of an uplink resource.

To achieve the foregoing objective, this application uses the following technical solutions.

According to a first aspect, this application provides an uplink transmission method, applied to uplink transmission of a communications apparatus. The method includes: obtaining, by the communications apparatus, control information used for uplink transmission with dynamic scheduling, where the control information includes information about a first time-frequency resource allocated to the uplink transmission and configuration information of a first reference signal used for the uplink transmission; determining, by the communications apparatus based on the information about the first time-frequency resource allocated to the uplink transmission and the configuration information of the first reference signal used for the uplink transmission, a second time-frequency resource used to send the first reference signal; obtaining, by the communications apparatus, first information of a semi-statically configured resource used for the uplink transmission, where the resource includes a time-frequency resource; and when performing the uplink transmission based on the control information, sending, by the communications apparatus on an overlapping time-frequency resource of the second time-frequency resource and a third time-frequency resource, no signal or a reference signal generated based on configuration information of a second reference signal, where the third time-frequency resource is a semi-statically configured time-frequency resource that is used for the uplink transmission and that is determined by the communications apparatus based on the first information.

This embodiment of this application provides an uplink transmission method. The first time-frequency resource and the second time-frequency resource are determined based on the control information, and when the uplink transmission is performed based on the control information, no signal or the reference signal generated based on the configuration information of the second reference signal is sent on the overlapping time-frequency resource of the second time-frequency resource and the third time-frequency resource. In this way, in an uplink transmission process, no signal or the reference signal generated based on the configuration information of the second reference signal may be sent on the overlapping time-frequency resource that is of the second time-frequency resource and the third time-frequency resource and that is in the first time-frequency resource. In this way, uplink transmission performed on the first time-frequency resource and uplink transmission performed on the third time-frequency resource may multiplex the third time-frequency resource, thereby improving frequency band resource utilization of the uplink resource.

With reference to the first aspect, in a first possible implementation of the first aspect, the method provided in this application includes: sending, by the communications apparatus on a fourth time-frequency resource in the second time-frequency resource, a reference signal generated based on the configuration information of the first reference signal, where there is no intersection set between a frequency resource of the fourth time-frequency resource and a frequency resource of the overlapping time-frequency resource, and a union set of the frequency resource of the fourth time-frequency resource and the frequency resource of the overlapping time-frequency resource is a frequency resource of the second time-frequency resource.

With reference to the first aspect or the first possible implementation of the first aspect, in a second possible implementation of the first aspect, an intersection set between the overlapping time-frequency resource and a time-frequency resource that is in the third time-frequency resource and that is used to send the reference signal is an empty set; and correspondingly, when performing the uplink transmission based on the control information, the communications apparatus sends no signal on the overlapping time-frequency resource.

With reference to any one of the first aspect to the second possible implementation of the first aspect, in a third possible implementation of the first aspect, the method provided in this application further includes: when skipping sending a semi-statically configured reference signal on the time-frequency resource that is in the third time-frequency resource and that is used to send the reference signal, and when performing the uplink transmission based on the control information, sending, by the communications apparatus on a time-frequency resource that is in the first time-frequency resource and that overlaps the time-frequency resource that is in the third time-frequency resource and that is used to send the reference signal, the reference signal generated based on the configuration information of the second reference signal, where the semi-statically configured reference signal is a reference signal used for third time-frequency resource transmission.

With reference to any one of the first aspect to the third possible implementation of the first aspect, in a fourth possible implementation of the first aspect, the method provided in this application further includes: when sending the semi-statically configured reference signal on the time-frequency resource that is in the third time-frequency resource and that is used to send the reference signal, and when performing the uplink transmission based on the control information, sending, by the communications apparatus, no signal on the time-frequency resource that is in the first time-frequency resource and that overlaps the time-frequency resource that is in the third time-frequency resource and that is used to send the reference signal.

With reference to any one of the first aspect to the fourth possible implementation of the first aspect, in a fifth possible implementation of the first aspect, the overlapping time-frequency resource includes some or all time-frequency resources that are in the third time-frequency resource and that are used to send the reference signal; and correspondingly, when performing the uplink transmission based on the control information, the communications apparatus sends, on the overlapping time-frequency resource, the reference signal generated based on the configuration information of the second reference signal.

With reference to any one of the first aspect to the fifth possible implementation of the first aspect, in a sixth possible implementation of the first aspect, the method provided in this application further includes: sending, by the communications apparatus, no signal on a time-frequency resource in a fifth time-frequency resource, other than the overlapping time-frequency resource, where a frequency resource of the fifth time-frequency resource is the same as a frequency resource of the overlapping time-frequency resource, and a time domain resource of the fifth time-frequency resource is the same as a time domain resource of the second time-frequency resource.

With reference to any one of the first aspect to the sixth possible implementation of the first aspect, in a seventh possible implementation of the first aspect, the method provided in this application further includes: when performing the uplink transmission based on the control information, sending, by the communications apparatus, no signal on a sixth time-frequency resource in the first time-frequency resource, where the sixth time-frequency resource is a time-frequency resource that is in the first time-frequency resource and that does not overlap the overlapping time-frequency resource but overlaps the time-frequency resource that is in the third time-frequency resource and that is used to send the reference signal.

With reference to any one of the first aspect to the seventh possible implementation of the first aspect, in an eighth possible implementation of the first aspect, when performing the uplink transmission based on the control information, the communications apparatus performs the uplink transmission on the overlapping time-frequency resource by using a configuration parameter numerology corresponding to the third time-frequency resource.

With reference to any one of the first aspect to the eighth possible implementation of the first aspect, in a ninth possible implementation of the first aspect, the method provided in this application further includes: performing, by the communications apparatus by using a non-orthogonal transmission technology, the uplink transmission on an overlapping time-frequency resource of a time-frequency resource in the first time-frequency resource, other than the second time-frequency resource and a time-frequency resource in the third time-frequency resource, other than the time-frequency resource used to send the reference signal.

With reference to any one of the first aspect to the ninth possible implementation of the first aspect, in a tenth possible implementation of the first aspect, the method provided in this application further includes: on the overlapping time-frequency resource of the first time-frequency resource and the third time-frequency resource, sending, by the communications apparatus by using a frequency resource corresponding to the first time-frequency resource, uplink data and/or the reference signal to be sent on a frequency resource corresponding to the third time-frequency resource.

With reference to any one of the first aspect to the tenth possible implementation of the first aspect, in an eleventh possible implementation of the first aspect, when an intersection set between the third time-frequency resource and the first time-frequency resource is not an empty set, and an intersection set between the third time-frequency resource and the second time-frequency resource is an empty set, and when performing the uplink transmission based on the control information, sending, by the communications apparatus on the overlapping time-frequency resource of the time-frequency resource that is in the third time-frequency resource and that is used to send the reference signal and the first time-frequency resource, no signal or the reference signal generated based on the configuration information of the second reference signal.

According to a second aspect, this application provides an uplink transmission method. The method includes: obtaining, by a communications apparatus, control information used for uplink transmission with dynamic scheduling, where the control information includes configuration information of a first time-frequency resource used for the uplink transmission; obtaining, by the communications apparatus, configuration information of a semi-statically configured resource used for the uplink transmission, where the configuration information of the resource includes configuration information of a second time-frequency resource used for the uplink transmission; and when sending uplink data based on the configuration information of the resource, sending the uplink data on an overlapping time domain resource of the second time-frequency resource and the first time-frequency resource by using a frequency domain resource corresponding to the first time-frequency resource.

With reference to the second aspect, in a first possible implementation of the second aspect, the method provided in this application includes: when performing the uplink transmission based on the control information, interrupting, by the communications apparatus on the overlapping time domain resource of the second time-frequency resource and the first time-frequency resource, the uplink transmission performed based on the control information.

With reference to the second aspect or the first possible implementation of the second aspect, in a second possible implementation of the second aspect, the method provided in this application includes: sending, on a time-frequency resource in the second time-frequency resource, other than the overlapping time domain resource, the uplink data based on the configuration information of the resource.

Correspondingly, according to a third aspect, this application provides a communications apparatus. The communications apparatus may implement the uplink transmission method described in any one of the first aspect to the eleventh possible implementation of the first aspect. For example, the communications apparatus may be a terminal device, or may be a chip disposed in the terminal device. The communications apparatus may implement the foregoing method by using software, hardware, or hardware executing corresponding software.

The communications apparatus is applied to uplink transmission of the communications apparatus, and includes: an obtaining unit, configured to obtain control information used for uplink transmission with dynamic scheduling, where the control information includes information about a first time-frequency resource allocated to the uplink transmission and configuration information of a first reference signal used for the uplink transmission; a determining unit, configured to determine, based on the information about the first time-frequency resource allocated to the uplink transmission and the configuration information of the first reference signal used for the uplink transmission, a second time-frequency resource used to send the first reference signal; the obtaining unit, further configured to obtain first information of a semi-statically configured resource used for the uplink transmission, where the resource includes a time-frequency resource; and a sending unit, configured to: when performing the uplink transmission based on the control information, send, on an overlapping time-frequency resource of the second time-frequency resource and a third time-frequency resource, no signal or a reference signal generated based on configuration information of a second reference signal, where the third time-frequency resource is a semi-statically configured time-frequency resource that is used for the uplink transmission and that is determined by the communications apparatus based on the first information.

With reference to the third aspect, in a first possible implementation of the third aspect, the sending unit is further configured to send, on a fourth time-frequency resource in the second time-frequency resource, a reference signal generated based on the configuration information of the first reference signal, where there is no intersection set between a frequency resource of the fourth time-frequency resource and a frequency resource of the overlapping time-frequency resource, and a union set of the frequency resource of the fourth time-frequency resource and the frequency resource of the overlapping time-frequency resource is a frequency resource of the second time-frequency resource.

With reference to the third aspect or the first possible implementation of the third aspect, in a second possible implementation of the third aspect, an intersection set between the overlapping time-frequency resource and a time-frequency resource that is in the third time-frequency resource and that is used to send the reference signal is an empty set; and correspondingly, the sending unit is further configured to: when performing the uplink transmission based on the control information, send no signal on the overlapping time-frequency resource.

With reference to any one of the third aspect to the second possible implementation of the third aspect, in a third possible implementation of the third aspect, when skipping sending a semi-statically configured reference signal on the time-frequency resource that is in the third time-frequency resource and that is used to send the reference signal, the sending unit is further configured to: when performing the uplink transmission based on the control information, send, on a time-frequency resource that is in the first time-frequency resource and that overlaps the time-frequency resource that is in the third time-frequency resource and that is used to send the reference signal, the reference signal generated based on the configuration information of the second reference signal, where the semi-statically configured reference signal is a reference signal used for third time-frequency resource transmission.

With reference to any one of the third aspect to the third possible implementation of the third aspect, in a fourth possible implementation of the third aspect, when sending the semi-statically configured reference signal on the time-frequency resource that is in the third time-frequency resource and that is used to send the reference signal, the sending unit is further configured to: when performing the uplink transmission based on the control information, send no signal on the time-frequency resource that is in the first time-frequency resource and that overlaps the time-frequency resource that is in the third time-frequency resource and that is used to send the reference signal.

With reference to any one of the third aspect to the fourth possible implementation of the third aspect, in a fifth possible implementation of the third aspect, the overlapping time-frequency resource includes some or all time-frequency resources that are in the third time-frequency resource and that are used to send the reference signal; and correspondingly, the sending unit is specifically configured to: when performing the uplink transmission based on the control information, send, on the overlapping time-frequency resource, the reference signal generated based on the configuration information of the second reference signal.

With reference to any one of the third aspect to the fifth possible implementation of the third aspect, in a sixth possible implementation of the third aspect, the sending unit is further configured to send no signal on a time-frequency resource in a fifth time-frequency resource, other than the overlapping time-frequency resource, where a frequency domain resource of the fifth time-frequency resource is the same as a frequency domain resource of the overlapping time-frequency resource, and a time domain resource of the fifth time-frequency resource is the same as a time domain resource of the second time-frequency resource.

With reference to any one of the third aspect to the sixth possible implementation of the third aspect, in a seventh possible implementation of the third aspect, the sending unit is further configured to: when performing the uplink transmission based on the control information, send no signal on a sixth time-frequency resource in the first time-frequency resource, where the sixth time-frequency resource is a time-frequency resource that is in the first time-frequency resource and that does not overlap the overlapping time-frequency resource but overlaps the time-frequency resource that is in the third time-frequency resource and that is used to send the reference signal.

With reference to any one of the third aspect to the seventh possible implementation of the third aspect, in an eighth possible implementation of the third aspect, the sending unit is further configured to: when performing the uplink transmission based on the control information, perform the uplink transmission on the overlapping time-frequency resource by using a configuration parameter numerology corresponding to the third time-frequency resource.

With reference to any one of the third aspect to the eighth possible implementation of the third aspect, in a ninth possible implementation of the third aspect, the sending unit is specifically configured to perform, by using a non-orthogonal transmission technology, the uplink transmission on an overlapping time-frequency resource of a time-frequency resource in the first time-frequency resource, other than the second time-frequency resource and a time-frequency resource in the third time-frequency resource, other than the time-frequency resource used to send the reference signal.

With reference to any one of the third aspect to the ninth possible implementation of the third aspect, in a tenth possible implementation of the third aspect, on the overlapping time-frequency resource of the first time-frequency resource and the third time-frequency resource, the sending unit is further configured to send, by using a frequency resource corresponding to the first time-frequency resource, uplink data and/or the reference signal to be sent on a frequency resource corresponding to the third time-frequency resource.

With reference to any one of the third aspect to the tenth possible implementation of the third aspect, in an eleventh possible implementation of the third aspect, when an intersection set between the third time-frequency resource and the first time-frequency resource is not an empty set, and an intersection set between the third time-frequency resource and the second time-frequency resource is an empty set, and when performing the uplink transmission based on the control information, the sending unit sends, on the overlapping time-frequency resource of the time-frequency resource that is in the third time-frequency resource and that is used to send the reference signal and the first time-frequency resource, no signal or the reference signal generated based on the configuration information of the second reference signal.

In addition, this application further provides a communications apparatus. The communications apparatus includes a processor and a transmitter. The processor is configured to: obtain control information used for uplink transmission with dynamic scheduling, where the control information includes information about a first time-frequency resource allocated to the uplink transmission and configuration information of a first reference signal used for the uplink transmission; determine, based on the information about the first time-frequency resource allocated to the uplink transmission and the configuration information of the first reference signal used for the uplink transmission, a second time-frequency resource used to send the first reference signal; and obtain first information of a semi-statically configured resource used for the uplink transmission, where the resource includes a time-frequency resource. The transmitter is configured to: when performing the uplink transmission based on the control information, send, on an overlapping time-frequency resource of the second time-frequency resource and a third time-frequency resource, no signal or a reference signal generated based on configuration information of a second reference signal, where the third time-frequency resource is a semi-statically configured time-frequency resource that is used for the uplink transmission and that is determined by the communications apparatus based on the first information.

Optionally, the communications apparatus further includes a receiver. The receiver is configured to support the communications apparatus in implementing a related operation of receiving information/data on a communications apparatus side. The transmitter is further configured to support the communications apparatus in implementing the related operation of sending the information/data on the communications apparatus side described in any one of the first aspect to the eleventh possible implementation of the first aspect. The processor is further configured to perform the operation of processing the information/data on the communications apparatus side described in any one of the foregoing first aspect to the eleventh possible implementation of the first aspect. Optionally, the communications apparatus in this application further includes a bus and a memory. The memory is configured to store code and data. The processor, the receiver, the transmitter, and the memory are connected to each other by using the bus.

According to a fourth aspect, in a possible design, the communications apparatus may be a terminal device or a chip disposed in the terminal device, and the communications apparatus may include at least one processor. The at least one processor is configured to execute an instruction, to support the communications apparatus in performing the related operation of processing or controlling a message on the communications apparatus side in the method described in any one of the foregoing first aspect to the eleventh possible implementation of the first aspect. Optionally, the communications apparatus may further include a memory, configured to be coupled to the at least one processor. The memory stores a program (instruction) and data that are necessary to the communications apparatus. In addition, optionally, the communications apparatus may further include a communications interface, configured to support communication between the communications apparatus and another network element (for example, a network device). The communications interface may be a transceiver circuit. The transceiver circuit is configured to support the communications apparatus in performing related operations of receiving and sending the message on the communications apparatus side in the method described in any one of the foregoing first aspect to the eleventh possible implementation of the first aspect. Optionally, the communications apparatus may further include a bus. The memory, the communications interface, and the at least one processor may be connected to each other by using the bus.

According to a fifth aspect, this application provides a communications apparatus. The communications apparatus may implement the uplink transmission method described in any one of the second aspect to the second possible implementation of the second aspect. For example, the communications apparatus may be a terminal device, or may be a chip disposed in the terminal device. The communications apparatus may implement the foregoing method by using software, hardware, or hardware executing corresponding software.

The communications apparatus is applied to uplink transmission of the communications apparatus, and includes: an obtaining unit, configured to: obtain control information used for uplink transmission with dynamic scheduling, where the control information includes configuration information of a first time-frequency resource used for the uplink transmission, and obtain configuration information of a semi-statically configured resource used for the uplink transmission, where the configuration information of the resource includes configuration information of a second time-frequency resource used for the uplink transmission; and a sending unit, configured to: when sending uplink data based on the configuration information of the resource, send the uplink data on an overlapping time domain resource of the second time-frequency resource and the first time-frequency resource by using a frequency domain resource corresponding to the first time-frequency resource.

With reference to the fifth aspect, in a first possible implementation of the fifth aspect, a processing unit is configured to: when performing the uplink transmission based on the control information, interrupt, on the overlapping time domain resource of the second time-frequency resource and the first time-frequency resource, the uplink transmission performed based on the control information.

With reference to the fifth aspect or the first possible implementation of the fifth aspect, in a second possible implementation of the fifth aspect, the sending unit is further configured to send, on a time-frequency resource in the second time-frequency resource, other than the overlapping time-frequency resource, the uplink data based on the configuration information of the resource.

According to a sixth aspect, this application provides a computer-readable storage medium. The computer-readable storage medium stores an instruction. When the instruction is run, the uplink transmission method described in the first aspect to the eleventh possible implementation of the first aspect is performed.

According to a seventh aspect, this application provides a computer-readable storage medium. The computer-readable storage medium stores an instruction. When the instruction is executed, the uplink transmission method described in the second aspect to the second possible implementation of the second aspect is performed.

According to an eighth aspect, this application provides a computer program product including an instruction. The computer program product stores the instruction. When the instruction is run, a terminal device is enabled to perform the uplink transmission method described in any one of the foregoing first aspect to the eleventh possible implementation of the first aspect.

According to a ninth aspect, this application provides a computer program product including an instruction. The computer program product stores the instruction. When the instruction is run, a terminal device is enabled to perform the uplink transmission method described in any one of the foregoing second aspect to the second possible implementation of the second aspect.

According to a tenth aspect, this application provides a chip system, applied to a communications apparatus. The chip system includes at least one processor and an interface circuit, the interface circuit is connected to the at least one processor by using a line, and the processor is configured to run an instruction, to perform the uplink transmission method described in any one of the first aspect to the eleventh possible implementation of the first aspect.

According to an eleventh aspect, this application provides a chip system, applied to a communications apparatus. The chip system includes at least one processor and an interface circuit, the interface circuit is connected to the at least one processor by using a line, and the processor is configured to run an instruction, to perform the uplink transmission method described in any one of the second aspect to the second possible implementation of the second aspect.

Optionally, the chip system described above in this application further includes at least one memory, and the at least one memory stores the instruction.

BRIEF DESCRIPTION OF DRAWINGS

FIG. 27 is a schematic diagram 13 of distribution of a time-frequency resource according to this application;

DESCRIPTION OF EMBODIMENTS

Figure 1:
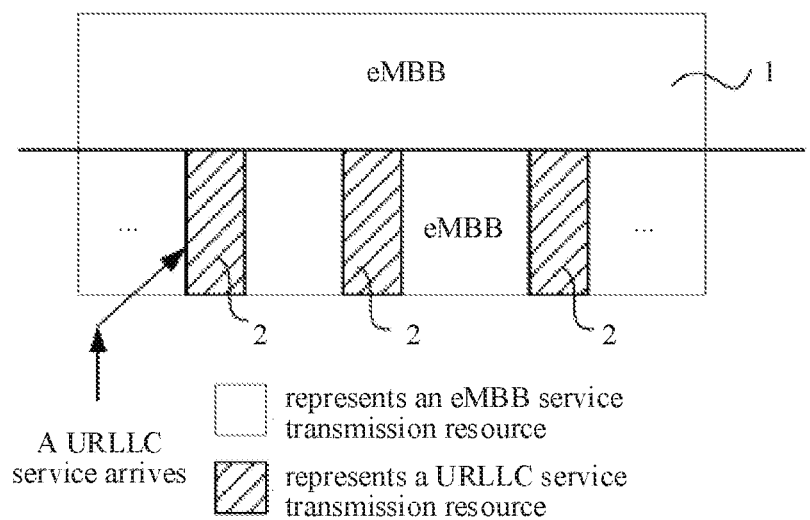
FIG. 1 is a schematic diagram of preempting a time-frequency resource of other data by URLLC service data according to the prior art.

Before this application is described, terms in this application are first explained.

A grant-free transmission (Grant-free transmission, GF transmission) mechanism is also referred to as uplink transmission without dynamic scheduling (uplink transmission without dynamic scheduling) or uplink transmission without dynamic grant (uplink transmission without dynamic grant). In the transmission mechanism, once there is uplink data needing to be sent, a terminal device sends the uplink data on a pre-configured resource without dynamic scheduling or dynamic grant of a network device.

In the GF transmission mechanism, the pre-configured resource is referred to as a GF transmission resource. There are two configuration manners of the GF transmission resource. In a first configuration manner, only radio resource control (radio resource control, RRC) signaling is used to configure the GF transmission resource and a transmission parameter for the terminal device, and the GF transmission resource is always in an active state until being deactivated or modified by another piece of RRC signaling. In a second configuration manner, both the RRC signaling and downlink control information (downlink control information, DCI) are used to configure the GF transmission resource and the transmission parameter for the terminal device. In the configuration manner, the resource configured by the RRC signaling cannot be immediately used by the terminal to transmit data, the terminal further needs to receive the DCI for activating the resource configured by the RRC signaling, and then transmission of the uplink data may be performed. The foregoing configuration manners of the GF transmission resource may also be referred to as semi-static configuration.

A grant-based transmission (Grant-based transmission, GB transmission) mechanism is also referred to as uplink transmission with dynamic scheduling (uplink transmission with dynamic scheduling) or uplink transmission with dynamic grant (uplink transmission with dynamic grant). In the GB transmission mechanism, if there is uplink data needing to be sent, the terminal device needs to wait for dynamic scheduling/dynamic grant of the network device for the uplink data, and then transmission of the uplink data is performed based on the dynamic scheduling/dynamic grant. The transmission includes initial transmission and retransmission of the uplink data.

In the GB transmission mechanism, a resource configured by the dynamic scheduling/dynamic grant is referred to as a GB transmission resource.

A grant-free service is data (a service) transmitted by using the grant-free transmission mechanism.

A grant-based service is data (a service) transmitted by using the GB transmission mechanism.

In this application, an overlapping area of the GB transmission resource and the GF transmission resource is referred to as an uplink resource multiplexing area. The uplink resource multiplexing area may be used to transmit services having different latency requirements, for example, transmit at least one of the grant-free service and the grant-based service. The GB transmission resource may completely or partially overlap the GF transmission resource. This is not limited in this application. In the uplink resource multiplexing area, the GB service and the GF service may be transmitted simultaneously, or only the GF service may be transmitted, or only the GB service may be transmitted.

Specifically, the GB transmission resource may be used to transmit a service that does not have a strict latency requirement. Alternatively, it may be understood that the GB transmission resource is used to transmit the grant-based service, for example, used to transmit an eMBB service.

Specifically, the GF transmission resource may be used to transmit at least one of a service having a relatively strict latency requirement and the service that does not have the strict latency requirement. Alternatively, it may also be understood as that the GF transmission resource is used to transmit at least one of the grant-based service and the grant-free service. For example, the GF transmission resource is used to transmit a URLLC service and the eMBB service.

It should be noted that, how to transmit the eMBB service and the URLLC service in the uplink resource multiplexing area is specifically described in the following embodiments. For details, refer to the following embodiments.

This application provides an uplink transmission method and an apparatus, applied to uplink transmission of a communications apparatus. Resource multiplexing is performed on a time-frequency resource used to transmit different types of services (for example, the grant-free service and the grant-based service, the grant-free service and the grant-based service have different latency requirements and reliability requirements, and compared with the grant-based service, the grant-free service requires a low latency). In this way, the grant-based service makes full use of an idle resource of the grant-free service, thereby improving utilization of an uplink resource in a system. The method and the apparatus are conceived based on a same invention. Because the method and the apparatus have similar principles for resolving problems, for implementation of the apparatus and the method, refer to each other. Details of repeated parts are not described.

In this application, the terms "first", "second", and the like are merely used to distinguish different objects, and are not intended to limit a sequence of the objects. For example, a first reference signal and a second reference signal are merely used to distinguish different reference signals, and are not intended to limit a sequence of the reference signals.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" or the like is intended to present a relative concept in a specific manner.

For example, as shown in FIG. 1, an example in which a grant-based service is an eMBB service and a grant-free service is a URLLC service is used. In FIG. 1, time-frequency resources corresponding to an area 1 and an area 2 are transmission resource areas of the eMBB service, and are pre-configured to a terminal device by a base station by using control signaling (for example, radio resource control (radio resource control, RRC)), so that the terminal device transmits the eMBB service in an eMBB service transmission resource area. The eMBB service transmission resource area is a GB transmission resource. For example, in FIG. 1, the resources corresponding to the area 1 and the area 2 are transmission resource areas of the URLLC service, and the base station pre-configures the transmission resources to the URLLC service. To meet a latency requirement of the URLLC service, the area 1 and the area 2 may be grant-free transmission (transmission without dynamic grant/grant-free transmission. GF transmission) resources. A URLLC service transmission resource area is also the eMBB service transmission resource area. In the URLLC service transmission resource area, the URLLC service and the eMBB service may be multiplexed for transmission.

In this application, a service supporting GB transmission may be a service that does not have a strict latency requirement, for example, the eMBB service. The service may allow a plurality of times of retransmission. A service supporting GF transmission may be a service having a relatively strict latency requirement, for example, the URLLC service. The service supporting the GB transmission and the service supporting the GF transmission have different latency requirements and reliability requirements. In the following descriptions of this application, the eMBB service is used to represent the service supporting the GB transmission, and a terminal device transmitting the eMBB service is an eMBB terminal device. The URLLC service is used to represent the service supporting the GF transmission, and a terminal device transmitting the URLLC service may be a URLLC terminal device. In a specific embodiment, a terminal device may be the eMBB terminal device, or may be the URLLC terminal. In other words, the terminal device may support both the eMBB service transmission and the URLLC service transmission.

It may be understood that services transmitted in an uplink resource multiplexing area in this application include but are not limited to the grant-based service and the grant-free service, for example, the eMBB service and the URLLC service. In other words, services transmitted in the uplink resource multiplexing area may further be another two services having different latency requirements and different reliability requirements, other than the eMBB service and the URLLC service. In addition, transmission modes of the two services transmitted in the uplink resource multiplexing area include but are not limited to a GB transmission mode and a GF transmission mode. The following embodiment is described by using an example in which the services transmitted in the uplink resource multiplexing area include the grant-based service and the grant-free service, and have no indication meaning.

The network architecture and the service scenario described in this embodiment of this application are intended to describe the technical solutions in this embodiment of this application more clearly, and do not constitute a limitation on the technical solutions provided in this embodiment of this application. A person of ordinary skill in the art may know that: With the evolution of the network architecture and the emergence of new service scenarios, the technical solutions provided in the embodiments of this application are also applicable to similar technical problems.

Figure 2:
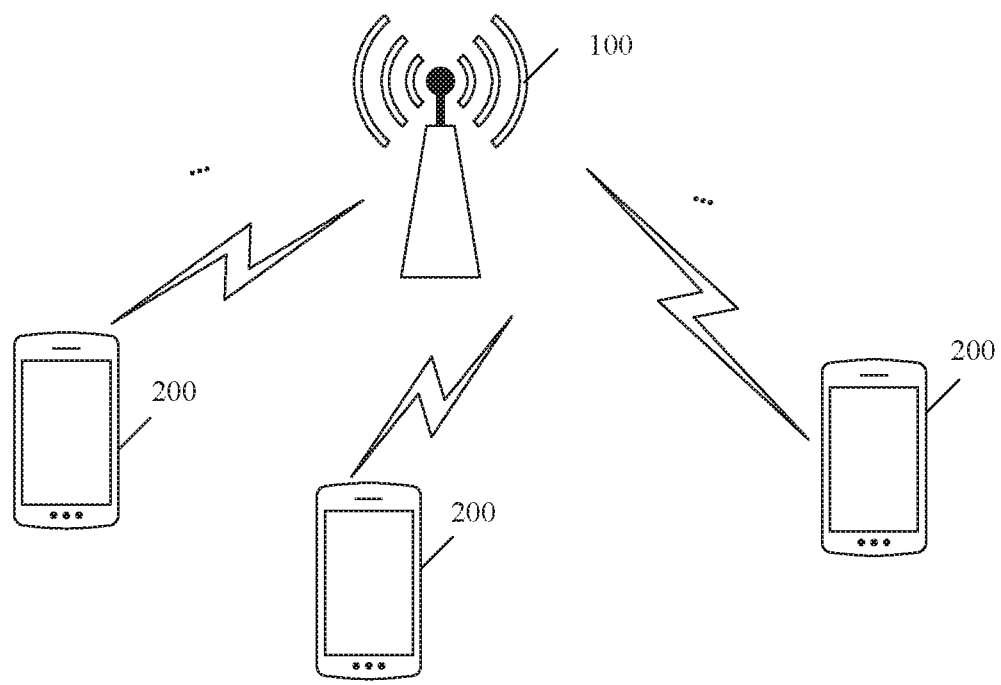
FIG. 2 is a schematic architectural diagram of a communications system according to an embodiment of the present invention.

As shown in FIG. 2, FIG. 2 is a schematic architectural diagram of a communications system according to this application. The communications system includes at least one network device 100 and at least one terminal device 200 (FIG. 2 shows only three terminal devices, and in an actual scenario, the communications system may include at least three or at most three terminal devices).

The terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (station, STA) in a wireless local area network (wireless local area networks, WLAN), and may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communications function, a computing device, another processing device connected to a wireless modem, a vehicle-mounted device, a wearable device, and a next-generation communications system, for example, a terminal device in a fifth-generation (fifth-generation, 5G) communications network, or a terminal device in a future evolved public land mobile network (public land mobile network, PLMN).

For example, in this embodiment of the present invention, the terminal device may alternatively be a wearable device. The wearable device may also be referred to as a wearable intelligent device, and is a general term for wearable devices that are developed by applying a wearable technology to perform intelligent design on daily wear, such as glasses, gloves, watches, clothes, and shoes. The wearable device is a portable device that is directly worn on a body or integrated into a cloth or an accessory of a user. The wearable device not only is a hardware device, but also implements powerful functions through software support, data interaction, and cloud interaction. Generalized wearable intelligent devices include full-featured and large-size devices that can implement complete or partial functions without depending on smartphones, such as smart watches or smart glasses, and devices that focus on only one type of an application function and that need to work with other devices such as smartphones, such as various smart bracelets or smart jewelry for monitoring physical signs.

The network device may be a device configured to communicate with a mobile device, and the network device may be an access point (access point, AP) in a WLAN, or a base transceiver station (base transceiver station, BTS) in a global system for mobile communication (global system for mobile communication, GSM) or code division multiple access (code division multiple access, CDMA), or may be a NodeB (NodeB, NB) in wideband code division multiple access (wideband code division multiple access, WCDMA), or may be an evolved NodeB (evolved Node B, eNB or eNodeB) in long term evolution (long term evolution, LTE), or a relay station or an access point, or a vehicle-mounted device, a wearable device, a network device in a future 5G network, a network device in a future evolved PLMN network, or the like.

In addition, in this embodiment of the present invention, the network device provides a service for a cell, and the terminal device communicates with the network device by using a transmission resource (for example, a frequency domain resource or a time-frequency resource) used by the cell. The cell may be a cell corresponding to the network device (for example, the base station). The cell may belong to a macro base station, or may belong to a base station corresponding to a small cell (small cell). The small cell herein may include a metro cell (metro cell), a micro cell (micro cell), a pico cell (Pico cell), a femto cell, and the like. Such small cells have features of small coverage and low transmit power, and are applicable to providing a high-rate data transmission service.

The method and the apparatus provided in this embodiment of the present invention may be applied to a terminal device. The terminal device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, in this embodiment of the present invention, a specific structure of an execution body of the uplink transmission method is not particularly limited in this embodiment of the present invention, provided that a program recording code of the uplink transmission method in the embodiments of the present invention can be run to perform communication according to the uplink transmission method in this embodiment of the present invention. For example, the execution body of the wireless communications method in this embodiment of the present invention may be a terminal device, or a function module that is in the terminal device and that can invoke and execute a program.

In addition, aspects or features in this embodiment of the present invention may be implemented as a method, an apparatus or a product that uses standard programming and/or engineering technologies. The term "product" used in this application covers a computer program that can be accessed from any computer-readable device, carrier or medium. For example, a computer-readable medium may include but is not limited to: a magnetic storage device (for example, a hard disk, a floppy disk or a magnetic tape), an optical disc (for example, a compact disc (compact disc, CD), a digital versatile disc (digital versatile disc, DVD, or the like), a smart card, and a flash memory component (for example, erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

Figure 3:
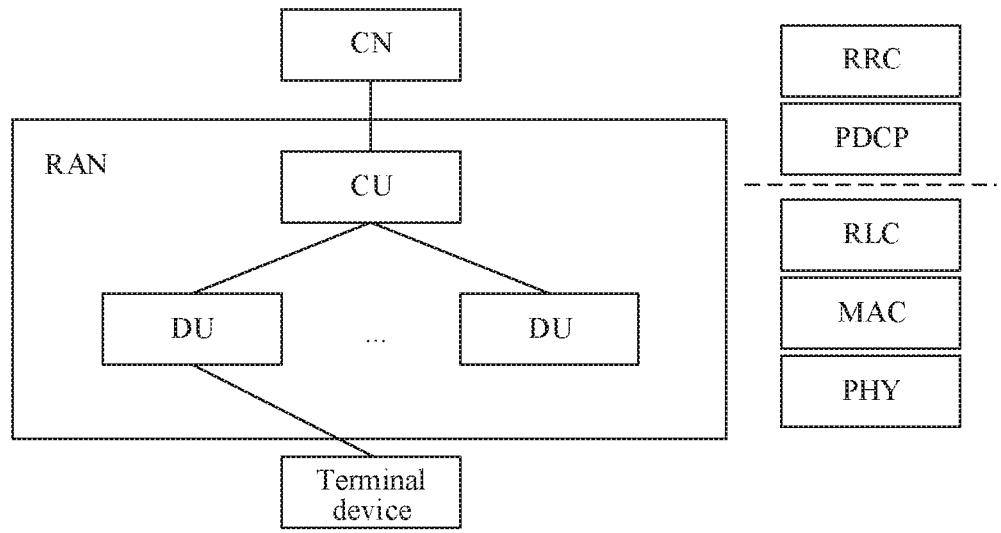
FIG. 3 is a schematic structural diagram of a base station according to this application.

Because a future access network may be implemented by using a cloud radio access network (cloud radio access network, C-RAN) architecture, in a possible manner, a protocol stack architecture and a function that are of a conventional base station are divided into two parts, one part is referred to as a centralized unit (central unit, CU), and the other part is referred to as a distributed unit (distributed unit, DU). An actual deployment manner of the CU and the DU is relatively flexible. For example, CUs of a plurality of base stations are integrated to form a relatively large-scale function entity. FIG. 3 is a schematic diagram of a network architecture according to an embodiment of this application. As shown in FIG. 3, the network architecture includes a core network (core network, CN) device and an access network (using a radio access network (radio access network, RAN) as an example) device. The RAN device includes a baseband apparatus and a radio frequency apparatus. The baseband apparatus may be implemented by one node, or may be implemented by a plurality of nodes. The radio frequency apparatus may be independently and remotely implemented from the baseband apparatus, or may be integrated into the baseband apparatus, or may be partially placed remotely from or integrated into the baseband apparatus. For example, in an LTE communications system, the RAN device (eNB) includes the baseband apparatus and the radio frequency apparatus. The radio frequency apparatus may be remotely arranged relative to the baseband apparatus (for example, a radio remote unit (radio remote unit, RRU) is remotely arranged relative to a baseband processing unit (baseband processing unit, BPU)). The RAN device is implemented by one node, and the node is used to implement functions of protocol layers such as RRC, a PDCP, RLC, and MAC. For another example, in an evolved structure, the baseband apparatus may include a centralized unit (centralized unit, CU) and a distributed unit (distributed unit, DU), and a plurality of DUs may be centrally controlled by one CU. As shown in FIG. 3, the CU and the DU may be divided based on a protocol layer of a wireless network. For example, functions of the packet data convergence protocol (packet data convergence protocol, PDCP) layer and protocol layers above the PDCP layer are set on the CU, and functions of protocol layers below the PDCP layer, such as the radio link control (radio link control, RLC) layer and the media access control (media access control, MAC) layer are set on the DU.

Division of the protocol layers is merely an example, and division may alternatively be performed at another protocol layer, for example, at the RLC layer. Functions of the RLC layer and protocol layers above the RLC layer are set on the CU, and functions of protocol layers below the RLC layer are set on the DU. Alternatively, division is performed at a protocol layer. For example, some functions of the RLC layer and the functions of the protocol layers above the RLC layer are set on the CU, and remaining functions of the RLC layer and the functions of the protocol layers below the RLC layer are set on the DU. In addition, division may alternatively be performed in another manner, for example, performed based on a latency. A function of which processing time needs to meet a latency requirement is set on the DU, and a function of which the processing time does not need to meet the latency requirement is set on the CU.

In addition, the radio frequency apparatus may not be placed in the DU and may be placed remotely from the DU, or may be integrated into the DU, or may be partially placed remotely from and partially integrated into the DU. This is not limited herein.

Figure 4:
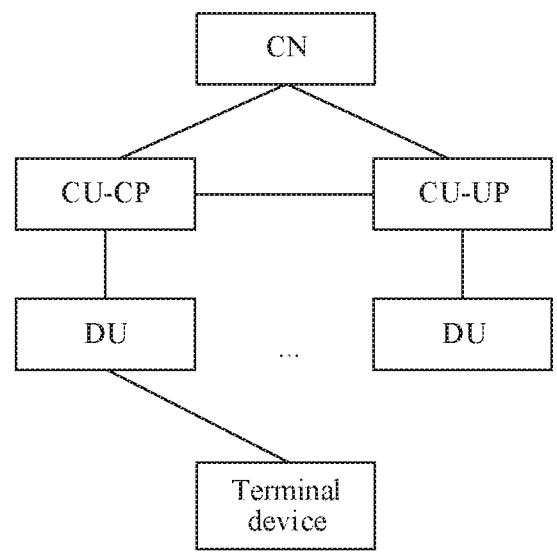
FIG. 4 is a schematic structural diagram of another base station according to this application.

In addition, continuing to refer to FIG. 4, with respect to the architecture shown in FIG. 3, a control plane and a user plane of the CU may further be separated into different entities for implementation. The different entities are respectively a control plane CU entity (a CU-CP entity), and a user plane CU entity (a CU-UP entity).

In the foregoing network architecture, signaling generated by the CU may be sent to a terminal device by using the DU, or signaling generated by the terminal device may be sent to the CU by using the DU. The DU may not parse the signaling, and directly perform encapsulation by using a protocol layer, to transparently transmit the signaling to the terminal device or the CU. In the following embodiment, if the signaling transmits between the DU and the terminal device, sending or receiving the signaling by the DU includes the scenario. For example, signaling at the RRC layer or the PDCP layer is finally processed to be signaling at a physical layer (physical layer, PHY) and sent to the terminal device. Alternatively, the signaling at the RRC layer or the PDCP layer is transferred from the received signaling at the PHY layer. In the architecture, the signaling at the RRC layer or the PDCP layer may further be considered to be sent by the DU, or sent by the DU and a radio frequency apparatus.

In the foregoing embodiment, the CU is divided into a network device in the RAN. In addition, the CU may alternatively be divided into a network device in the CN. This is not limited herein.

Figure 5:
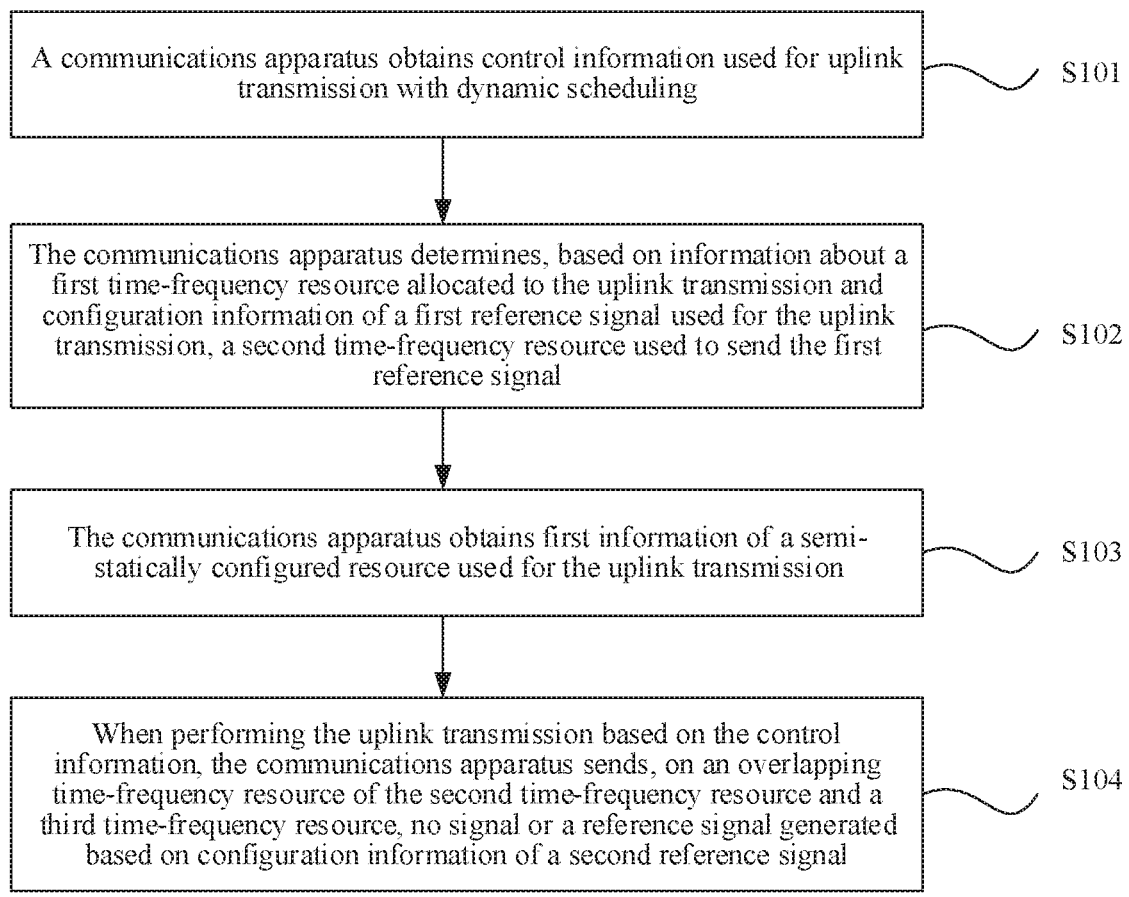
FIG. 5 is a schematic flowchart 1 of an uplink transmission method according to this application.

As shown in FIG. 5, FIG. 5 shows an uplink transmission method according to this application. The uplink transmission method includes the following steps.

S101: A communications apparatus obtains control information used for uplink transmission with dynamic scheduling (dynamic scheduling, DS), where the control information includes information about a first time-frequency resource allocated to the uplink transmission and configuration information of a first reference signal used for the uplink transmission.

The communications apparatus in this application may be the terminal device in the system architecture shown in FIG. 2, or may be a chip disposed in the terminal device. This is not limited in this application.

The dynamic scheduling in this application may mean that a network device indicates, by using downlink control information (downlink control information, DCI) based on an uplink or downlink data transmission request, a time-frequency resource and a related parameter that are required for uplink or downlink data transmission.

Specifically, the information about the first time-frequency resource in this application is used to determine a first time-frequency resource allocated to the communications apparatus, and the first time-frequency resource may also be referred to as a grant-based transmission resource. As shown in FIG. 1, the first time-frequency resource is used to transmit a grant-based (GB) service.

The GB service in this application is a data transmission service performed based on the time-frequency resource and the related transmission parameter that are indicated by the dynamic scheduling.

For example, the first time-frequency resource in this application is used to transmit an eMBB service.

Optionally, the information about the first time-frequency resource may be an identifier or location information of the first time-frequency resource. This is not limited in this application.

The configuration information of the first reference signal may be used to determine a first reference signal used for uplink transmission of the GB service, and used to determine a location of a time-frequency resource corresponding to the first reference signal in the first time-frequency resource.

Specifically, the configuration information of the first reference signal may include a type of a demodulation reference signal (demodulation reference signal, DMRS), a symbol width of the DMRS, an initial value used to calculate a sequence of the DMRS, an antenna port corresponding to the DMRS, and the like.

Optionally, before step S101, the method provided in this application further includes: sending, by the network device to the communications apparatus, the control information used for the uplink transmission with the dynamic scheduling.

S102: The communications apparatus determines, based on the information about the first time-frequency resource allocated to the uplink transmission and the configuration information of the first reference signal used for the uplink transmission, a second time-frequency resource used to send the first reference signal.

Optionally, the second time-frequency resource in this application is a time-frequency resource on which a reference signal that is generated based on the configuration information of the first reference signal and that corresponds to uplink transmission performed by the terminal device on the first time-frequency resource is located.

Specifically, step S102 in this application may be implemented in the following manner: The communications apparatus determines, based on the information about the first time-frequency resource allocated to the uplink transmission, the first time-frequency resource allocated to the uplink transmission, and determines, based on the configuration information of the first reference signal used for the uplink transmission, the second time-frequency resource that is on the first time-frequency resource and that is used to send the first reference signal.

S103: The communications apparatus obtains first information of a semi-statically configured resource used for the uplink transmission. The resource includes a time-frequency resource.

Optionally, the resource may further include a semi-statically configured time-frequency resource of a reference signal.

Specifically, in this application, the first information of the semi-statically configured resource used for the uplink transmission is used by the terminal device to determine a location of a third time-frequency resource, and the third time-frequency resource is used to transmit a grant-free service. Therefore, the third time-frequency resource may also be referred to as a grant-free transmission resource.

For example, the grant-free transmission resource is used to transmit a service having a relatively high latency requirement, for example, is used to transmit a URLLC service.

Figure 6:
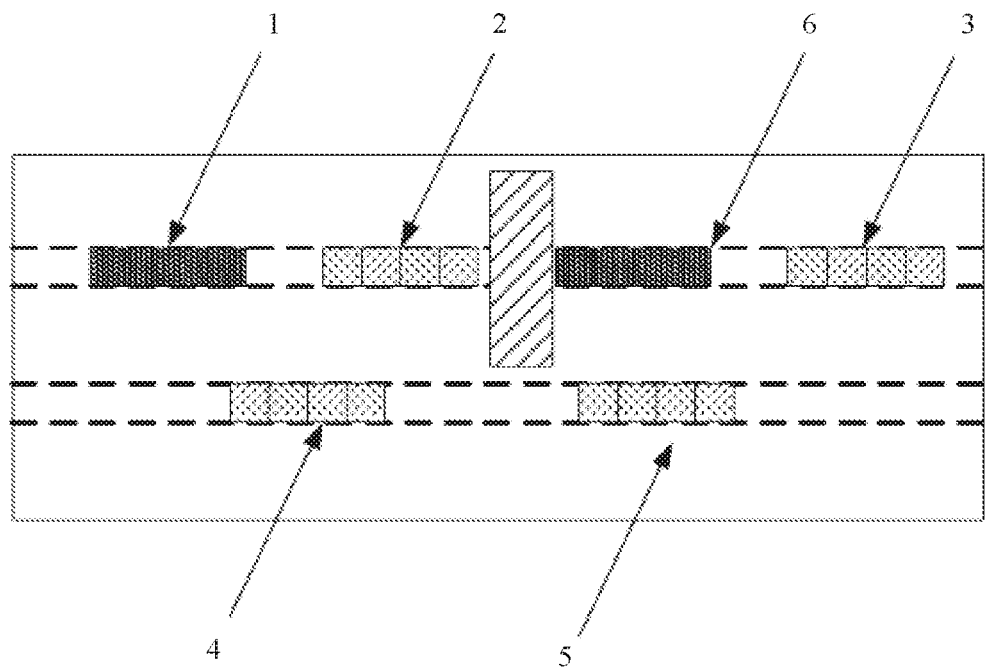
FIG. 6 is a schematic diagram 1 of distribution of a time-frequency resource according to this application.

In an actual process, the communications apparatus may determine, based on the dynamic scheduling, a first time-frequency resource used to send the grant-based service, or may determine, based on a semi-static configuration, a third time-frequency resource on which the grant-free service is sent. However, there may be no intersection set between the first time-frequency resource and the second time-frequency resource. As shown in FIG. 6, an example in which a first time-frequency resource is a GB transmission resource and a third time-frequency resource is a GF transmission resource is used.

Figure 7:
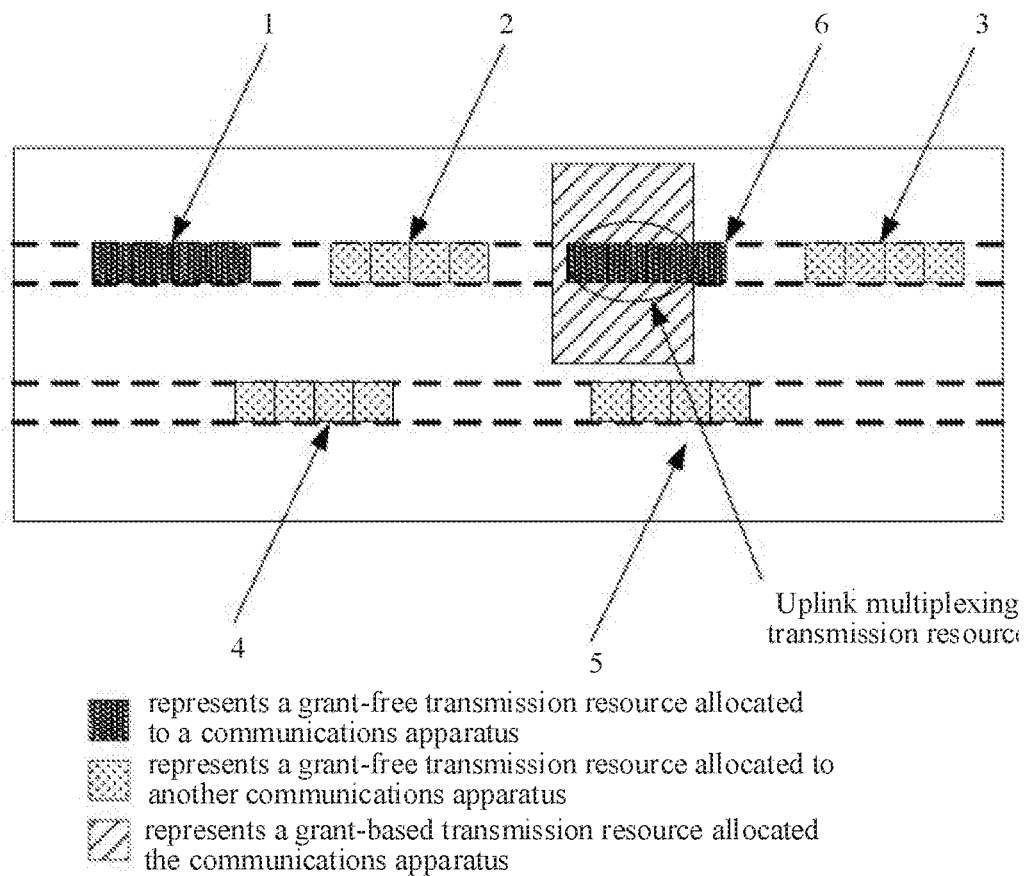
FIG. 7 is a schematic diagram 2 of distribution of a time-frequency resource according to this application.

However, in an actual process, a grant-free service is sporadic, and if a third time-frequency resource is separately allocated to the grant-free service or there is no intersection set between the first time-frequency resource and the third time-frequency resource, a resource waste may be caused. Therefore, in this application, the third time-frequency resource and the first time-frequency resource that are allocated to the communications apparatus may be configured to overlap. For example, as shown in FIG. 7, it may be learned from FIG. 7 that there is an overlapping time-frequency resource (for example, a GF transmission resource within an ellipse line in FIG. 7) between the GB transmission resource and the GF transmission resource.

In this application, an overlapping or partially overlapping time-frequency resource between the first time-frequency resource and the third time-frequency resource may be used as an uplink multiplexing transmission resource. In this way, the communications apparatus may send at least one of the grant-based service and the grant-free service by using the uplink multiplexing transmission resource, that is, the communications apparatus may send the grant-based service, or send the grant-free service, or send the grant-based service and the grant-free service on the uplink multiplexing transmission resource.

Optionally, the first information in this application is used to determine the location of the third time-frequency resource.

Figure 8:
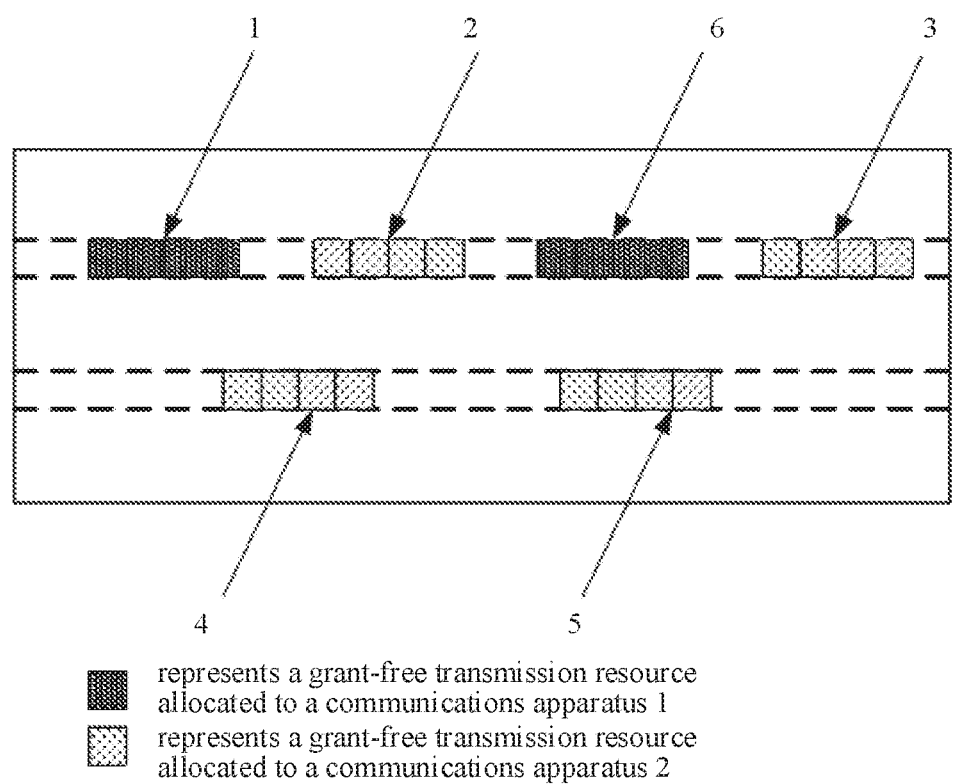
FIG. 8 is a schematic diagram 3 of distribution of a time-frequency resource according to this application.

For example, a plurality of GF transmission resources may be configured for a network device. As shown in FIG. 8, the plurality of GF transmission resources include a GF transmission resource 1, a GF transmission resource 2, a GF transmission resource 3, a GF transmission resource 4, a GF transmission resource 5, and a GF transmission resource 6.

Specifically, the network device may notify one or more communications apparatuses of information about M (M is an integer greater than or equal to 0) GF transmission resources in one or more GF transmission resources configured in a system. When a quantity of GF transmission resources allocated to a communications apparatus is 0, it indicates that no GF transmission resource may be allocated to the communications apparatus. Therefore, the communications apparatus may be unable to transmit a grant-free service on a GB transmission resource. Alternatively, when M>1, the communications apparatus may determine, based on indication information corresponding to each GF transmission resource, whether the grant-free service can be transmitted on at least one GF transmission resource allocated to another communications apparatus.

Still referring to FIG. 8, an example in which the GF transmission resource 1 and the GF transmission resource 6 are allocated to a communications apparatus 1, and the GF transmission resource 2, the GF transmission resource 3, the GF transmission resource 4 and the GF transmission resource 5 are allocated to another communications apparatus other than the communications apparatus 1, for example, are allocated to a communications apparatus 2 is used. In this way, in one aspect, the communications apparatus 1 may transmit the grant-free service on the GF transmission resource 1 and the GF transmission resource 6. In this case, the communications apparatus 1 needs to determine, based on the indication information, whether the grant-free service can be transmitted on the GF transmission resource 2, the GF transmission resource 3, the GF transmission resource 4, and the GF transmission resource 5 that are allocated to the communications apparatus 2.

To enable the communications apparatus to determine the location of the third time-frequency resource in the first time-frequency resource, in a semi-static configuration process of the communications apparatus in this application, the network device may indicate, to the communications apparatus in the following manner, whether one or more third time-frequency resources can be used to send the grant-free service.

In a possible implementation, information about the one or more third time-frequency resources may be added to RRC signaling or DCI signaling, so that the communications apparatus determines locations of the one or more third time-frequency resources in the first time-frequency resource based on the information about the one or more third time-frequency resources.

In addition, optionally, the foregoing RRC signaling or the DCI signaling may further include indication information used to indicate whether the foregoing one or more third time-frequency resources can be used to send the grant-free service.

The network device may allocate the one or more third time-frequency resources to at least one communications apparatus. When the third time-frequency resources are allocated to two or more communications apparatuses, at least one third time-frequency resource allocated to a communications apparatus A may be unavailable to a communications apparatus B, or the at least one third time-frequency resource allocated to the communications apparatus A is available to the communications apparatus A, or the at least one third time-frequency resource allocated to the communications apparatus A is unavailable to the communications apparatus A (that is, the communications apparatus A may be configured only to transmit the grant-based service). Therefore, the communications apparatus needs to determine, based on the indication information corresponding to the third time-frequency resource, whether an uplink grant-free service can be transmitted on the third time-frequency resource.

It may be understood that because the third time-frequency resource overlaps the first time-frequency resource, when the communications apparatus does not send the grant-free service, in this application, the grant-based service may be sent on a time-frequency resource that is in the first time-frequency resource and that overlaps the third time-frequency resource.

For example, still referring to FIG. 8, if the communications apparatus 1 determines that indication information corresponding to the GF transmission resource 2, the GF transmission resource 3, the GF transmission resource 4, and the GF transmission resource 5 is a first indication, the communications apparatus 1 determines that the GF transmission resource 2, the GF transmission resource 3, the GF transmission resource 4, and the GF transmission resource 5 cannot be used to send the grant-free service.

If the communications apparatus 1 determines that indication information corresponding to the GF transmission resource 1 and the GF transmission resource 6 is a second indication, the communications apparatus 1 determines that the GF transmission resource 1 and the GF transmission resource 6 may be used to send the grant-free service.

Because the GF transmission resource 2, the GF transmission resource 3, the GF transmission resource 4, and the GF transmission resource 5 are allocated to another communications apparatus, the communications apparatus 1 needs to determine, based on indication information corresponding to each GF transmission resource, whether the GF transmission resource may be used by the communications apparatus to send the grant-free service.

For example, the first indication may be 0 or false, and the second indication may be 1 or true. Certainly, the first indication and the second indication may alternatively be another parameter. This is not limited in this application.

It may be understood that when the indication information corresponding to the GF transmission resource 2, the GF transmission resource 3, the GF transmission resource 4, and the GF transmission resource 5 is the second indication, the communications apparatus 1 determines that the grant-free service may be sent on the GF transmission resource 2, the GF transmission resource 3, the GF transmission resource 4, and the GF transmission resource 5.

It should be noted that if a communications apparatus is configured only to send the grant-based service (for example, the eMBB service), when there is one or more third time-frequency resources in the first time-frequency resource of the communications apparatus, all indication information corresponding to the one or more third time-frequency resources may be false, so that the communications apparatus determines that the one or more third time-frequency resources cannot be used to send the grant-free service.

In another possible implementation, a format of group-common RRC (Group-common RRC, GC RRC) may further be defined in this application. The GC RRC indicates configuration information of the one or more third time-frequency resources. In this way, the communications apparatus may monitor the GC RRC, to obtain the configuration information that is of the one or more third time-frequency resources and that is indicated by the GC RRC.

In still another possible implementation, a format of group-common DCI may be defined in this application, and the GC DC indicates configuration information of the one or more third time-frequency resources. In this way, the communications apparatus may monitor the GC DCI, to obtain the configuration information that is of the one or more third time-frequency resources and that is indicated by the GC DCI.

The configuration information of the one or more third time-frequency resources in the GC RRC or the GC DCI may be configuration information of third time-frequency resources allocated to different communications apparatuses. The format of the GC RRC or the format of the GC DCI is not limited in this application.

S104: When performing the uplink transmission based on the control information, the communications apparatus sends, on an overlapping time-frequency resource of the second time-frequency resource and the third time-frequency resource, no signal or a reference signal generated based on configuration information of a second reference signal, where the third time-frequency resource is a semi-statically configured time-frequency resource that is used for the uplink transmission and that is determined by the communications apparatus based on the first information.

For example, the sending no signal in this embodiment of this application may be: sending no signal corresponding to the uplink transmission with the dynamic scheduling.

In this application, the overlapping time-frequency resource of the second time-frequency resource and the third time-frequency resource may be understood as that the second time-frequency resource partially overlaps the third time-frequency resource, or the second time-frequency resource completely overlaps the third time-frequency resource.

That the second time-frequency resource partially overlaps the third time-frequency resource may include that some time-frequency resources of the second time-frequency resource are located in the third time-frequency resource. Alternatively, some time-frequency resources of the third time-frequency resource are located in the second time-frequency resource. Specifically, some time-frequency resources of the second time-frequency resource overlap some or all time-frequency resources of the third time-frequency resource (which may also be referred to as: there is an intersection set). Alternatively, some time-frequency resources of the third time-frequency resource overlap some or all time-frequency resources of the second time-frequency resource.

That the second time-frequency resource completely overlaps the third time-frequency resource may include that the third time-frequency resource is located in the second time-frequency resource; or the second time-frequency resource is located in the third time-frequency resource.

It should be noted that, for descriptions of an overlapping time-frequency resource of two or more time-frequency resources in the following embodiments, refer to the descriptions herein. Details are not described again in the following content of this application.

Specifically, the configuration information of the second reference signal in this application is used to determine the second reference signal and a time-frequency resource location of the second reference signal. The configuration information of the second reference signal includes parameters such as a type of a DMRS, a symbol width of the DMRS, an initial value of the DMRS, and the like.

Optionally, when the communications apparatus sends, on the overlapping time-frequency resource, the reference signal generated based on the configuration information of the second reference signal, to avoid interference caused by uplink transmission performed on the first time-frequency resource to uplink transmission performed on the third time-frequency resource, the reference signal generated based on the configuration information of the second reference signal is orthogonal to a semi-statically configured reference signal.

Optionally, the foregoing orthogonal manner may be code domain orthogonality, resource orthogonality, or the like.

For example, in this embodiment of this application, the communications apparatus may obtain the configuration information of the second reference signal in the following implementations. In an implementation, the communications apparatus obtains the configuration information of the second reference signal by using the configuration information that is of the second reference signal and that is transmitted by a base station. The configuration information may be notified by the base station to the communications apparatus by using dynamic scheduling signaling. In another implementation, the configuration information may be notified by the base station to the communications apparatus in a semi-static configuration manner.

In still another implementation, the communications apparatus may further obtain the second reference signal based on information about the semi-statically configured reference signal.

For example, a formula for obtaining the second reference signal by using the information about the semi-statically configured reference signal is as follows: b=f(a)mod 12. a is a port number corresponding to the semi-statically configured reference signal (for example, a reference signal associated with the third time-frequency resource). b is a port number corresponding to the second reference signal. f(a) is a function that describes a relationship between a and b.

For example, the function of the relationship between a and b may be agreed on between the base station and the communications apparatus: $f(a)=k_1 \times a+k_2$.

$k_1$ and $k_2$ are coefficients that describe the relationship between a and b.

Optionally, the function of the relationship between a and b may alternatively be a pseudo-random generation manner agreed on between the base station and the communications apparatus. The pseudo-random generation manner may be related to at least one of content such as a slot number, a time domain symbol, a cell ID, an identifier of the communications apparatus, and a time-frequency resource location.

For example, the identifier of the communications apparatus may be an ID of the communications apparatus. The identifier of the communications apparatus is used to identify the communications apparatus.

This embodiment of this application provides an uplink transmission method. The first time-frequency resource and the second time-frequency resource are determined based on the control information, and when the uplink transmission is performed based on the control information, no signal or the reference signal generated based on the configuration information of the second reference signal is sent on the overlapping time-frequency resource of the second time-frequency resource and the third time-frequency resource. In this way, in an uplink transmission process, no signal or the reference signal generated based on the configuration information of the second reference signal may be sent on the overlapping time-frequency resource that is of the second time-frequency resource and the third time-frequency resource and that is in the first time-frequency resource. In this way, the uplink transmission performed on the first time-frequency resource and the uplink transmission performed on the third time-frequency resource may multiplex the third time-frequency resource, thereby improving frequency band resource utilization of the uplink resource.

It may be understood that the overlapping time-frequency resource of the second time-frequency resource and the third time-frequency resource in the foregoing embodiment may have the following case: The second time-frequency resource overlaps a time-frequency resource that is in the third time-frequency resource and that is used to send data, or the second time-frequency resource overlaps a time-frequency resource that is in the third time-frequency resource and that is used to send a reference signal, or the second time-frequency resource overlaps both the time-frequency resource that is in the third time-frequency resource and that is used to send the reference signal and a time-frequency resource that is in the third time-frequency resource and that is used to send the data.

Figure 9:
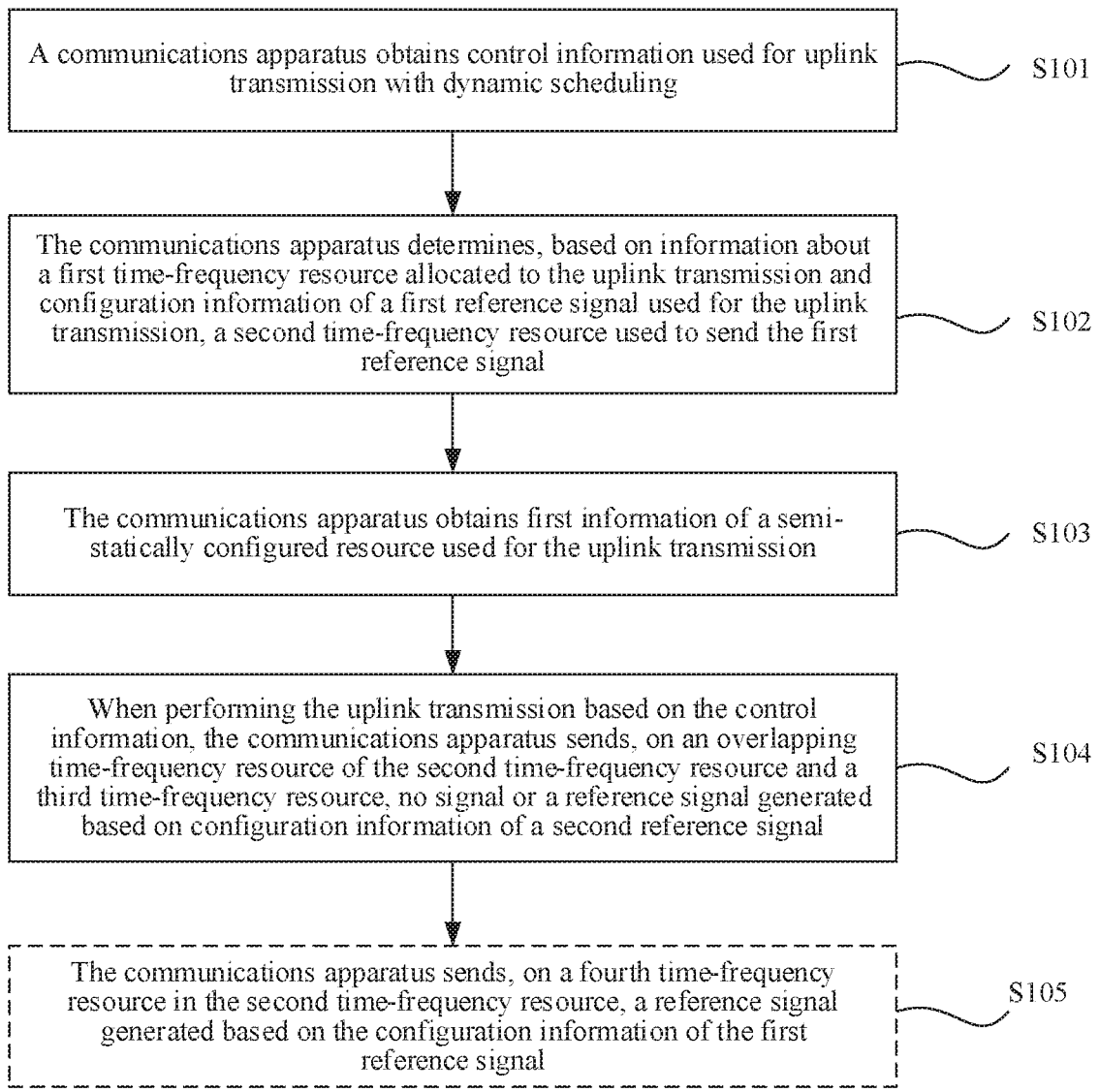
FIG. 9 is a schematic flowchart 2 of an uplink transmission method according to this application.

The foregoing mainly describes a processing manner of the communications apparatus on an overlapping time-frequency resource. However, in an actual process, some time-frequency resources of the second time-frequency resource may be located in the third time-frequency resource, and other time-frequency resources of the second time-frequency resource are located outside the third time-frequency resource. Therefore, as shown in FIG. 9, in another possible embodiment of this application, the method provided in this application further includes the following steps.

S105: A communications apparatus sends, on a fourth time-frequency resource in a second time-frequency resource, a reference signal generated based on configuration information of a first reference signal, where there is no intersection set between a frequency resource of the fourth time-frequency resource and a frequency resource of an overlapping time-frequency resource, and a union set of the frequency resource of the fourth time-frequency resource and the frequency resource of the overlapping time-frequency resource is a frequency resource of the second time-frequency resource.

The fourth time-frequency resource is a time-frequency resource that is in the second time-frequency resource and that is located outside a third time-frequency resource.

Optionally, a time domain resource of the fourth time-frequency resource is the same as a time domain resource of the second time-frequency resource.

Figure 10:
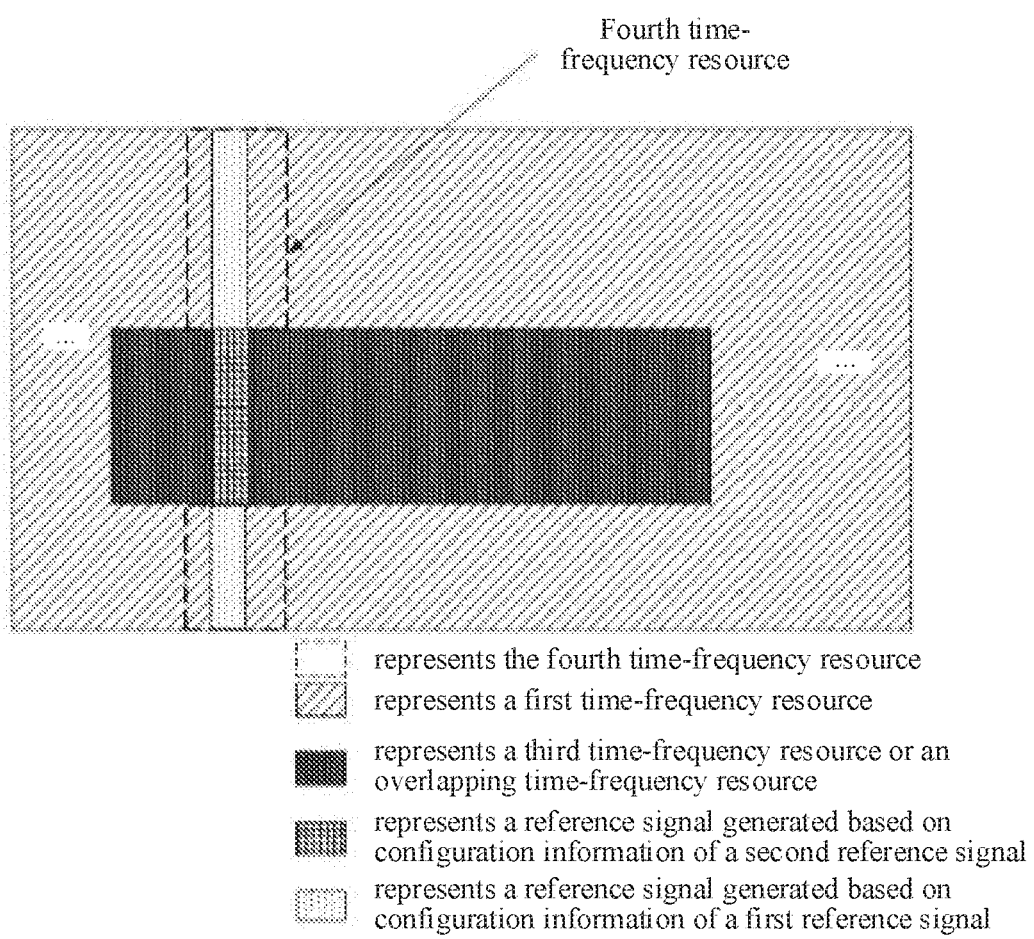
FIG. 10 is a schematic diagram 4 of distribution of a time-frequency resource according to this application.

For example, as shown in FIG. 10, there is no intersection set between the fourth time-frequency resource and the overlapping time-frequency resource, and the union set of the frequency resource of the fourth time-frequency resource and the frequency resource of the overlapping time-frequency resource is the frequency resource of the second time-frequency resource.

For example, as shown in FIG. 10, if some time-frequency resources of the second time-frequency resource overlap the third time-frequency resource, the reference signal that is generated based on the configuration information of the first reference signal and that is sent by the communications apparatus on the overlapping time-frequency resource in the second time-frequency resource may not be orthogonal to the reference signal sent in the third time-frequency resource. Therefore, to reduce interference caused by uplink transmission sent in the first time-frequency resource to uplink transmission sent on the third time-frequency resource, the communications apparatus sends, on the overlapping time-frequency resource, no signal or the reference signal generated based on the configuration information of the second reference signal.

In addition, the communications apparatus still sends, on a time-frequency resource (for example, the foregoing fourth time-frequency resource) that is in the second time-frequency resource and that does not overlap the third time-frequency resource, the reference signal generated based on the configuration information of the first reference signal.

For example, as shown in FIG. 10, because a time-frequency resource in the second time-frequency resource, other than the fourth time-frequency resource overlaps the third time-frequency resource, the communications apparatus may send, on the overlapping time-frequency resource in the second time-frequency resource, the reference signal generated based on the configuration information of the second reference signal, and send, on the fourth time-frequency resource, the reference signal generated based on the configuration information of the first reference signal. As shown in FIG. 10, there are finally two reference signals on the second time-frequency resource. Specifically, the reference signal generated based on the configuration information of the second reference signal is sent on the time-frequency resource that is in the second time-frequency resource and that overlaps the third time-frequency resource, and the reference signal generated based on the configuration information of the first reference signal is sent on the fourth time-frequency resource in the second time-frequency resource. In this way, the network device may perform channel estimation based on a GF reference signal sent in the third time-frequency resource and the reference signal that is generated based on the configuration information of the first reference signal and that is sent on the fourth time-frequency resource.

Optionally, in the scenario shown in FIG. 10, a bandwidth occupied by the third time-frequency resource is less than a bandwidth of the second time-frequency resource, that is, the third time-frequency resource occupies some bandwidths.

In an actual process, whether an intersection set between the overlapping time-frequency resource and the time-frequency resource that is in the third time-frequency resource and that is used to send the reference signal is an empty set may affect the communications apparatus in performing step S104. Therefore, the following provides detailed descriptions with reference to the embodiments.

In one case, the intersection set between the overlapping time-frequency resource and the time-frequency resource that is in the third time-frequency resource and that is used to send the reference signal is an empty set.

It may be understood that, that an intersection set between the overlapping time-frequency resource and the time-frequency resource that is in the third time-frequency resource and that is used to send the reference signal is an empty set means that at least some time-frequency resources in the second time-frequency resource are located in the third time-frequency resource, and there is no intersection or no overlapping between the at least some time-frequency resources and the time-frequency resource that is in the third time-frequency resource and that is used to send the reference signal.

Figure 11:
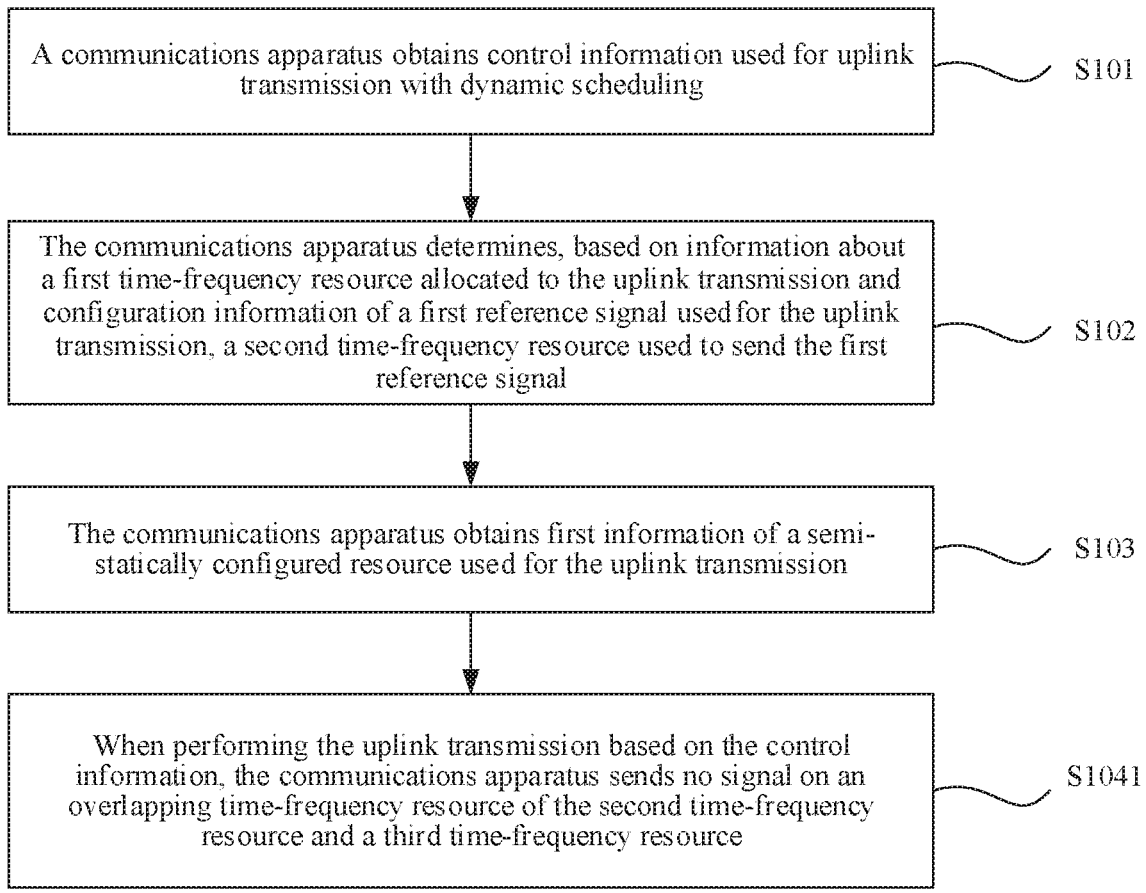
FIG. 11 is a schematic flowchart 3 of an uplink transmission method according to this application.

Correspondingly, in a possible implementation, as shown in FIG. 11, step S104 in this application may be specifically implemented in the following manner.

S1041: When performing the uplink transmission based on the control information, the communications apparatus sends no signal on the overlapping time-frequency resource.

Figure 12:
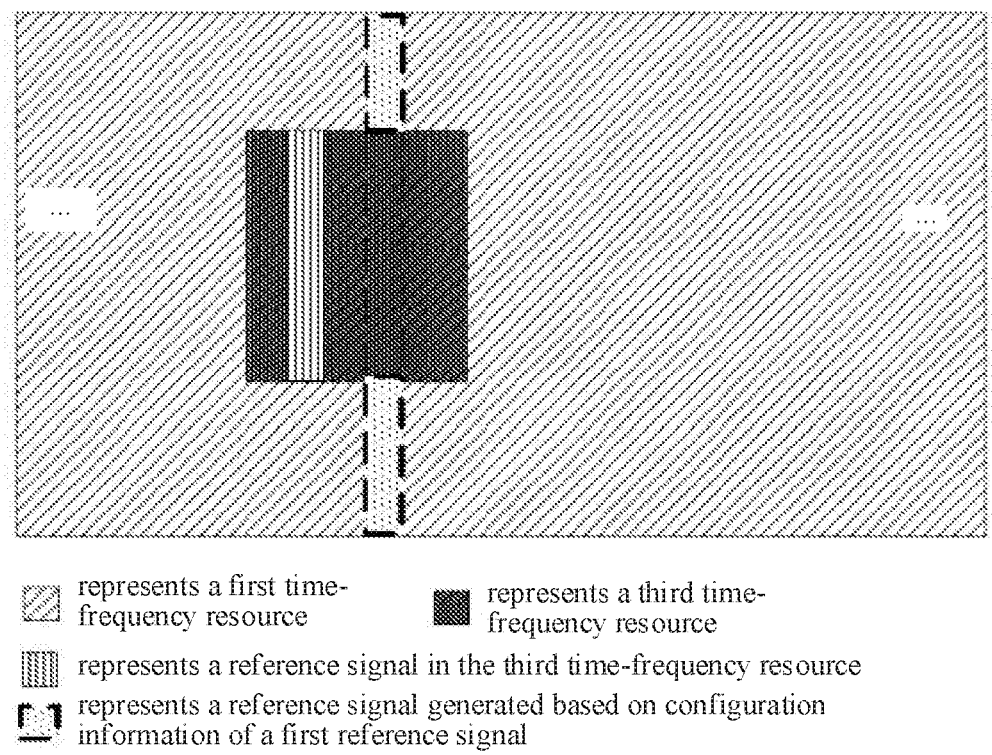
FIG. 12 is a schematic diagram 5 of distribution of a time-frequency resource according to this application.

For example, as shown in FIG. 12, the third time-frequency resource and the first time-frequency resource have an uplink multiplexing transmission resource, where the time-frequency resource that is in the third time-frequency resource and that is used to send the reference signal overlaps a time-frequency resource that is in the first time-frequency resource and that is used to send data, and the second time-frequency resource is located in the third time-frequency resource. In FIG. 12, the second time-frequency resource overlaps a time-frequency resource that is in the third time-frequency resource and that is used to send data. In this case, the communications apparatus may send no signal on the overlapping time-frequency resource shown in FIG. 12. In other words, the communications apparatus sends no signal on an overlapping time-frequency resource between the second time-frequency resource and the time-frequency resource that is in the third time-frequency resource and that is used to send the data.

Optionally, in FIG. 12, a bandwidth of the third time-frequency resource may be less than a bandwidth of the second time-frequency resource, or may be equal to a bandwidth of the second time-frequency resource, or may be greater than a bandwidth of the second time-frequency resource. This is not limited in this application. In FIG. 12, an example in which the bandwidth of the third time-frequency resource is less than the bandwidth of the second time-frequency resource is used for description.

With reference to FIG. 12, in an actual process, the communications apparatus may send a semi-statically configured reference signal on the time-frequency resource that is in the third time-frequency resource and that is used to send the reference signal, or may skip sending the semi-statically configured reference signal. The semi-statically configured reference signal is a reference signal that is associated with the third time-frequency resource and that is semi-statically configured.

Figure 13:
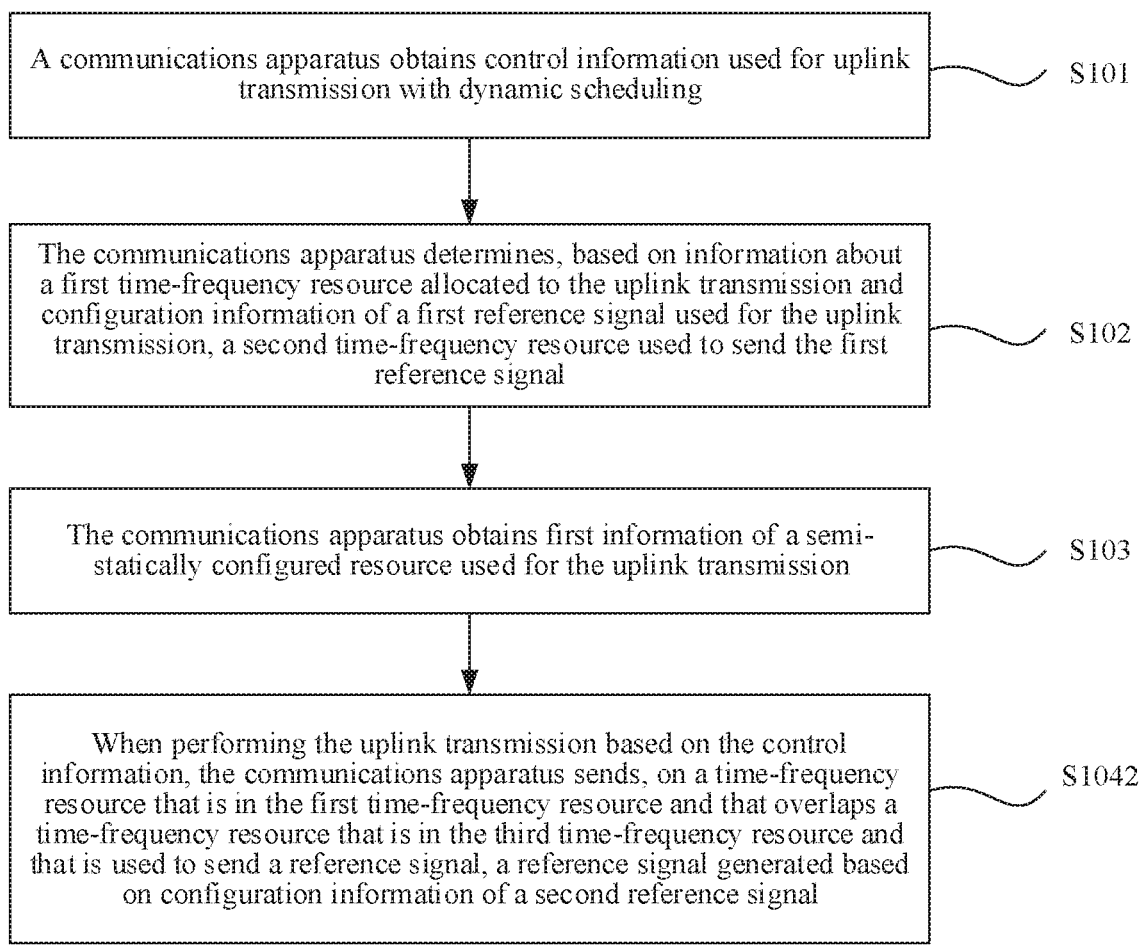
FIG. 13 is a schematic flowchart 4 of an uplink transmission method according to this application.

Optionally, in the scenario shown in FIG. 12, when the communications apparatus skips sending the semi-statically configured reference signal on the time-frequency resource that is in the third time-frequency resource and that is used to send the reference signal, as shown in FIG. 13, in a possible implementation, step S104 in this application may be further implemented in the following manner.

S1042: When performing the uplink transmission based on the control information, the communications apparatus sends, on a time-frequency resource that is in the first time-frequency resource and that overlaps the time-frequency resource that is in the third time-frequency resource and that is used to send the reference signal, the reference signal generated based on the configuration information of the second reference signal.

The skipping sending the semi-statically configured reference signal in this application may include the following cases: 1: The third time-frequency resource is a time-frequency resource allocated to the communications apparatus 1, while the communications apparatus 1 transmits no grant-free service on the third time-frequency resource. 2: The third time-frequency resource is not a time-frequency resource allocated to the communications apparatus 1, and is a time-frequency resource allocated to another communications apparatus. Therefore, the communications apparatus 1 in this application naturally does not perform grant-free transmission on the third time-frequency resource.

For example, as shown in FIG. 12, although in FIG. 12, the second time-frequency resource overlaps the time-frequency resource that is in the third time-frequency resource and that is used to send the data, the second time-frequency resource does not overlap the time-frequency resource that is in the third time-frequency resource and that is used to send the reference signal. Therefore, when skipping sending the semi-statically configured reference signal on the time-frequency resource that is in the third time-frequency resource and that is used to send the reference signal shown in FIG. 12, the communications apparatus may send, on the time-frequency resource that is in the first time-frequency resource and that overlaps the time-frequency resource that is in the third time-frequency resource and that is used to send the reference signal, the reference signal generated based on the configuration information of the second reference signal. The network device may detect the time-frequency resource that is in the third time-frequency resource and that is used to send the reference signal, to determine whether there is a reference signal corresponding to the grant-free service, and determine, based on whether there is a reference signal corresponding to the grant-free service exists, whether there is a grant-free service. Specifically, when there is no reference signal corresponding to the grant-free service in the time-frequency resource that is in the third time-frequency resource and that is used to send the reference signal, the network device determines that there is no grant-free service.

Figure 14:
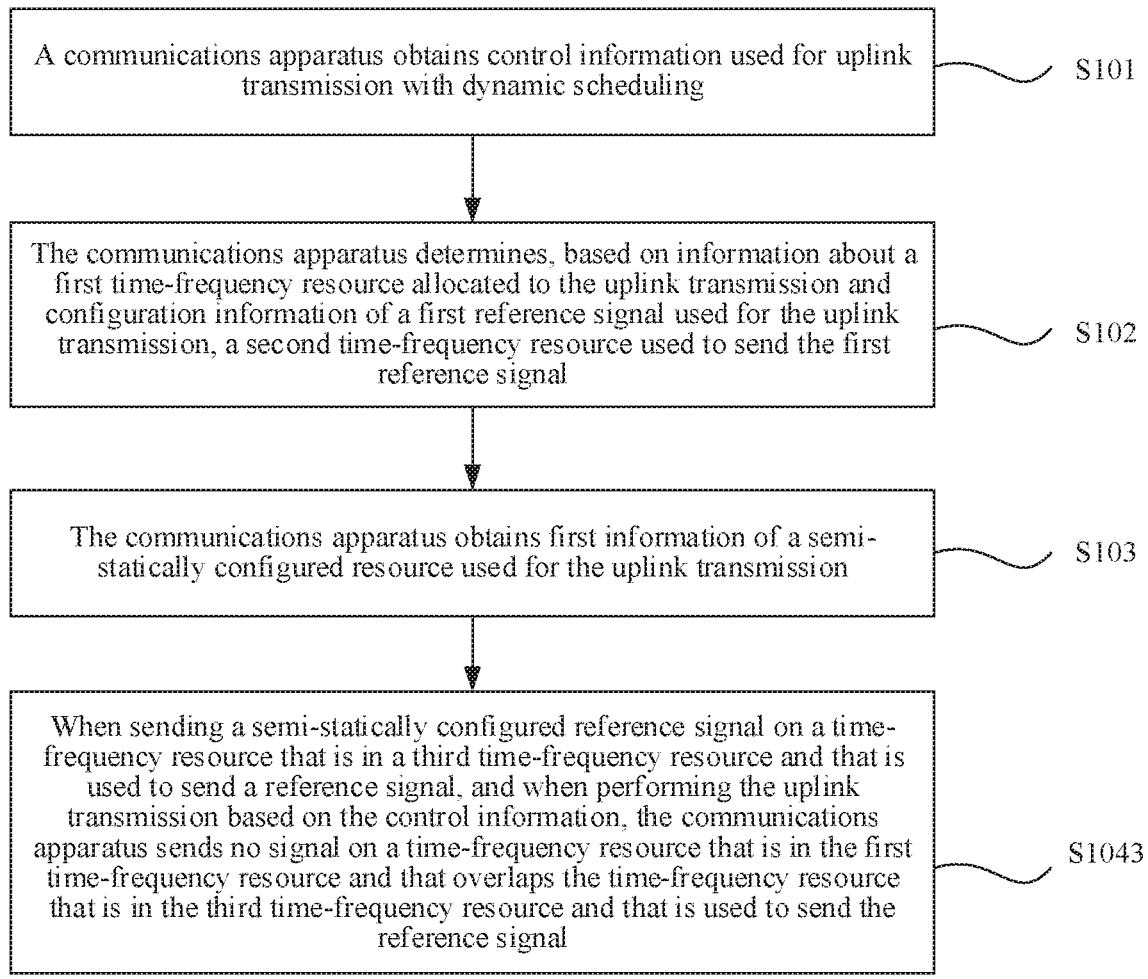
FIG. 14 is a schematic flowchart 5 of an uplink transmission method according to this application.

In another case, optionally, as shown in FIG. 14, step S104 in this application may be further implemented in the following manner.

S1043: When sending the semi-statically configured reference signal on the time-frequency resource that is in the third time-frequency resource and that is used to send the reference signal, and when performing the uplink transmission based on the control information, the communications apparatus sends no signal on the time-frequency resource that is in the first time-frequency resource and that overlaps the time-frequency resource that is in the third time-frequency resource and that is used to send the reference signal.

In this application, the sending the semi-statically configured reference signal may include the following case: The third time-frequency resource is a time-frequency resource allocated to the communications apparatus 1, while the communications apparatus 1 transmits the grant-free service on the third time-frequency resource.

Figure 15:
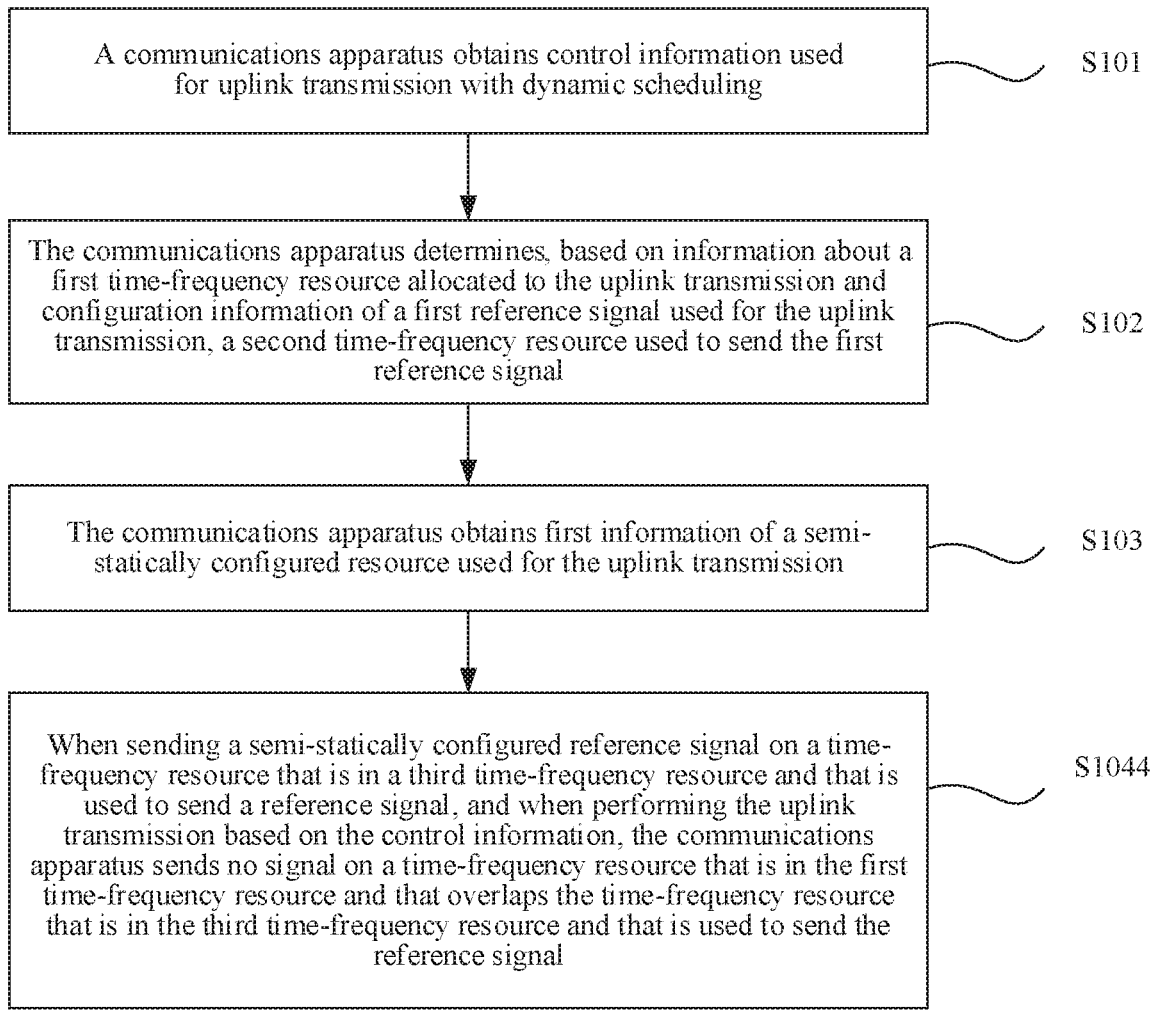
FIG. 15 is a schematic flowchart 6 of an uplink transmission method according to this application.

Optionally, in another case, the overlapping time-frequency resource in this application includes some or all time-frequency resources that are in the third time-frequency resource and that are used to send the reference signal, in other words, the second time-frequency resource overlaps some or all time-frequency resources that are in the third time-frequency resource and that are used to send the reference signal. In another possible implementation, as shown in FIG. 15, step S104 in this application may be specifically implemented in the following manner.

S1044: When performing the uplink transmission based on the control information, the communications apparatus sends, on the overlapping time-frequency resource, the reference signal generated based on the configuration information of the second reference signal.

Figure 16:
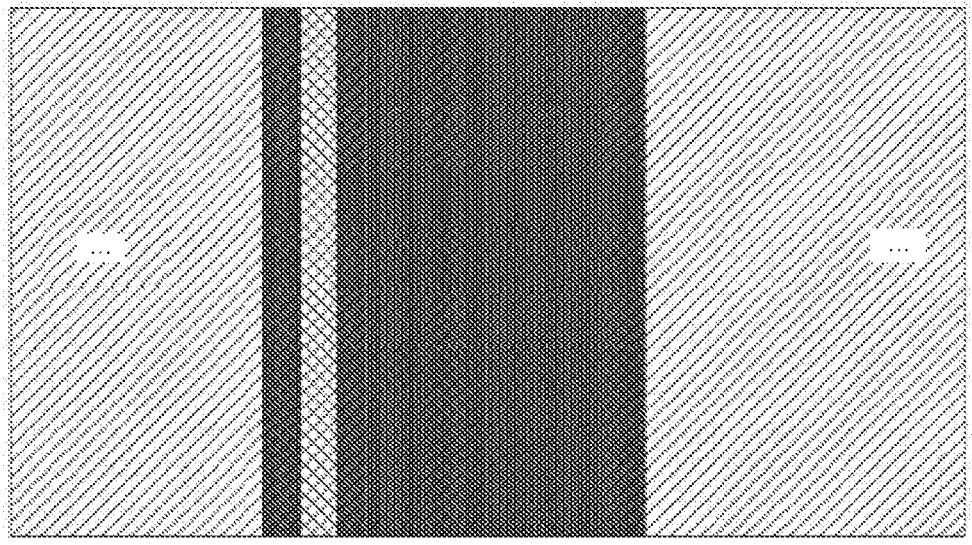
FIG. 16 is a schematic diagram 6 of distribution of a time-frequency resource according to this application.

For example, with reference to FIG. 16 and FIG. 10, FIG. 16 shows that the second time-frequency resource (the second time-frequency resource is not shown) overlaps all time-frequency resources that are in the third time-frequency resource and that are used to send the reference signal, FIG. 10 shows that the second time-frequency resource overlaps some time-frequency resources that are in the third time-frequency resource and that are used to send the reference signal. In FIG. 16, all time-frequency resources that are in the third time-frequency resource and that are used to send the reference signal overlap the second time-frequency resource. In FIG. 10, if some time-frequency resources that are in the third time-frequency resource and that are used to send the reference signal overlap the second time-frequency resource, because in FIG. 10 and FIG. 16, the reference signal that is sent on the second time-frequency resource and that is generated based on the configuration information of the first reference signal may not be orthogonal to the reference signal sent on the third time-frequency resource, to reduce interference caused by GB data sent on the first time-frequency resource to GF data sent on the third time-frequency resource, in this application, the reference signal generated based on the configuration information of the second reference signal may be sent on the time-frequency resource that is in the second time-frequency resource and that overlaps the time-frequency resource that is in the third time-frequency resource and that is used to send the reference signal.

Optionally, in FIG. 16, a bandwidth of the time-frequency resource that is in the third time-frequency resource and that is used to send the reference signal is the same as a bandwidth of the second time-frequency resource. In other words, the time-frequency resource that is in the third time-frequency resource and that is used to send the reference signal occupies an entire bandwidth.

Optionally, in FIG. 10, a bandwidth of the time-frequency resource that is in the third time-frequency resource and that is used to send the reference signal is less than a bandwidth of the second time-frequency resource. In other words, the time-frequency resource that is in the third time-frequency resource and that is used to send the reference signal occupies a part of the bandwidth.

Figure 17:
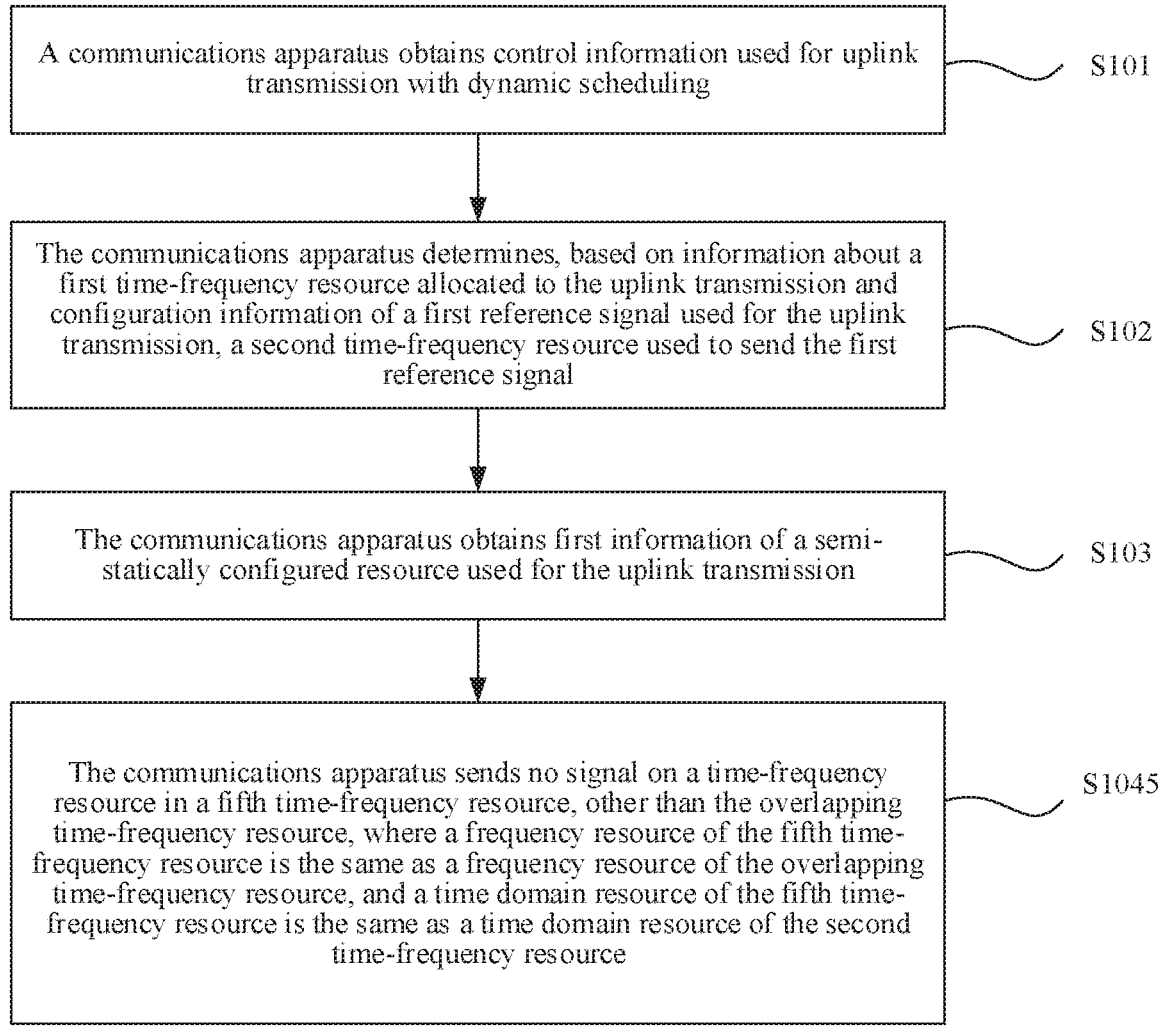
FIG. 17 is a schematic flowchart 7 of an uplink transmission method according to this application.

In another possible implementation, as shown in FIG. 17, step S104 in this application may be specifically implemented in the following manner.

S1045: The communications apparatus sends no signal on a time-frequency resource in the fifth time-frequency resource, other than the overlapping time-frequency resource, where a frequency resource of the fifth time-frequency resource is the same as a frequency resource of the overlapping time-frequency resource, and a time domain resource of the fifth time-frequency resource is the same as a time domain resource of the second time-frequency resource. In another alternative embodiment, when performing the uplink transmission based on the control information, the communications apparatus sends no signal on the fifth time-frequency resource in the first time-frequency resource, and the fifth time-frequency resource is a time-frequency resource that is in the overlapping time-frequency resource and that does not overlap the time-frequency resource used to send the semi-statically configured reference signal.

Figure 18:
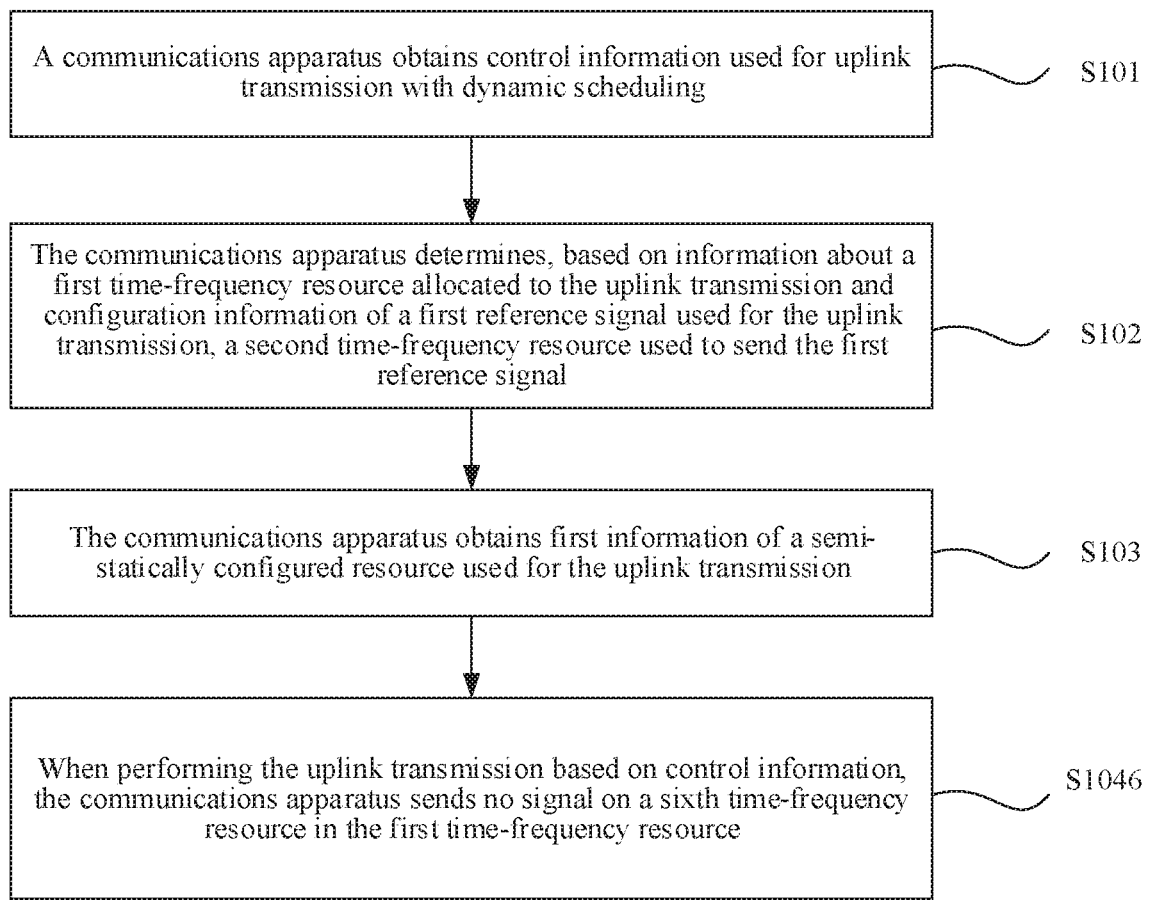
FIG. 18 is a schematic flowchart 8 of an uplink transmission method according to this application.

In still another possible implementation, as shown in FIG. 18, step S104 in this application may be specifically implemented in the following manner.

S1046: When performing the uplink transmission based on control information, the communications apparatus sends no signal on a sixth time-frequency resource in the first time-frequency resource, where the sixth time-frequency resource is a time-frequency resource that is in the first time-frequency resource and that does not overlap the overlapping time-frequency resource but overlaps the time-frequency resource that is in the third time-frequency resource and that is used to send the reference signal.

For example, as shown in FIG. 12, the sixth time-frequency resource in FIG. 12 is a time-frequency resource that is in the first time-frequency resource, other than the overlapping time-frequency resource and that overlaps a candidate transmission resource.

Optionally, in this application, when a priority of a GB service sent on the first time-frequency resource is close to a priority of a GF service sent on the third time-frequency resource, and the GB service and the GF service multiplex the foregoing uplink multiplexing transmission resource, in this application, the communications apparatus performs, by using a non-orthogonal transmission technology, the uplink transmission on an overlapping time-frequency resource of a time-frequency resource in the first time-frequency resource, other than the second time-frequency resource and a time-frequency resource in the third time-frequency resource, other than the time-frequency resource used to send the reference signal.

Figure 19:
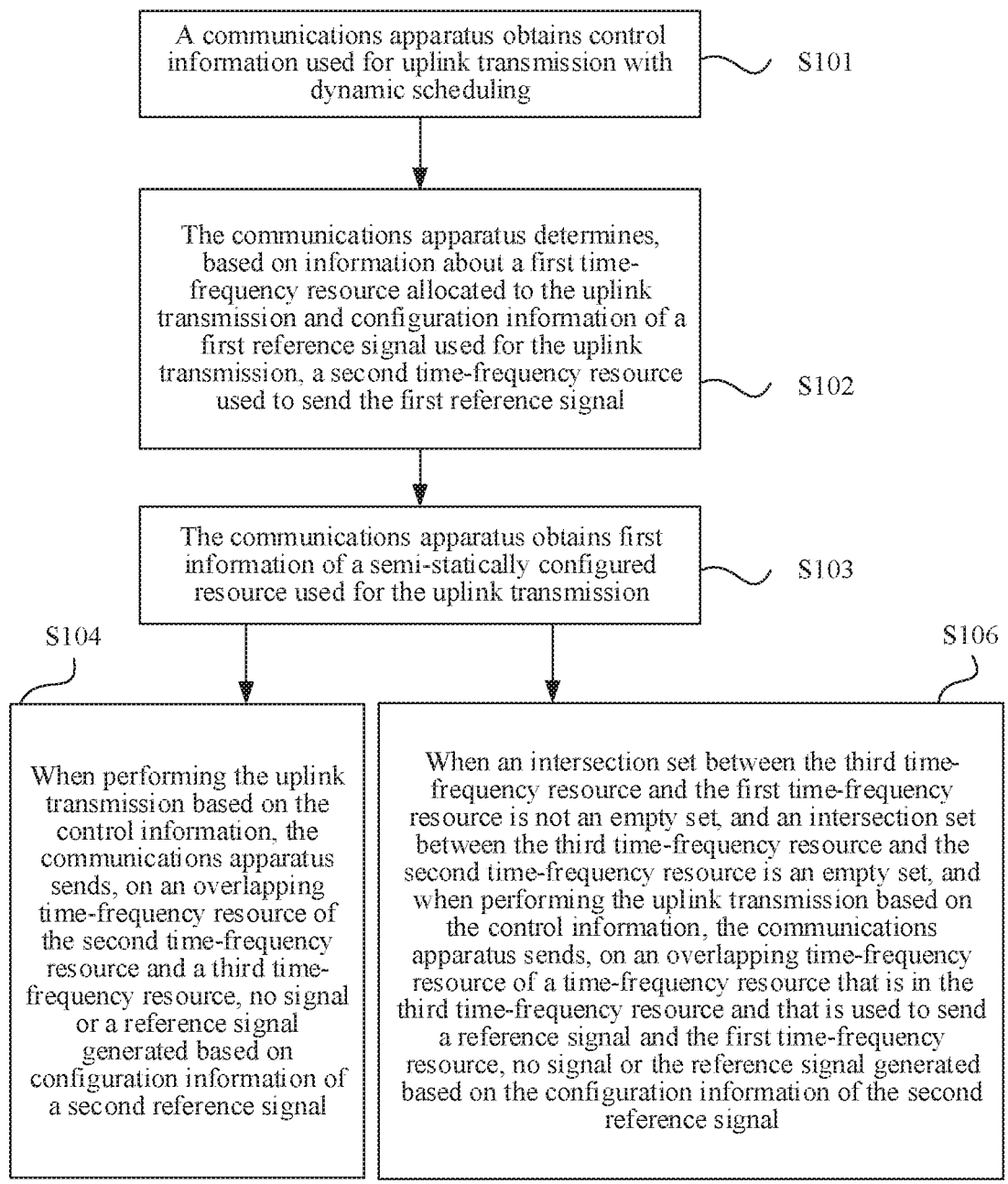
FIG. 19 is a schematic flowchart 9 of an uplink transmission method according to this application.

Optionally, in an actual process, there may be a case in which an intersection set of the third time-frequency resource and the second time-frequency resource is an empty set. Therefore, in still another possible implementation, as shown in FIG. 19, the method provided in this application further includes the following steps.

S106: When an intersection set between the third time-frequency resource and the first time-frequency resource is not an empty set, and an intersection set between the third time-frequency resource and the second time-frequency resource is an empty set, and when performing the uplink transmission based on the control information, the communications apparatus sends, on the overlapping time-frequency resource of the time-frequency resource that is in the third time-frequency resource and that is used to send the reference signal and the first time-frequency resource, no signal or the reference signal generated based on the configuration information of the second reference signal.

That the intersection set between the third time-frequency resource and the first time-frequency resource is not an empty set may be understood as that the uplink multiplexing transmission resource shown in FIG. 7 exists between the third time-frequency resource and the first time-frequency resource. To be specific, some or all time-frequency resources of the third time-frequency resource are located in the first time-frequency resource, or some time-frequency resources of the third time-frequency resource overlap some or all time-frequency resources of the first time-frequency resource, or all time-frequency resources of the third time-frequency resource overlap some or all time-frequency resources of the first time-frequency resource, to obtain the uplink multiplexing transmission resource.

Figure 20:
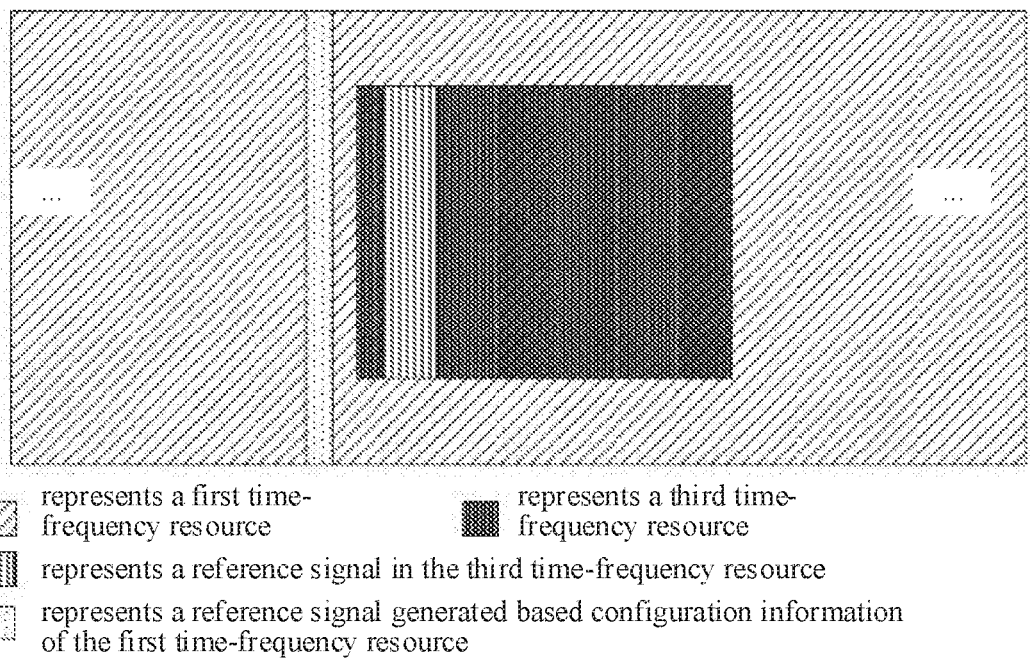
FIG. 20 is a schematic diagram 7 of distribution of a time-frequency resource according to this application.

For example, as shown in FIG. 20, the third time-frequency resource completely overlaps the first time-frequency resource, the second time-frequency resource is located outside the third time-frequency resource, and the grant-based service and the grant-free service multiplex the uplink multiplexing transmission resource. In this case, the communications apparatus sends, on the time-frequency resource that is in the first time-frequency resource and that overlaps the time-frequency resource that is in the third time-frequency resource and that is used to send the reference signal, the reference signal generated based on the configuration information of the second reference signal or no information.

Optionally, in the scenario shown in FIG. 20, the bandwidth of the third time-frequency resource may be equal to the bandwidth of the first time-frequency resource, or the bandwidth of the third time-frequency resource may further be less than the bandwidth of the first time-frequency resource, or the bandwidth of the third time-frequency resource may further be greater than the bandwidth of the first time-frequency resource. This is not limited in this application.

Because whether the overlapping time-frequency resource overlaps the time-frequency resource that is in the third time-frequency resource and that is used to send the reference signal determines that the communications apparatus sends, on the overlapping time-frequency resource, no signal or the reference signal generated based on the configuration information of the second reference signal, the following describes in detail specific steps of the communications apparatus on the overlapping time-frequency resource with reference to a location relationship between the overlapping time-frequency resource and the time-frequency resource that is in the third time-frequency resource and that is used to send the reference signal, and a specific scenario.

Figure 21:
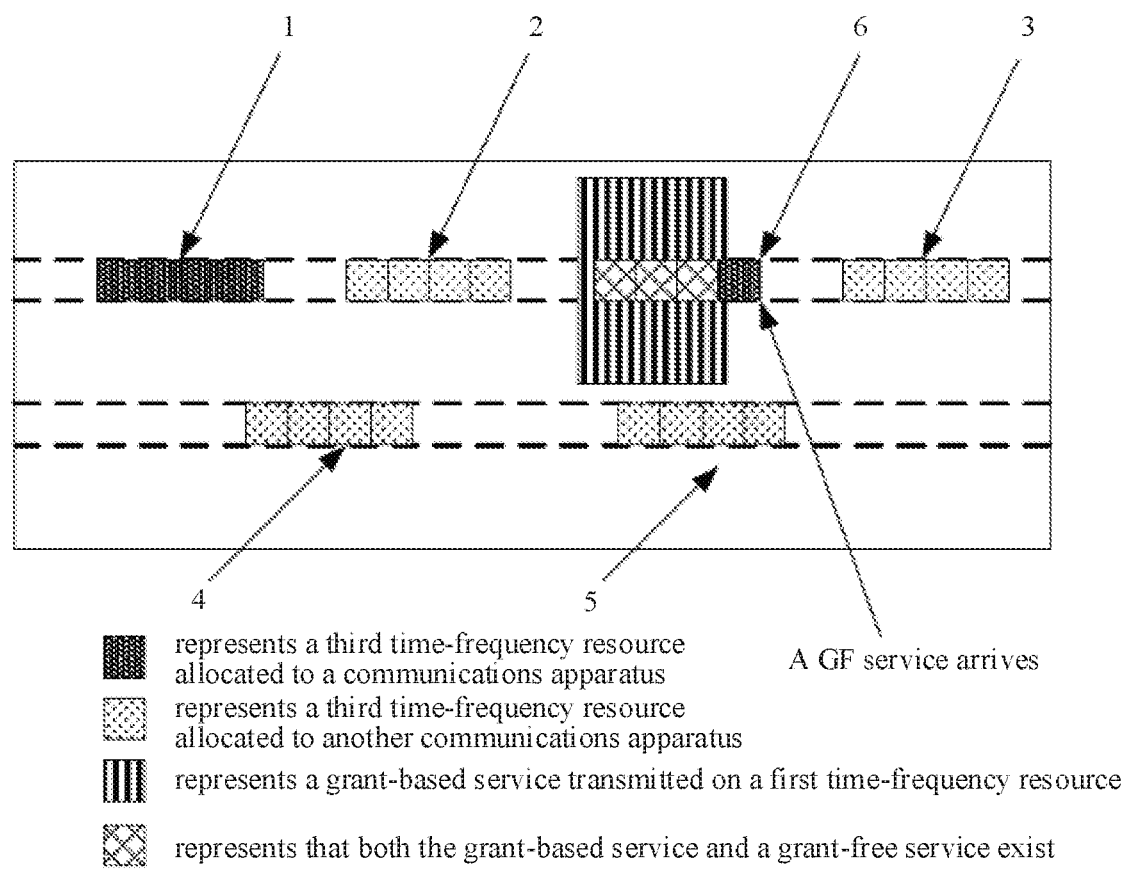
FIG. 21 is a schematic diagram 8 of distribution of a time-frequency resource according to this application.

Scenario 1: As shown in FIG. 21, when the communications apparatus sends the GB service on the first time-frequency resource, if the communications apparatus needs to send the GF service on the third time-frequency resource, in other words, the communications apparatus needs to simultaneously send the GB service and the GF service, the communications apparatus may send the GB service on the first time-frequency resource, and send the GF service on the third time-frequency resource (including the time-frequency resource that is in the third time-frequency resource and that overlaps the uplink multiplexing transmission resource). In this case, the GF service and the GB service multiplex the uplink multiplexing transmission resource.

Figure 22:
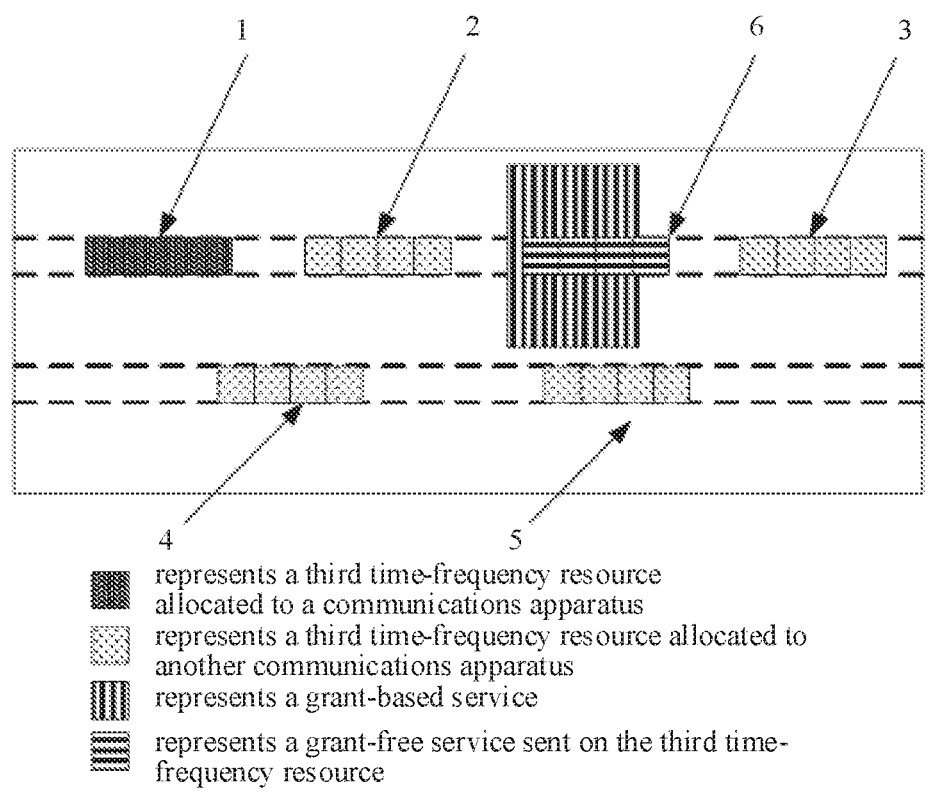
FIG. 22 is a schematic diagram 9 of distribution of a time-frequency resource according to this application.

For example, as shown in FIG. 22, the communications apparatus may send the GF service on the third time-frequency resource shown in FIG. 22, and transmit the GB service on the first time-frequency resource allocated to the communications apparatus, to ensure that the GF service and the GB service are simultaneously sent.

In addition, it should be noted that the foregoing description is provided by using an example in which the GB service already exists when the GF service is sent. In an actual process, the following case may further exist: there is no GB service on the first time-frequency resource before the GF service is sent. Therefore, when needing to simultaneously send the GF service and the GB service in an uplink transmission process, the communications apparatus sends the GB service on the first time-frequency resource, and sends the GF service on the third time-frequency resource, that is, the GF service and the GB service are simultaneously sent on the uplink multiplexing transmission resource.

It may be understood that when the third time-frequency resource completely overlaps the first time-frequency resource, the uplink multiplexing transmission resource is the third time-frequency resource. When the third time-frequency resource partially overlaps the first time-frequency resource, the uplink multiplexing transmission resource is a time-frequency resource that is in the third time-frequency resource and that overlaps the first time-frequency resource.

In Scenario 1, because the GB service and the GF service multiplex the uplink multiplexing transmission resource, that is, both the GB service and the GF service may simultaneously exist on the uplink multiplexing transmission resource, to reduce interference caused by the GB service to the GF service, in this application, it is determined, based on the location relationship between the second time-frequency resource and the third time-frequency resource and a relationship between locations of the second time-frequency resource and the time-frequency resource that is in the third time-frequency resource and that is used to send the reference signal, whether to send, on the overlapping time-frequency resource of the second time-frequency resource and the third time-frequency resource, the reference signal generated based on the configuration information of the second reference signal or no signal. Details are as follows:

Case 1: With reference to FIG. 16, when the second time-frequency resource is located in the third time-frequency resource, and the second time-frequency resource completely overlaps the time-frequency resource that is in the third time-frequency resource and that is used to send the reference signal; or with reference to FIG. 10, when the second time-frequency resource is located in the third time-frequency resource, and the second time-frequency resource partially overlaps the time-frequency resource that is in the third time-frequency resource and that is used to send the reference signal.

According to one aspect, the communications apparatus sends, on a time-frequency resource that is in the first time-frequency resource and that overlaps the time-frequency resource that is in the third time-frequency resource and that is used to send the reference signal, the reference signal generated based on the configuration information of the second reference signal. In addition, the communications apparatus sends, on a time-frequency resource that is in the second time-frequency resource and that does not overlap the third time-frequency resource, the reference signal generated based on the configuration information of the first reference signal.

According to another aspect, when skipping sending the semi-statically configured reference signal on the time-frequency resource that is in the third time-frequency resource and that is used to send the reference signal, the communications apparatus sends, on the time-frequency resource that is in the first time-frequency resource and that overlaps the time-frequency resource that is in the third time-frequency resource and that is used to send the reference signal, the reference signal generated based on the configuration information of the second reference signal.

According to still another aspect, when sending the semi-statically configured reference signal on the time-frequency resource that is in the third time-frequency resource and that is used to send the reference signal, the communications apparatus sends no signal on the time-frequency resource that is in the first time-frequency resource and that overlaps the time-frequency resource that is in the third time-frequency resource and that is used to send the reference signal. In this case, the network device may jointly perform channel estimation with the reference signal that is sent on the second time-frequency resource and that is generated based on the configuration information of the first reference signal and the semi-statically configured reference signal sent on the third time-frequency resource.

Figure 23:
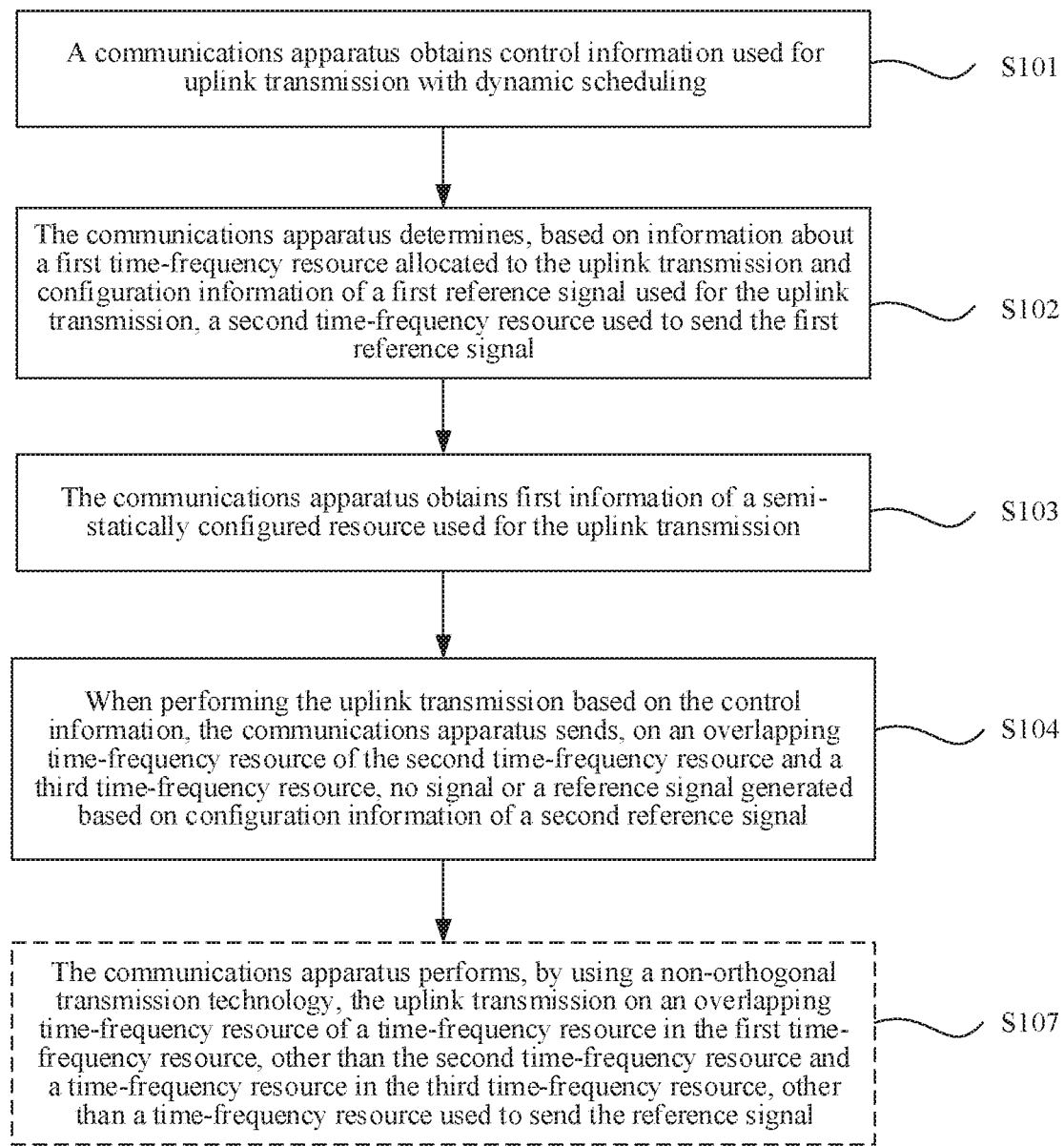
FIG. 23 is a schematic flowchart 10 of an uplink transmission method according to this application.

Optionally, in Scenario 1, the communications apparatus may perform, by using the following manner, the uplink transmission on an overlapping time-frequency resource of a time-frequency resource in the first time-frequency resource, other than the second time-frequency resource and a time-frequency resource in the third time-frequency resource, other than the time-frequency resource used to send the reference signal. Therefore, as shown in FIG. 23, the method provided in this application further includes the following steps.

In one manner, S107: The communications apparatus performs, by using a non-orthogonal transmission technology, the uplink transmission on an overlapping time-frequency resource of a time-frequency resource in the first time-frequency resource, other than the second time-frequency resource and a time-frequency resource in the third time-frequency resource, other than the time-frequency resource used to send the reference signal.

For example, when the communications apparatus sends the GB data on the time-frequency resource other than the second time-frequency resource in the first time-frequency resource in a non-orthogonal multiple access (non-orthogonal multiple access, NoMA) manner, and sends the GF data on an overlapping time-frequency resource of the first time-frequency resource and a time-frequency resource in the third time-frequency resource, other than the time-frequency resource used to send the reference signal.

There are a plurality of non-orthogonal multiple access manners, for example, sparse code multiple access (sparse code multiple access, SCMA) and interleave-grid multiple access (Interleave-Grid Multiple Access, IGMA).

For example, an example in which the non-orthogonal multiple access manner is the SCMA is used. In this case, the communications apparatus selects an orthogonal codebook for the GB data sent on the time-frequency resource other than the second time-frequency resource in the first time-frequency resource and the GF data sent on the overlapping time-frequency resource of the first time-frequency resource and the time-frequency resource in the third time-frequency resource, other than the time-frequency resource used to send the reference signal, to perform data transmission.

In another manner, S108: The communications apparatus performs, in a power control manner, the uplink transmission on an overlapping time-frequency resource of the time-frequency resource in the first time-frequency resource, other than the second time-frequency resource and the time-frequency resource in the third time-frequency resource, other than the time-frequency resource used to send the reference signal.

For example, the communications apparatus controls power of the GB data sent on a time-frequency resource that is in the first time-frequency resource and that overlaps the uplink multiplexing transmission resource to be lower than power of the GF data sent on a time-frequency resource that is in the third time-frequency resource and that overlaps the uplink multiplexing transmission resource.

The time-frequency resource that is in the first time-frequency resource and that overlaps the uplink multiplexing transmission resource excludes the second time-frequency resource, and the time-frequency resource that is in the third time-frequency resource and that overlaps the uplink multiplexing transmission resource excludes the time-frequency resource that is in the third time-frequency resource and that is used to send the reference signal.

Case 2: As shown in FIG. 12, when the second time-frequency resource is located in the third time-frequency resource, the time-frequency resource that is in the third time-frequency resource and that is used to send the reference signal completely or partially overlaps the time-frequency resource that is in the first time-frequency resource and that is used to send the GB data (partial overlapping is used as an example in FIG. 12), and the second time-frequency resource completely or partially overlaps the time-frequency resource that is in the third time-frequency resource and that is used to send the GF data (partial overlapping is used as an example in FIG. 12).

In Case 2, a processing manner of the reference signal that is sent on the second time-frequency resource and that is generated based on the configuration information of the first reference signal and a signal on the time-frequency resource that is in the first time-frequency resource and that overlaps the time-frequency resource that is in the third time-frequency resource and that is used to send the reference signal may be any one of the following aspects.

According to one aspect, the communications apparatus interrupts a reference signal on a time-frequency resource that is in the second time-frequency resource and that overlaps the time-frequency resource that is in the third time-frequency resource and that is used to send the GF data, and when skipping sending the semi-statically configured reference signal on the time-frequency resource that is in the third time-frequency resource and that is used to send the reference signal, the communications apparatus sends, on the time-frequency resource that is in the first time-frequency resource and that overlaps the time-frequency resource that is in the third time-frequency resource and that is used to send the reference signal, the reference signal generated based on the configuration information of the second reference signal.

According to another aspect, the communications apparatus interrupts a reference signal that is on the second time-frequency resource and that is on the time-frequency resource that is in the third time-frequency resource and that is used to send the GF data, and when sending the semi-statically configured reference signal on the time-frequency resource that is in the third time-frequency resource and that is used to send the reference signal, the communications apparatus sends no signal in the first time-frequency resource and in the third time-frequency resource, that is, the communications apparatus only sends, on the time-frequency resource that is in the second time-frequency resource and that does not overlap the third time-frequency resource, the reference signal generated based on the configuration information of the first reference signal. Therefore, the network device may jointly perform channel estimation by using the reference signal that is generated based on the configuration information of the first reference signal and that is sent on the time-frequency resource that is on the second time-frequency resource and that does not overlap the third time-frequency resource and the semi-statically configured reference signal sent on the third time-frequency resource.

The communications apparatus sends the GB data on the overlapping time-frequency resource of the second time-frequency resource and the third time-frequency resource. In other words, the GB data may be mapped and sent on a time-frequency resource on which a reference signal that is originally sent in the third time-frequency resource and that is generated based on the configuration information of the first reference signal. A manner of mapping the GB data is not limited in this application. An existing mapping method in an order of first frequency domain and then time domain may be used to map data, or original GB data of the time-frequency resource that is in the third time-frequency resource and that is used to send the reference signal is mapped to a time-frequency resource on which an original reference signal of the GB is located, or another mapping method may be used.

Case 3: As shown in FIG. 20, if the time-frequency resource that is in the third time-frequency resource and that is used to send the reference signal overlaps a time-frequency resource that is in the first time-frequency resource and that is used to send data, and there is no intersection set between the second time-frequency resource and the uplink multiplexing transmission resource (the uplink multiplexing transmission resource in FIG. 20 is also the third time-frequency resource). In this case, in one aspect, the communications apparatus sends, on the time-frequency resource that is in the first time-frequency resource and that overlaps the time-frequency resource that is in the third time-frequency resource and that is used to send the reference signal, the reference signal generated based on the configuration information of the second reference signal. Alternatively, according to another aspect, the communications apparatus sends no signal on the time-frequency resource that is in the first time-frequency resource and that overlaps the time-frequency resource that is in the third time-frequency resource and that is used to send the reference signal. In this case, data mapping is also not performed on the time-frequency resource that is in the first time-frequency resource and that overlaps the time-frequency resource that is in the third time-frequency resource and that is used to send the reference signal.

When sending the GB data on the time-frequency resource other than the second time-frequency resource in the first time-frequency resource, and sending the GF data on the overlapping time-frequency resource of the first time-frequency resource and the time-frequency resource in the third time-frequency resource, other than the time-frequency resource used to send the reference signal, the communications apparatus may use the non-orthogonal multiple access manner for transmission.

Optionally, in Case 3, for a process in which the communications apparatus sends the GB data on the time-frequency resource in the first time-frequency resource, other than the second time-frequency resource, and sends the GF data on the overlapping time-frequency resource of the first time-frequency resource and the time-frequency resource in the third time-frequency resource, other than the time-frequency resource used to send the reference signal, refer to the foregoing steps S106 and S107. Details are not described herein in this application.

Figure 24:
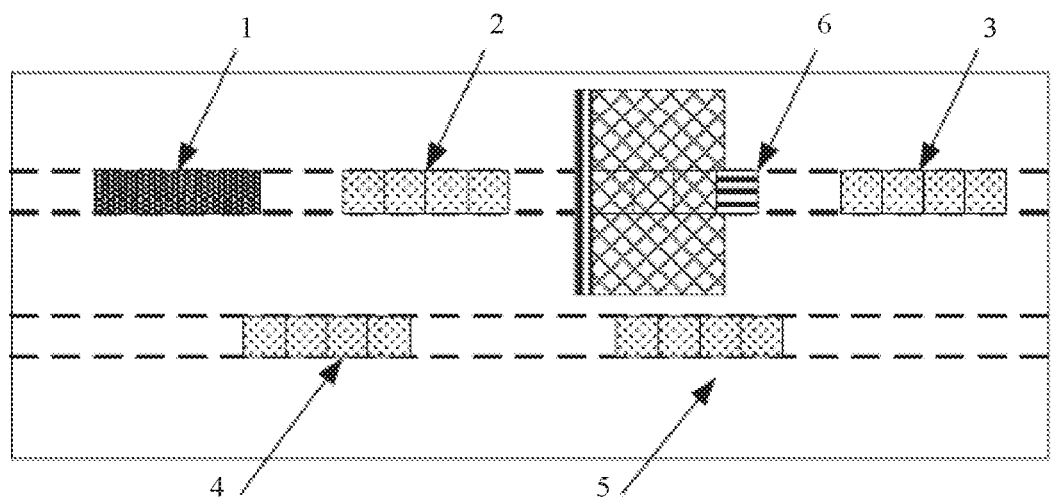
FIG. 24 is a schematic diagram 10 of distribution of a time-frequency resource according to this application.

Scenario 2: When the GB service exists in the first time-frequency resource, the communications apparatus needs to send the GF service on the third time-frequency resource. In this case, the GB service and the GF service may need to multiplex the uplink multiplexing transmission resource, and a priority of the GF service is similar to a priority of the GB service. Alternatively, when needing to simultaneously send the GF service and the GB service that have similar priorities, the communications apparatus may use some time-frequency resources in the first time-frequency resource as extended resources, and the extended resources are used to simultaneously send the GF service and the GB service. The extended resources may be time-frequency resources in the first time-frequency resource, other than the uplink multiplexing transmission resource and a time-frequency resource for sending only the GB (as shown in FIG. 24, a time-frequency resource located over the uplink multiplexing transmission resource and a time-frequency resource located below the uplink multiplexing transmission resource). In other words, the communications apparatus may use some resources in GB transmission resources to transmit the GF service.

In conclusion, a difference between Scenario 2 and Scenario 1 lies in that in Scenario 1, the GF service is sent on the third time-frequency resource, and in Scenario 2, the GF service is sent on the extended resource and the third time-frequency resource, that is, in Scenario 2, the GF service may be sent by using some first time-frequency resources.

For example, as shown in FIG. 24, the communications apparatus may transmit the GB service on the first time-frequency resource, and simultaneously send the GF service on the extended resource and the third time-frequency resource.

In Scenario 2, the communications apparatus further needs to determine, based on the following parameters, a parameter of the GF service transmitted on an extended resource.

For the GF service transmitted on the third time-frequency resource, the communications apparatus receives a parameter that is configured by the network device by using RRC or DCI and that is used for GF transmission, for example, a modulation and coding scheme (modulation and coding scheme, MCS), a transport block size (transport block size, TBS), and a quantity of times of repetition (repetition). A GF transmission parameter configured for the communications apparatus remains unchanged, that is, the GF transmission parameter is obtained based on a configured GF resource, and it is configured that the communications apparatus can transmit the GF service on the extended resource.

The communications apparatus transmits the GF service on the extended resource, and performs data encoding based on a quantity of resource elements (resource element, RE) of the extended resource. During encoding, the TBS remains unchanged, and the MCS may be variable. In other words, a configured MCS value may not be used, while on a GF transmission resource in a non-overlapping area, when the data coding is performed based on the quantity of REs of the GF transmission resource, the TBS and the MCS remain unchanged, that is, the configured MCS value. In this way, when receiving the GF service, the network device performs decoding in an overlapping time-frequency resource area based on the extended resource, and performs decoding i on the GF transmission resource in the non-overlapping area In Scenario 2, for use of the reference signal, by the communications apparatus, on the transmission resource that is on the second time-frequency resource or the multiplexing transmission resource and that is used to send the reference signal, descriptions of Case 1, Case 2, and Case 3 in Scenario 1 may be used.

However, a difference between Scenario 2 and Scenario 1 in Case 1 lies in that, Case 1 in Scenario 2 further includes: With reference to FIG. 16 and FIG. 10, when time-frequency resources used to send reference signals in the second time-frequency resource and the third time-frequency resource are aligned, in other words, when locations of the time-frequency resources used to send the reference signals in the second time-frequency resource and the third time-frequency resource are the same, mapping of the data sent on the first time-frequency resource and mapping of the data sent on the third time-frequency resource do not need to be changed.

A difference between Scenario 2 and Scenario 1 in Case 2 lies in that, Case 2 in Scenario 2 further includes: In FIG. 12, the time-frequency resources used to send the reference signals in the second time-frequency resource and the third time-frequency resource are aligned, that is, the locations of the time-frequency resources used to send the reference signals in the second time-frequency resource and the third time-frequency resource are different, therefore, when the data sent on the first time-frequency resource and the data sent on the third time-frequency resource are mapped, the time-frequency resources used to send the reference signals in the second time-frequency resource and the third time-frequency resource need to be considered, that is, during data mapping, the time-frequency resources used to send the reference signals in the second time-frequency resource and the third time-frequency resource need to be avoided before mapping. A specific mapping method is not limited.

A difference between Scenario 2 and Scenario 1 in Case 3 lies in that, Case 3 in Scenario 3 further includes: When the second time-frequency resource does not exist in the extended resource, a GF reference signal of the extended resource is used on an orthogonal frequency division multiplexing (Orthogonal Frequency Division Multiplexing, OFDM) symbol of a reference signal sent by the GF service on the third time-frequency resource. The extended GF reference signal means that an original reference signal of the GF is extended and mapped to the entire OFDM symbol. An extension manner of the GF reference signal is not limited. Therefore, the network device may perform channel estimation by using the extended GF reference signal, or may perform channel estimation by using the original reference signal of the GB service.

Figure 25:
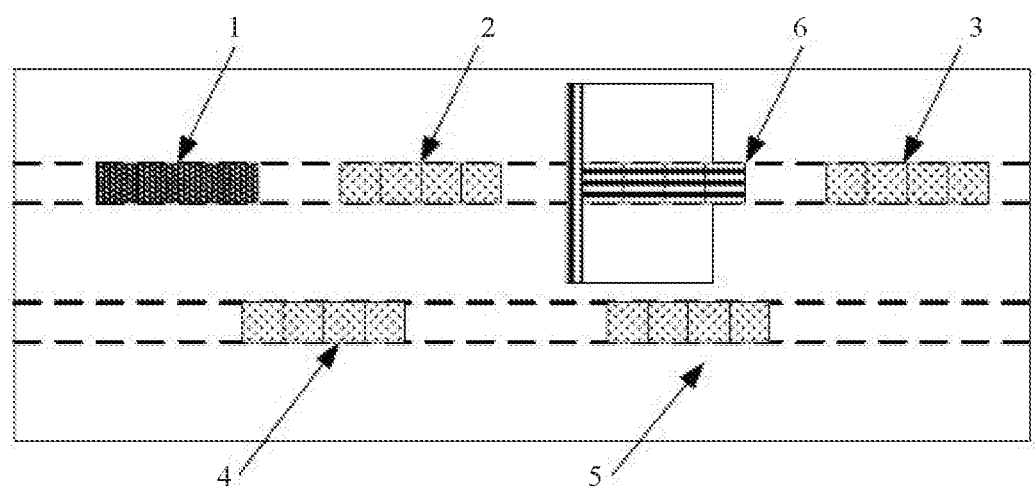
FIG. 25 is a schematic flowchart 11 of an uplink transmission method according to this application.

Scenario 3: As shown in FIG. 25, when the GB service exists in the first time-frequency resource, the communications apparatus needs to send the GF service on the third time-frequency resource. In this case, the GB service and the GF service may share an uplink multiplexing transmission resource. Therefore, when the priority of the GF service is higher than the priority of the GB service, the communications apparatus may interrupt the GB service transmitted on the time-frequency resource that is in the first time-frequency resource and that overlaps the uplink multiplexing transmission resource, and interrupt the GB service sent on the extended resource in the first time-frequency resource, and send the GF service on the third time-frequency resource. Alternatively, when the communications apparatus needs to simultaneously send the GB service and the GF service that have different priorities, if the priority of the GF service is higher than the priority of the GB service, the communications apparatus preferentially sends the GF service on the third time-frequency resource, and sends the GB service on a time-frequency resource in the first time-frequency resource, other than the extended resource and the uplink multiplexing transmission resource, that is, the GB service is interrupted on the extended resource and the uplink multiplexing transmission resource in the first time-frequency resource.

For example, as shown in FIG. 25, the communications apparatus sends the GF service on the third time-frequency resource, and sends the GB service on the time-frequency resource in the first time-frequency resource, other than the extended resource and the uplink multiplexing transmission resource.

Specifically, in Scenario 3, interruption of the GB service means that the communications apparatus interrupts all the GB data and the first reference signal that are sent on the extended resource and the uplink multiplexing transmission resource in the first time-frequency resource.

Figure 26:
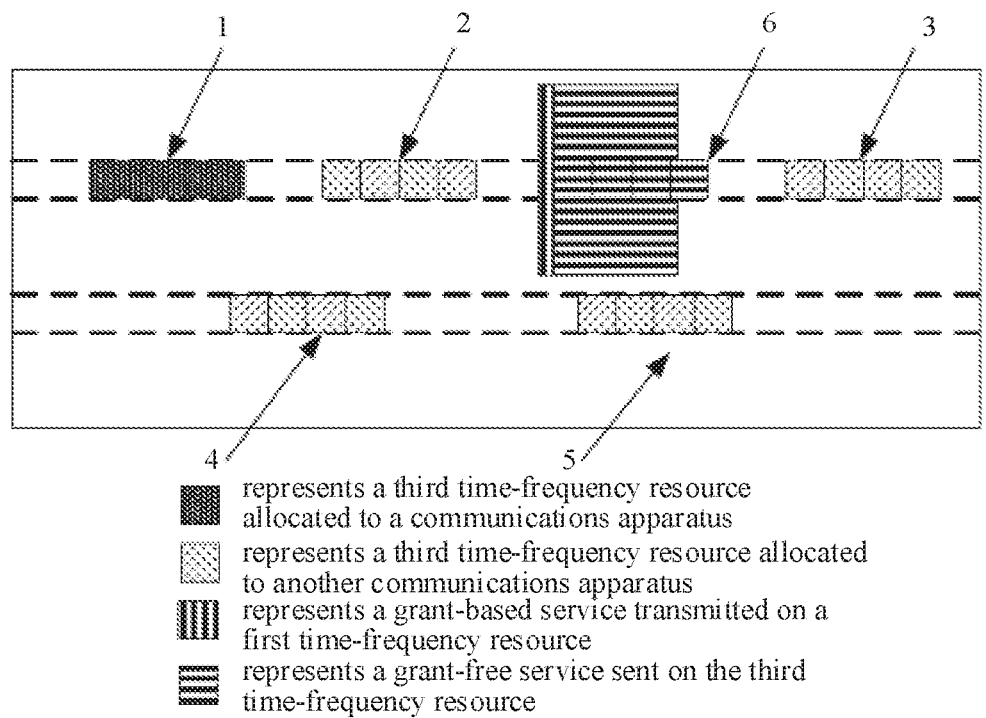
FIG. 26 is a schematic diagram 12 of distribution of a time-frequency resource according to this application.

Scenario 4: As shown in FIG. 26, when the GB service exists in the first time-frequency resource, or the communications apparatus needs to send the GB service on the first time-frequency resource, and the communications apparatus needs to send the GF service on the third time-frequency resource, because the GF service exists in the uplink multiplexing transmission resource, and if the priority of the GF service is higher than the priority of the GB service, the communications apparatus may use some time-frequency resources in the first time-frequency resource as extended resources, send the GF service on the extended resources and the third time-frequency resource, and send the GB service on the time-frequency resource in the first time-frequency resource, other than the extended resources and the uplink multiplexing transmission resource.

Specifically, in Scenario 4, for a manner in which the communications apparatus determines to send the GF service parameter, refer to the description in Scenario 2. Details are not described herein again in this application.

It may be learned by comparing FIG. 24 and FIG. 26 that, a difference between Scenario 4 and Scenario 2 lies in that: the GF service and the GB service are simultaneously sent on the extended resource in Scenario 2, while only the GF service is sent on the extended resource in Scenario 4, that is, the extended resource in Scenario 4 cannot be used to send the GB service.

It should be noted that, for the GB service, all data on the extended resource are interrupted, and the reference signal of the GB is interrupted on the third time-frequency resource.

Optionally, in Scenario 4, for a parameter that is of the GF service transmitted on the extended resource and that is determined by the communications apparatus, refer to descriptions in the foregoing embodiment. Details are not described herein again in this application.

In scenario 4, for the GB service, all data on the extended resource is interrupted, and the first reference signal sent on the second time-frequency resource is interrupted on the third time-frequency resource. Because only the GF service is sent on the extended resource, a data mapping location needs to be considered with reference to a relationship between the second time-frequency resource and the time-frequency resource that is in the third time-frequency resource and that is used to send the reference signal. Specifically, for use of the reference signal, by the communications apparatus, on the transmission resource that is on the second time-frequency resource or the multiplexing transmission resource and that is used to send the reference signal, descriptions of Case 1, Case 2, and Case 3 in Scenario 1 may be used.

Optionally, in Scenario 4, only the GF service is sent on the extended resource. As shown in FIG. 27, when sending, on the time-frequency resource that is in the second time-frequency resource and that does not overlap the third time-frequency resource, the reference signal generated based on the configuration information of the first reference signal, the communications apparatus may map the reference signal that is generated based on the configuration information of the first reference signal and that is sent on the time-frequency resource that is in the second time-frequency resource and that does not overlap the third time-frequency resource to a time-domain symbol location corresponding to the reference signal sent in the third time-frequency resource. In this case, during data mapping, the communications apparatus only needs to avoid a time domain symbol corresponding to a reference signal sent in the third time-frequency resource.

In the foregoing scenario 1 to scenario 4, an example in which the uplink multiplexing transmission resource is obtained by overlapping the third time-frequency resource (for example, a third time-frequency resource 6 in FIG. 26) allocated to the communications apparatus and the first time-frequency resource is used, with reference to Scenario 5 to Scenario 7, the following uses an example in which the uplink multiplexing transmission resource is obtained by overlapping the third time-frequency resource allocated to another communications apparatus and the first time-frequency resource.

Figure 28:
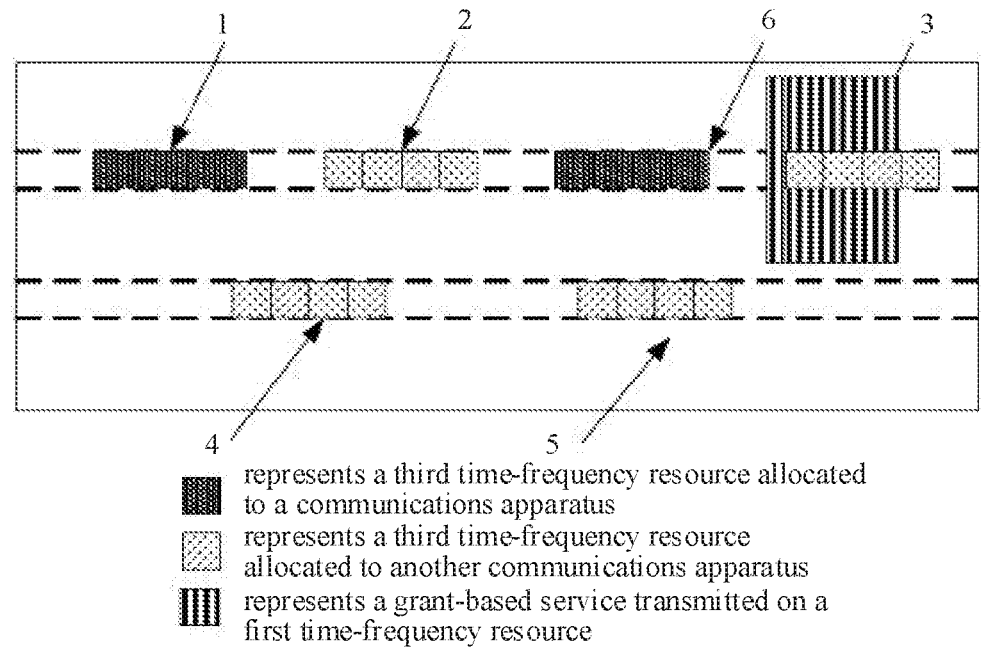
FIG. 28 is a schematic diagram 14 of distribution of a time-frequency resource according to this application.

Scenario 5: As shown in FIG. 28, the communications apparatus has the uplink multiplexing transmission resource, and the communications apparatus sends only the GB service. In this case, when sending the GB service, the communications apparatus may interrupt the GB service sent on the uplink multiplexing transmission resource in the first time-frequency resource, that is, the communications apparatus sends the GB service on a time-frequency resource in the first time-frequency resource, other than the uplink multiplexing transmission resource.

Herein, the GB service interrupted on the uplink multiplexing transmission resource includes GB data originally should be sent on the uplink multiplexing resource in the first time-frequency resource and the reference signal generated based on the configuration information of the first reference signal.

It may be understood that a reference signal that is transmitted on a time-frequency resource in the first time-frequency resource, other than the uplink multiplexing transmission resource and that is generated based on the configuration information of the first reference signal remains unchanged.

Herein, the communications apparatus may interrupt, in a rate-matching (rate-matching) manner or in a direct interruption manner, the GB service sent on the uplink multiplexing transmission resource.

In Scenario 5, the third time-frequency resource that overlaps the first time-frequency resource is allocated to another communications apparatus. Because the communications apparatus does not ensure whether the another communications apparatus sends uplink transmission on a third time-frequency resource 3, both the GB data and the reference signal that are sent on the time-frequency resource that is in the first time-frequency resource and that overlaps the third time-frequency resource 3 are interrupted, that is, the communications apparatus sends, on the time-frequency resource in the first time-frequency resource, other than the uplink multiplexing transmission resource, the GB data and the reference signal generated based on the configuration information of the first reference signal.

Specifically, the communications apparatus sends the GB data on a time-frequency resource that is in the first time-frequency resource, other than an uplink multiplexing transmission resource and a time-frequency resource of the reference signal generated based on the configuration information of the first reference signal, the communications apparatus sends, on a time-frequency resource, in the second time-frequency resource, other than the time-frequency resource that overlaps the third time-frequency resource, the reference signal generated based on the configuration information of the first reference signal, where the reference signal that is generated based on the configuration information of the first reference signal and that is sent on the time-frequency resource that is in the second time-frequency resource and that overlaps the third time-frequency resource is interrupted.

Scenario 6: The communications apparatus has the uplink multiplexing transmission resource, and the communications apparatus sends only the GB service. A difference between Scenario 6 and Scenario 5 lies in that, in Scenario 6, when sending the GB service, the communications apparatus may interrupt the GB data sent on the time-frequency resource that is in the first time-frequency resource and that overlaps the uplink multiplexing transmission resource, that is, the communications apparatus sends the GB data on a time-frequency resource that can be used to send the GB data and that is in the first time-frequency resource, other than the uplink multiplexing transmission resource. For the reference signal sent by the communications apparatus on an overlapping time-frequency resource of the second time-frequency resource and the uplink multiplexing transmission resource, descriptions of Case 1 and Case 2 in Scenario 1 are used. Details are not described herein again in this application.

Figure 29:
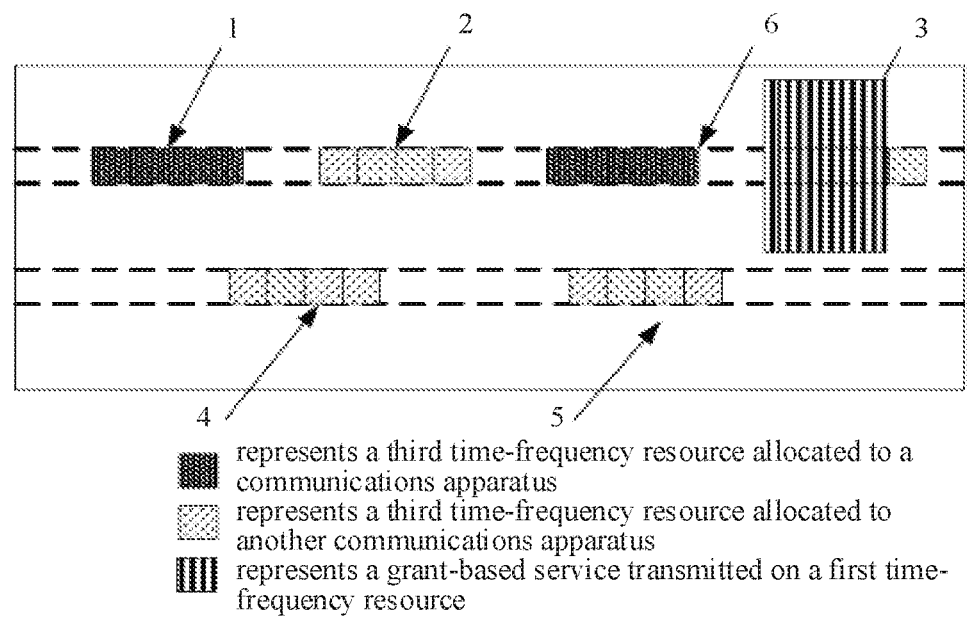
FIG. 29 is a schematic diagram 15 of distribution of a time-frequency resource according to this application.

Scenario 7: As shown in FIG. 29, the communications apparatus has the uplink multiplexing transmission resource. The uplink multiplexing transmission resource is obtained by overlapping the first time-frequency resource and the third time-frequency resource (for example, a third time-frequency resource 3 in FIG. 29) allocated to another communications apparatus. The communications apparatus sends only the GB service, and the communications apparatus does not interrupt the GB service transmitted on the uplink multiplexing transmission resource in the first time-frequency resource, that is, the communications apparatus sends the GB service on the first time-frequency resource. In this case, the communications apparatus may process, by using descriptions in Case 1 and Case 2 in the foregoing Scenario 1, the reference signal sent on the overlapping time-frequency resource of the second time-frequency resource and the uplink multiplexing transmission resource. Details are not described herein in this application.

Figure 30:
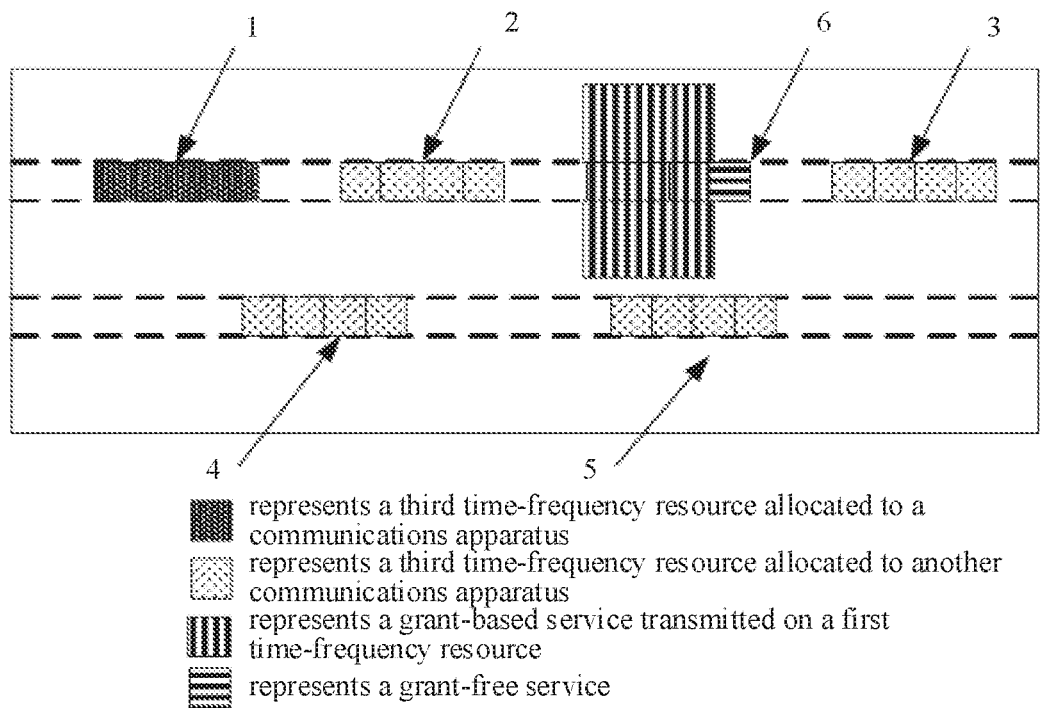
FIG. 30 is a schematic diagram 16 of distribution of a time-frequency resource according to this application.

Scenario 8: As shown in FIG. 30, the communications apparatus has the uplink multiplexing transmission resource (for example, obtained by overlapping the first time-frequency resource and a third time-frequency resource 6 in FIG. 30), and a priority of a GB service is higher than a priority of a GF service. When sending the GB service, the communications apparatus determines that the GF service arrives. Because the priority of the GB service is higher than the priority of the GF service, the communications apparatus interrupts the GF service sent on the uplink multiplexing transmission resource in the third time-frequency resource, that is, the communications apparatus sends the GB service on the first time-frequency resource, and sends the GF service on a time-frequency resource in the third time-frequency resource, other than the uplink multiplexing transmission resource.

Based on the foregoing descriptions, the communications apparatus needs to perform corresponding processing on the reference signal sent on a time-frequency resource that is in the second time-frequency resource and that overlaps the uplink multiplexing transmission resource, to avoid interference caused by the GB service to the GF service. Specifically, the communications apparatus may process, by using the descriptions in Case 1 and Case 2 in the foregoing scenario 1, the reference signal sent on the time-frequency resource that is in the second time-frequency resource and that overlaps the uplink multiplexing transmission resource. Details are not described herein again in this application.

Herein, interrupting the GF service transmitted on the uplink multiplexing transmission resource refers to interrupting GF data transmitted on the uplink multiplexing transmission resource.

Optionally, the communications apparatus interrupts, on the uplink multiplexing transmission resource, the GF data originally sent on the third time-frequency resource 6, and whether the GF service is transmitted on a time-frequency resource in the third time-frequency resource, other than the uplink multiplexing transmission resource is determined based on a version (RV) and a repetition K value of the GF service.

Figure 31:
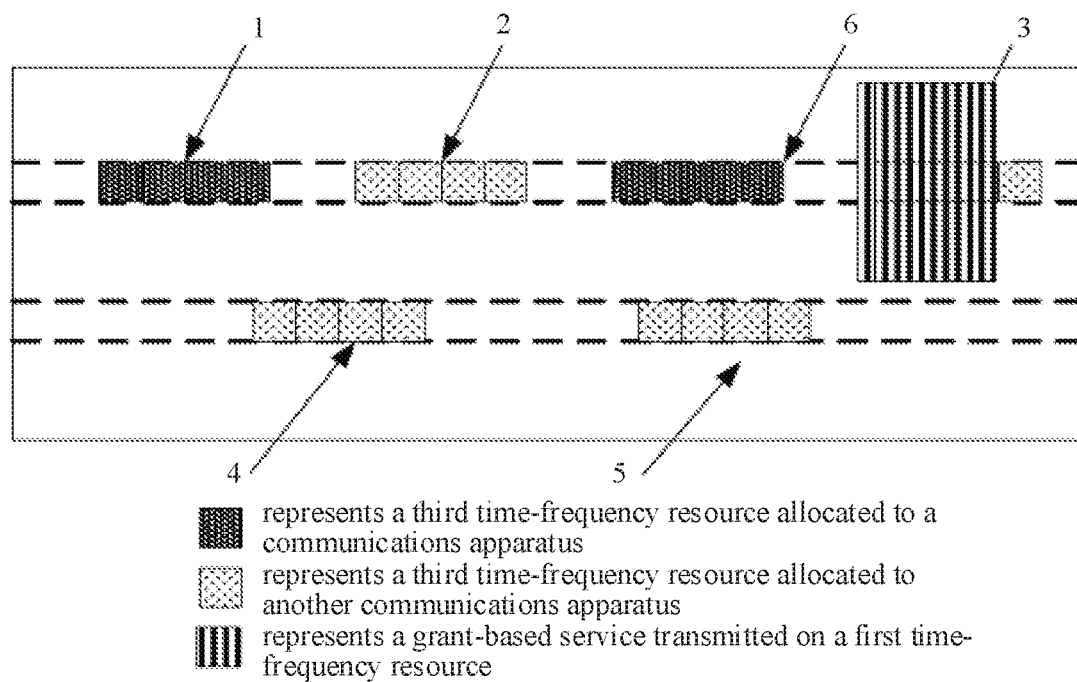
FIG. 31 is a schematic diagram 17 of distribution of a time-frequency resource according to this application.

Scenario 9: As shown in FIG. 31, a communications apparatus has an uplink multiplexing transmission resource (the uplink multiplexing transmission resource in Scenario 9 is obtained by overlapping a first time-frequency resource and a third time-frequency resource allocated to another communications apparatus), a priority of a GB service is higher than a priority of a GF service, and the communications apparatus sends only the GB service, the communications apparatus does not ensure whether the GF service of the another communications apparatus exists on the third time-frequency resource allocated to the another communications apparatus. Therefore, the communications apparatus may transmit the GB service on the third time-frequency resource allocated to the another communications apparatus, that is, the communications apparatus transmits the GB service on the first time-frequency resource. Therefore, to avoid interference caused by the GB service transmitted on the uplink multiplexing transmission resource to the another communications apparatus, the communications apparatus may process, by using the descriptions in Case 1 and Case 2 in the foregoing scenario 1, the reference signal sent on the time-frequency resource that is in the second time-frequency resource and that overlaps the uplink multiplexing transmission resource. Details are not described herein again in this application.

Currently, the NR supports one reference signal to use one OFDM symbol and two OFDM symbols. Therefore, in the foregoing embodiments, the reference signal generated based on the configuration information of the first reference signal and the reference signal sent in the third time-frequency resource use a same quantity of OFDM symbols. For example, the quantity of the OFDM symbols of the reference signal generated based on the configuration information of the first reference signal is one, the quantity of the OFDM symbols used by the reference signal sent in the third time-frequency resource is also one.

Scenario 10: The reference signal generated based on the configuration information of the first reference signal and the reference signal sent in the third time-frequency resource use different quantities of the OFDM symbols.

Figure 32:
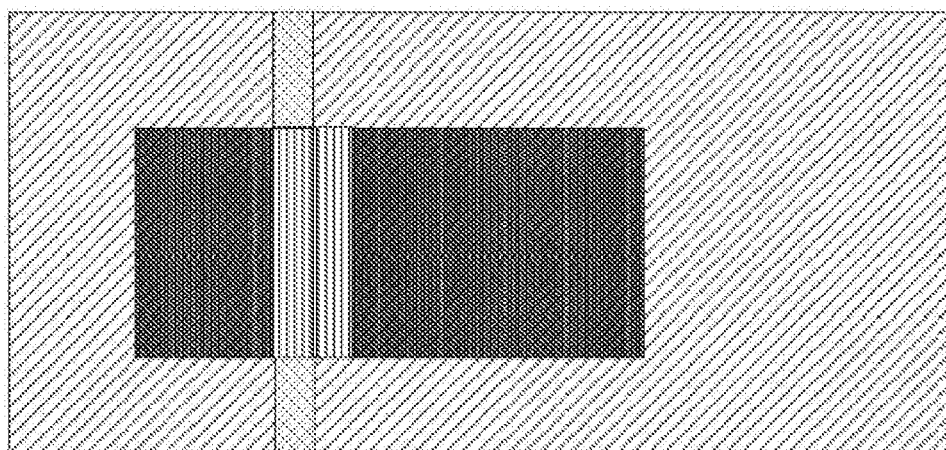
FIG. 32 is a schematic diagram 18 of distribution of a time-frequency resource according to this application.

Case 4: As shown in FIG. 32, when a quantity of symbols of the reference signal generated based on the configuration information of the first reference signal is less than a quantity of symbols of the reference signal sent in the third time-frequency resource, the communications apparatus interrupts a reference signal that is generated based on the configuration information of the first reference signal and that is sent on a time-frequency resource that is in the second time-frequency resource and that overlaps an uplink multiplexing transmission resource; and sends, on the time-frequency resource that is in the second time-frequency resource and that overlaps the uplink multiplexing transmission resource, the reference signal generated based on the configuration information of the second reference signal. In this case, a quantity of OFDM symbols of the reference signal generated based on the configuration information of the second reference signal is the same as a quantity of symbols of the reference signal sent in the third time-frequency resource.

Specifically, in FIG. 32, an example in which the quantity of symbols of the reference signal generated based on the configuration information of the first reference signal is one is used, and an example in which the quantity of symbols of the reference signal generated based on the configuration information of the second reference signal is two is used.

In the scenario shown in FIG. 32, when the communications apparatus sends GB data on the uplink multiplexing transmission resource, and if in the uplink multiplexing transmission resource, there is a time-frequency resource in which a reference signal corresponding to the GF service is located, the communications apparatus interrupts the GB data sent on the time-frequency resource in which the reference signal corresponding to the GF service is located in the uplink multiplexing transmission resource.

Optionally, the GB data may be mapped and transmitted on the uplink multiplexing transmission resource in a rate-matching (rate-matching) manner.

It should be noted that FIG. 32 is merely used to describe a case in which the quantity of symbols of the reference signal generated based on the configuration information of the first reference signal is less than the quantity of symbols of the reference signal sent in the third time-frequency resource, and whether starting locations of reference signals are aligned is not limited.

Figure 33:
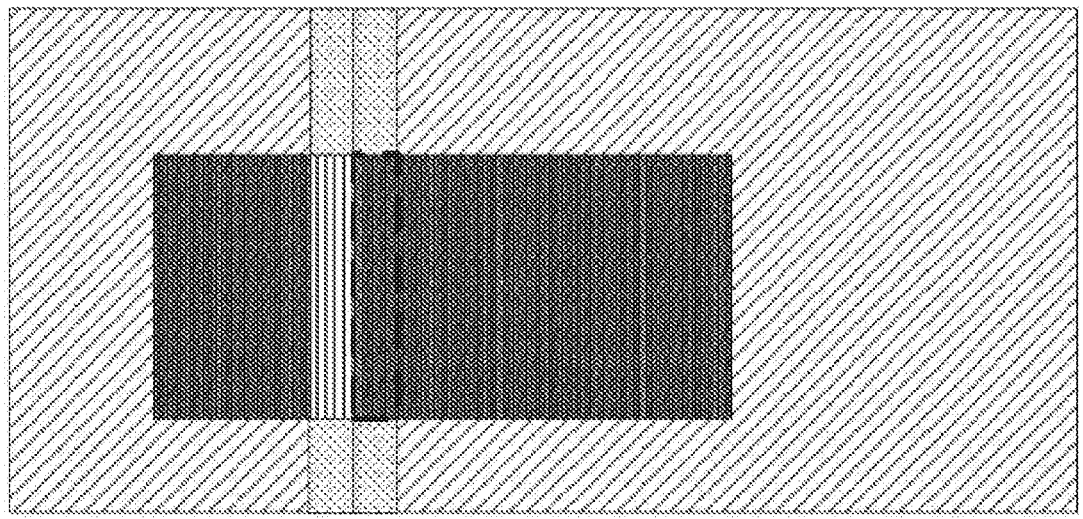
FIG. 33 is a schematic diagram 19 of distribution of a time-frequency resource according to this application.

Case 5: As shown in FIG. 33, when a quantity of OFDM symbols of a reference signal that is sent in the first time-frequency resource and that is generated based on configuration information of the first reference signal is greater than a quantity of symbols of a reference signal sent in the third time-frequency resource, the communications apparatus interrupts a reference signal that is sent on a time-frequency resource that is in the second time-frequency resource and that overlaps an uplink multiplexing transmission resource and that is generated based on the configuration information of the first reference signal; and the communications apparatus sends, on the time-frequency resource that is in the second time-frequency resource and that overlaps the uplink multiplexing transmission resource, the reference signal generated based on the configuration information of the second reference signal, where a quantity of OFDM symbols used by the reference signal generated based on the configuration information of the second reference signal is the same as a quantity of symbols of a reference signal sent in the third time-frequency resource.

In this case, when the communications apparatus sends data on the uplink multiplexing transmission resource, because a quantity of symbols used by the reference signal generated based on the configuration information of the second reference signal is reduced, a vacant OFDM symbol location (a time-frequency resource on which GF data is located) of the reference signal generated based on the configuration information of the first reference signal is not mapped. Optionally, the GB data may be mapped and transmitted on the uplink multiplexing transmission resource in a rate-matching (rate-matching) manner.

It should be noted that in Scenario 1 to Scenario 10 in this application, a numerology of the first time-frequency resource is consistent with a numerology of the third time-frequency resource.

Figure 34:
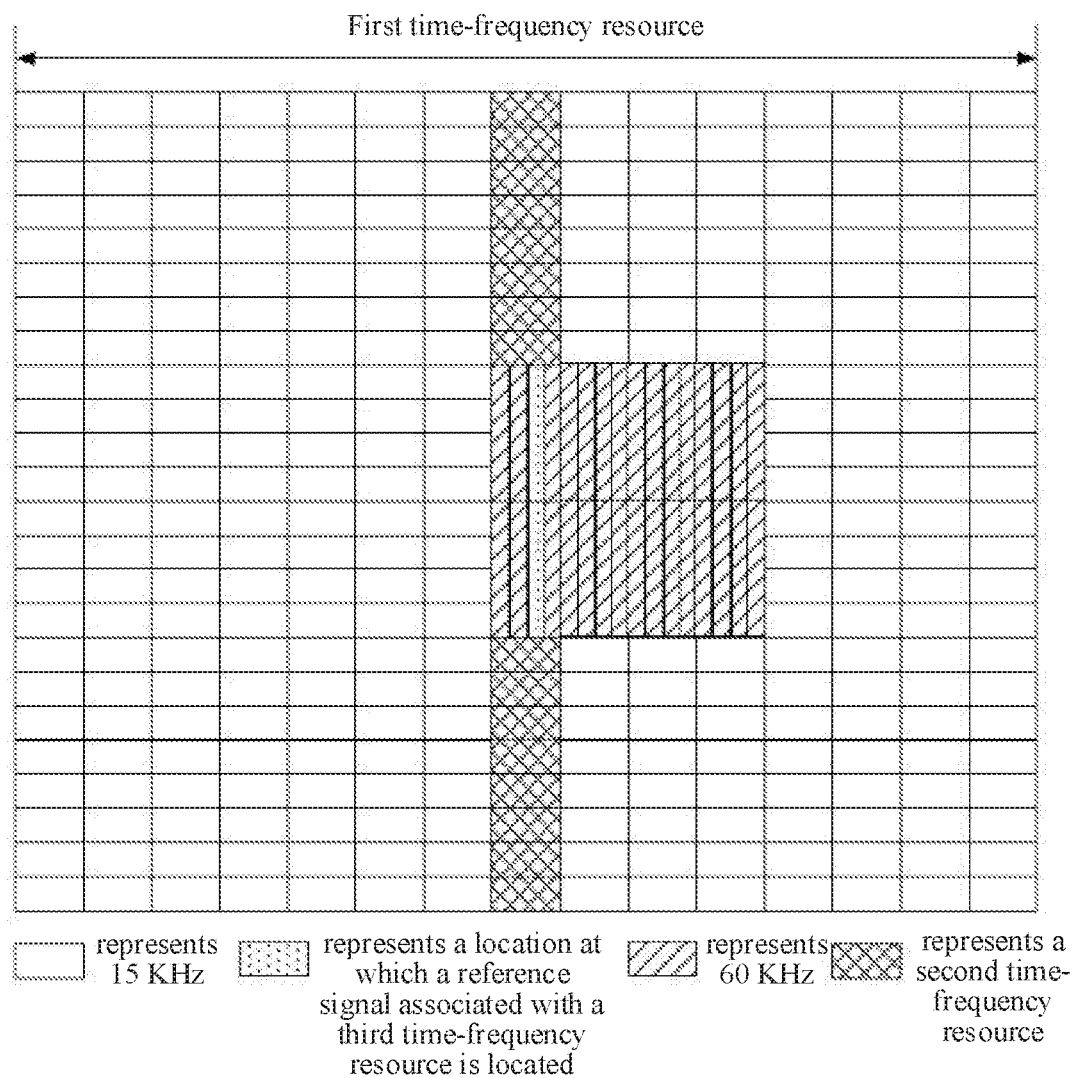
FIG. 34 is a schematic diagram 20 of distribution of a time-frequency resource according to this application.

Scenario 11: An example in which the numerology of the first time-frequency resource is inconsistent with the numerology of the third time-frequency resource is used. The communications apparatus determines that the numerology of the third time-frequency resource configured by using RRC is different from the numerology of the first time-frequency resource, and an example in which the numerology of the third time-frequency resource uses a subcarrier spacing of 60 KHz, and the numerology of the first time-frequency resource uses a subcarrier spacing of 15 kHz is used. A resource of an uplink multiplexing area is shown in FIG. 34.

As shown in FIG. 20, when the second time-frequency resource is located outside the third time-frequency resource, the reference signal that is sent in the second time-frequency resource and that is generated based on the configuration information of the first reference signal remains unchanged, the communications apparatus sends, on the time-frequency resource that is in the third time-frequency resource and that sends the reference signal, the reference signal generated based on the configuration information of the second reference signal.

Alternatively, the communications apparatus sends no signal on the time-frequency resource that is in the third time-frequency resource and that sends the reference signal.

As shown in FIG. 12, the reference signal that is sent in the second time-frequency resource and that is generated based on the configuration information of the first reference signal is interrupted on a time-frequency resource that is in the third time-frequency resource and that sends GF data, and the communications apparatus sends, on the time-frequency resource that is in the third time-frequency resource and that is used to send the reference signal, the reference signal generated based on the configuration information of the second reference signal.

Because a width of an OFDM symbol of the reference signal generated based on the configuration information of the first reference signal is different from a width of an OFDM symbol of the reference signal sent in the third time-frequency resource, for a data mapping processing solution, refer to the processing manner in Scenario 10 in this embodiment of the present invention. Details are not described herein again in this application.

Optionally, in this application, when performing uplink transmission based on control information, the communications apparatus performs the uplink transmission on an overlapping time-frequency resource by using a configuration parameter numerology corresponding to the third time-frequency resource.

Optionally, on the overlapping time-frequency resource of the first time-frequency resource and the third time-frequency resource, the communications apparatus sends, by using a frequency resource corresponding to the first time-frequency resource, uplink data and/or a reference signal to be sent on a frequency resource corresponding to the third time-frequency resource.

In another embodiment of this application, the uplink transmission method provided in this application includes the following steps.

S201: A communications apparatus obtains control information used for uplink transmission with dynamic scheduling, and the control information includes configuration information of a first time-frequency resource used for uplink transmission.

S202: The communications apparatus obtains semi-statically configured resource configuration information used for the uplink transmission, and the resource configuration information includes configuration information of a second time-frequency resource used for the uplink transmission.

S203: When the uplink data is sent based on the resource configuration information, send the uplink data on an overlapping time domain resource of the second time-frequency resource and the first time-frequency resource by using a frequency domain resource corresponding to the first time-frequency resource.

Optionally, the method provided in this application includes: when performing the uplink transmission based on the control information, interrupting, by the communications apparatus, on the overlapping time domain resource of the second time-frequency resource and the first time-frequency resource, the uplink transmission performed based on the control information.

Optionally, the method provided in this application includes: sending, on a time-frequency resource in the second time-frequency resource, other than the overlapping time-frequency resource, the uplink data based on the resource configuration information.

The foregoing mainly describes the solutions provided in the embodiments of this application from a perspective of interaction between network elements. It may be understood that to implement the foregoing functions, each network element, for example, the communications apparatus, includes a corresponding hardware structure and/or software module for performing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function modules based on the foregoing method examples. For example, function modules may be divided by using corresponding functions, or two or more functions may be integrated into one processing module. The integrated module may be implemented in a form of hardware, or may be implemented in a form of a software function module. It should be noted that, in the embodiments of this application, module division is exemplary, and is merely a logical function division. In actual implementation, another division manner may be used. The following description is made by using an example in which function modules are divided by using corresponding functions.

Figure 35:
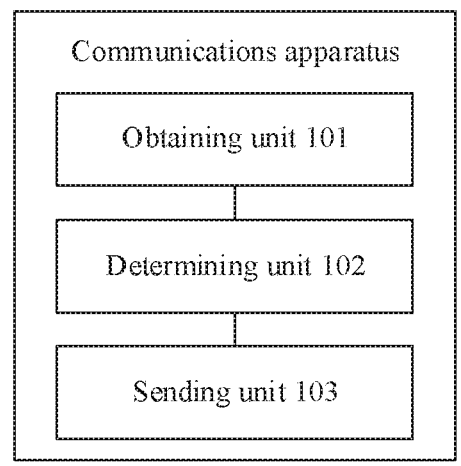
FIG. 35 is a schematic structural diagram of a communications apparatus according to this application.

When an integrated unit is used. FIG. 35 is a possible schematic structural diagram of a communications apparatus in the foregoing embodiments. The communications apparatus includes an obtaining unit 101, a determining unit 102, and a sending unit 103. The obtaining unit 101 is configured to support the communications apparatus to perform steps S101 and S103 in the foregoing embodiment, the determining unit 102 is configured to support the communications apparatus to perform step S102 in the foregoing embodiment, and the sending unit 103 is configured to support the communications apparatus to perform S104, S105, S1041, S1042, S1043, S1044, S1045, S1046, S106, S107, and S108 in the foregoing embodiment. All related content of the steps in the foregoing method embodiments may be cited in function descriptions of the corresponding function modules. Details are not described herein again.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. In addition, such units may be integrated together or may be individually implemented. The processing element may be an integrated circuit and has a signal processing capability. In an implementation process, steps in the foregoing methods or the foregoing units may be implemented by using a hardware integrated logic circuit in the processor element, or may be implemented in a form in which the processing element invokes software.

In an example, the foregoing units in any apparatus may be one or more integrated circuits configured to implement the foregoing method, for example, one or more application-specific integrated circuits (Application Specific Integrated Circuit, ASIC), one or more microprocessors (digital signal processor, DSP), or one or more field programmable gate arrays (Field Programmable Gate Array, FPGA). For another example, when the units in the apparatus may be implemented in a form in which a processing element schedules a program, the processing element may be a general purpose processor, for example, a central processing unit (Central Processing Unit, CPU) or another processor that can invoke the program. For another example, the units may be integrated together and implemented in a form of a system-on-a-chip (system-on-a-chip, SOC).

The foregoing receiving unit (or a unit configured for receiving) is an interface circuit of the apparatus, configured to receive a signal from another apparatus. For example, when the apparatus is implemented in a manner of a chip, the receiving unit is an interface circuit that is of the chip and that is configured to receive a signal from another chip or apparatus. The foregoing sending unit (or a unit configured for sending) is an interface circuit of the apparatus, configured to send a signal to another apparatus. For example, when the apparatus is implemented in the manner of the chip, the sending unit is an interface circuit that is of the chip and that is configured to send a signal from another chip or apparatus.

Figure 36:
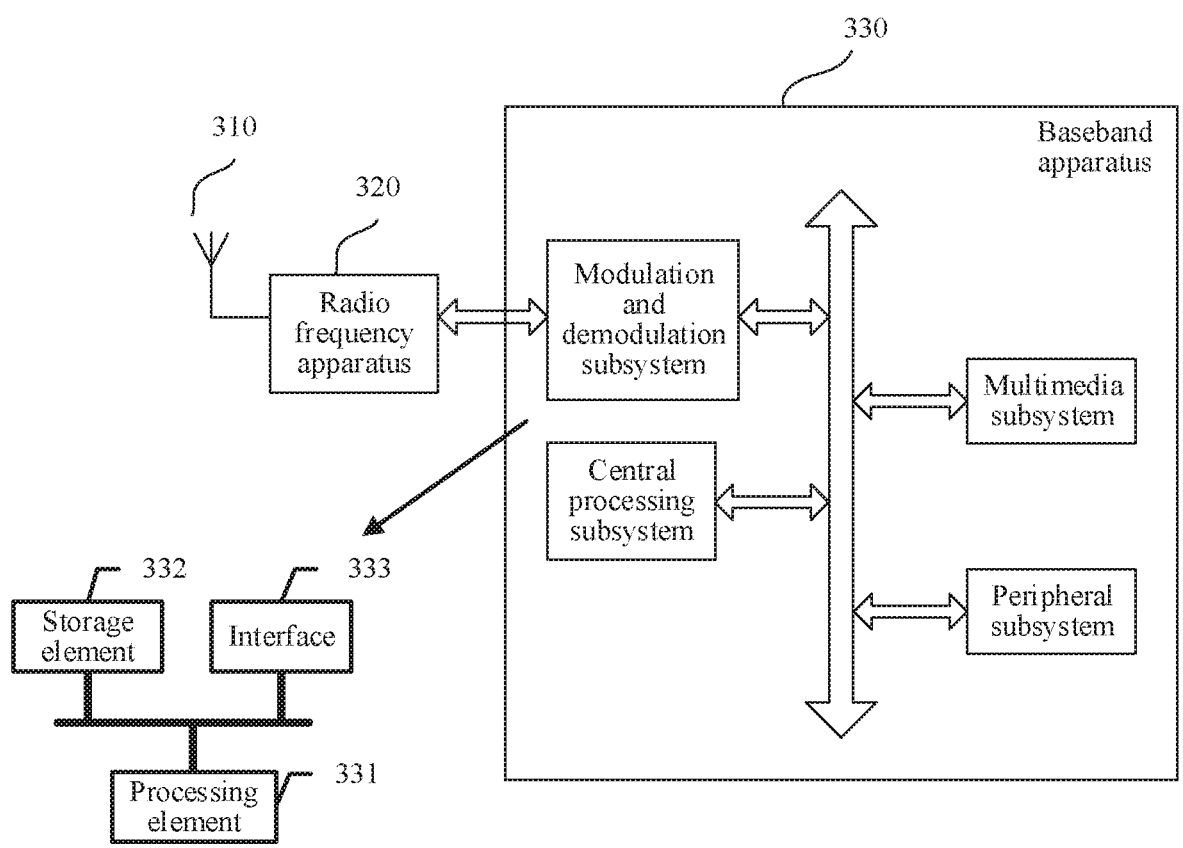
FIG. 36 is a schematic structural diagram of a terminal device according to this application.

FIG. 36 is a schematic structural diagram of a terminal device according to an embodiment of this application. The terminal device may be the communications apparatus in the foregoing embodiments, and is configured to implement operations of the communications apparatus in the foregoing embodiments. As shown in FIG. 35, the terminal device includes an antenna 310, a radio frequency apparatus 320, and a baseband apparatus 330. The antenna 310 is connected to the radio frequency apparatus 320. In a downlink direction, the radio frequency apparatus 320 receives, by using the antenna 310, information sent by a network device, and sends, to the baseband apparatus 330, the information sent by the network device for processing. In an uplink direction, the baseband apparatus 330 processes information about the terminal, and sends the information to the radio frequency apparatus 320. After processing the information of the terminal device, the radio frequency apparatus 320 sends the information to the network device by using the antenna 310.

The baseband apparatus 330 may include a modulation and demodulation subsystem, configured to implement processing performed on each communications protocol layer of data. The baseband apparatus 330 may further include a central processing subsystem, configured to implement processing performed on an operating system and an application layer of the terminal. In addition, the baseband apparatus 330 may further include another subsystem, for example, a multimedia subsystem or a peripheral subsystem. The multimedia subsystem is configured to control a camera, a screen display, and the like of the terminal device, and the peripheral subsystem is configured to connect to another device. The modulation and demodulation subsystem may be a separately disposed chip. Optionally, the foregoing communications apparatus may be implemented on the modulation and demodulation subsystem.

In an implementation, the units in the communications apparatus shown in FIG. 36 are implemented in a form in which a processing element schedules a program, for example, a subsystem of the baseband apparatus 330 such as the modulation and demodulation subsystem. The modulation and demodulation subsystem includes a processing element 331 and a storage element 332. The processing element 331 invokes the program stored in the storage element 332, to perform the method performed by the terminal in the foregoing method embodiments. In addition, the baseband apparatus 330 may further include an interface 333, configured to exchange information with the radio frequency apparatus 320. Specifically, the processing element 331 is configured to perform step S102 in the foregoing embodiment. The interface 333 is configured to perform the step of receiving or sending data/signaling on a side of the communications apparatus in the foregoing embodiment, for example, S101, S103, S104, S105, S1041, S1042, S1043, S1044, S1045, S1046, S106, S107, and S108.

In another implementation, the units shown in FIG. 35 may be one or more processing elements configured to implement the foregoing method performed by the terminal device. The processing elements are disposed on a subsystem of the baseband apparatus 330, for example, the modulation and demodulation subsystem. The processing elements herein may be integrated circuits, for example, one or more ASICs, one or more DSPs, or one or more FPGAs. The integrated circuits may be integrated together to form a chip.

For example, the units shown in FIG. 35 may be integrated together and implemented in a system-on-a-chip (system-on-a-chip, SOC) form. For example, the baseband apparatus 330 includes an SOC chip, configured to implement the foregoing method. The processing element 331 and the storage element 332 may be integrated in the chip, and the method performed by the foregoing terminal or the function of each unit shown in FIG. 35 is implemented in a form in which the processing element 331 invokes the program stored in the storage element 332; or at least one integrated circuit is integrated in the chip, and the at least one integrated circuit is configured to implement the method performed by the foregoing communications apparatus or the function of each unit shown in FIG. 35; or with reference to the foregoing implementations, functions of some units may be implemented in a form in which the processing element invokes the program, and functions of some units are implemented in an integrated circuit form.

In conclusion, the foregoing communications apparatus configured for the terminal device includes at least one processing element and a storage element. The at least one processing element is configured to perform the method that is performed by the communications apparatus and that is provided by the foregoing method embodiments. The processing element may perform, in a first manner, namely, in a manner of executing a program stored in the storage element, some or all of the steps performed by the terminal device in the foregoing method embodiment, or may perform, in a second manner, namely, in a manner of combining an integrated logical circuit of hardware in the processing element with an instruction, some or all of the steps performed by the terminal in the foregoing method embodiment, or certainly may perform, with reference to the first manner and the second manner, some or all of the steps performed by the terminal in the foregoing method embodiment.

As described above, the processing element herein may be a general purpose processor, for example, a central processing unit (central processing unit, CPU), or may be one or more integrated circuits configured to implement the foregoing method, for example, one or more application-specific integrated circuits (application specific integrated circuit, ASIC), one or more microprocessors (digital signal processor, DSP), or one or more field programmable gate arrays (field programmable gate array, FPGA).

The storage element may be a memory, or may be a general name of a plurality of storage elements.

Figure 37:
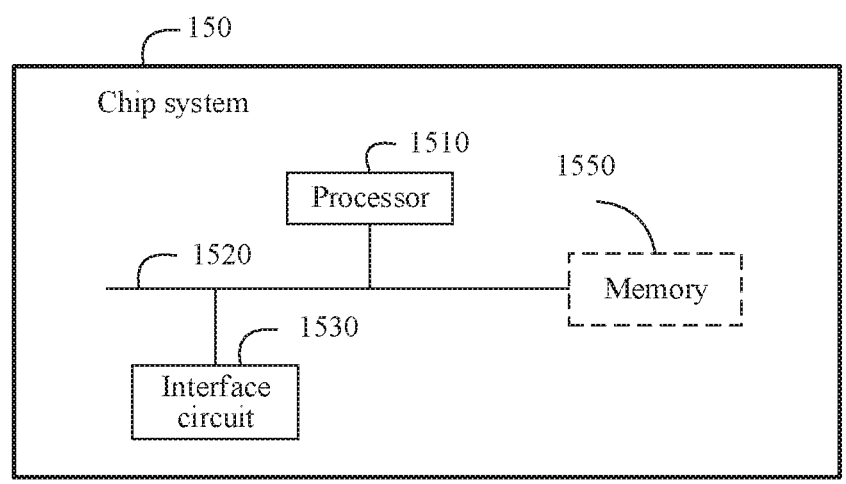
FIG. 37 is a schematic structural diagram of a chip system according to this application.

FIG. 37 is a schematic structural diagram of a chip system 150 according to an embodiment of the present invention.

The chip system 150 may be applied to the terminal device shown in FIG. 2. The chip system 150 includes at least one processor 1510 and an interface circuit 1530.

Optionally, the chip system 150 further includes a memory 1550. The memory 1550 may include a read-only memory and a random access memory, and provides an operation instruction and data for the processor 1510. Apart of the memory 1550 may further include a non-volatile random access memory (NVRAM).

In some implementations, the memory 1550 stores the following elements: an executable module or a data structure, or a subset thereof, or an extended set thereof.

In this embodiment of the present invention, a corresponding operation is executed by invoking the operation instruction (the operation instruction may be stored in an operating system) stored in the memory 1550.

The processor 1510 controls an operation of the terminal device, and the processor 1510 may also be referred to as a central processing unit (Central Processing Unit, CPU). The memory 1550 may include a read-only memory and a random access memory, and provide an instruction and data to the processor 1510. A part of the memory 1550 may further include an NVRAM. In specific application, the memory 1550, the interface circuit 1530, and the memory 1510 are coupled together by using a bus system 1520, and in addition to a data bus, the bus system 1520 may further include a power supply bus, a control bus, a state signal bus, and the like. However, for clear description, various types of buses in FIG. 37 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in a form of software. The processor 1510 may be a general purpose processor, a digital signal processor (digital signal processor, DSP), an application-specific integrated circuit (application specific integrated circuit, ASIC), a field-programmable gate array (field-programmable gate array, FPGA) or another programmable logical device, a discrete gate or transistor logic device, or a discrete hardware component. The processor 1510 may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and sofhvare modules in the decoding processor. A software module may be located in a mature storage medium in the art, such as a random access memory, a flash memory, a read-only memory, a programmable read-only memory, an electrically erasable programmable memory, or a register. The storage medium is located in the memory 1550, and a processor 1510 reads information in the memory 1550 and completes the steps in the foregoing methods in combination with hardware of the processor.

Optionally, the interface circuit 1530 is configured to perform receiving and sending steps of the communications apparatus in the embodiments shown in FIG. 5, FIG. 9, FIG. 11, FIG. 13, FIG. 14, FIG. 15, FIG. 17, FIG. 18, and FIG. 19.

The processor 1510 is configured to perform processing steps of the communications apparatus in the embodiments shown in FIG. 5, FIG. 9, FIG. 11, FIG. 13, FIG. 14, FIG. 15, FIG. 17, FIG. 18, and FIG. 19.

In the foregoing embodiments, the instruction that is stored in the memory and that is to be executed by the processor may be implemented in a form of a computer program product. The computer program product may be written in the memory in advance, or may be downloaded and installed in the memory in a form of software.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive solid state disk, SSD), or the like.

According to one aspect, a computer storage medium is provided, the computer readable storage medium stores an instruction, and when the instruction is run, the communications apparatus is enabled to perform S101, S102, S103, S104, S105, S1041, S1042, S1043, S1044, S1045, S1046, S106, S107, and S108 in the embodiments, and/or configured for another process performed by the communications apparatus in the technology described in this specification.

According to one aspect, a computer program product including an instruction is provided, the computer program product stores an instruction, and when the instruction is run, the communications apparatus is enabled to perform S101, S102, S103, S104, S105, S1041, S1042, S1043, S1044, S1045, S1046, S106, S107, and S108 in the embodiments, and/or configured for another process performed by the communications apparatus in the technology described in this specification.

According to one aspect, a chip system is provided, the chip system is applied to a terminal device, the chip system includes at least one processor and an interface circuit, the interface circuit is connected to the at least one processor by using a line, and the processor is configured to run an instruction, to perform S101, S102, S103, S104, S105, S1041, S1042, S1043, S1044, S1045, S1046, S106, S107, and S108 in the embodiments, and/or configured for another process performed by the communications apparatus in the technology described in this specification.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory. RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink transmission method, wherein the method comprises:
  obtaining, by a communications apparatus, control information useable for uplink transmission with dynamic scheduling, wherein the control information comprises information about a first time-frequency resource allocated to the uplink transmission and configuration information of a first reference signal useable for the uplink transmission;

determining, by the communications apparatus based on the information about the first time-frequency resource allocated to the uplink transmission and the configuration information of the first reference signal useable for the uplink transmission, a second time-frequency resource useable to send the first reference signal;

obtaining, by the communications apparatus, first information of a semi-statically configured resource useable for the uplink transmission, wherein the semi-statically configured resource comprises a time-frequency resource; and in response to performing the uplink transmission based on the control information, sending, by the communications apparatus on an overlapping time-frequency resource of the second time-frequency resource and a third time-frequency resource, a reference signal generated based on configuration information of a second reference signal or failing to send a signal, wherein the third time-frequency resource is a semi-statically configured time-frequency resource that is useable for the uplink transmission and that is determined by the communications apparatus based on the first information.

2. The transmission method according to claim 1, wherein the method further comprises:

sending, by the communications apparatus on a fourth time-frequency resource in the second time-frequency resource, a reference signal generated based on the configuration information of the first reference signal, wherein an intersection set between a frequency resource of the fourth time-frequency resource and a frequency resource of the overlapping time-frequency resource is empty, and a union set of the frequency resource of the fourth time-frequency resource and the frequency resource of the overlapping time-frequency resource is a frequency resource of the second time-frequency resource.

3. The transmission method according to claim 1, wherein an intersection set between the overlapping time-frequency resource and a time-frequency resource that is in the third time-frequency resource and that is useable to send the reference signal is an empty set; and correspondingly, in response to performing the uplink transmission based on the control information, the communications apparatus fails to send a signal on the overlapping time-frequency resource.

4. The transmission method according to claim 3, wherein the method further comprises:

in response to skipping sending a semi-statically configured reference signal on the time-frequency resource that is in the third time-frequency resource and that is useable to send the reference signal, and in response to performing the uplink transmission based on the control information, sending, by the communications apparatus on a time-frequency resource that is in the first time-frequency resource and that overlaps the time-frequency resource that is in the third time-frequency resource and that is useable to send the reference signal, the reference signal generated based on the configuration information of the second reference signal, wherein the semi-statically configured reference signal is the reference signal useable for transmission on the third time-frequency resource.

5. The transmission method according to claim 1, wherein the method further comprises:

in response to sending a semi-statically configured reference signal on the time-frequency resource that is in the third time-frequency resource and that is useable to send the reference signal, and in response to performing the uplink transmission based on the control information, failing to send, by the communications apparatus, a signal on a time-frequency resource that is in the first time-frequency resource and that overlaps the time-frequency resource that is in the third time-frequency resource and that is useable to send the reference signal.

6. The transmission method according to claim 1, wherein the overlapping time-frequency resource comprises at least a portion of time-frequency resources that are in the third time-frequency resource and that are useable to send the reference signal; and correspondingly, in response to performing the uplink transmission based on the control information, the communications apparatus sends, on the overlapping time-frequency resource, the reference signal generated based on the configuration information of the second reference signal.

7. The transmission method according to claim 6, wherein the method further comprises:

in response to performing the uplink transmission based on the control information, failing to send, by the communications apparatus, a signal on a fifth time-frequency resource, wherein the fifth time-frequency resource is a time-frequency resource that is in the overlapping time-frequency resource and that fails to overlap the time-frequency resource that is in the third time-frequency resource and that is useable to send the reference signal.

8. The transmission method according to claim 6, wherein the method further comprises:

in response to performing the uplink transmission based on the control information, failing to send, by the communications apparatus, a signal on a sixth time-frequency resource in the first time-frequency resource, wherein the sixth time-frequency resource is a time-frequency resource that is in the first time-frequency resource and that fails to overlap the overlapping time-frequency resource and, the sixth time-frequency resource overlaps the time-frequency resource that is in the third time-frequency resource and that is useable to send the reference signal.

9. The transmission method according to claim 1, wherein in response to performing the uplink transmission based on the control information, the communications apparatus performs the uplink transmission on the overlapping time-frequency resource based on a configuration parameter numerology corresponding to the third time-frequency resource.

10. A communications apparatus, comprising:

an obtaining unit, configured to obtain control information useable for uplink transmission with dynamic scheduling, wherein the control information comprises information about a first time-frequency resource allocated to the uplink transmission and configuration information of a first reference signal useable for the uplink transmission;

a determining unit, configured to determine, based on the information about the first time-frequency resource allocated to the uplink transmission and the configuration information of the first reference signal useable for the uplink transmission, a second time-frequency resource useable to send the first reference signal;
the obtaining unit, further configured to obtain first information of a semi-statically configured resource useable for the uplink transmission, wherein the semi-statically configured resource comprises a time-frequency resource; and
a sending unit, configured to: in response to performing the uplink transmission based on the control information, send, on an overlapping time-frequency resource of the second time-frequency resource and a third time-frequency resource, a reference signal generated based on configuration information of a second reference signal or failing to send a signal, wherein the third time-frequency resource is a semi-statically configured time-frequency resource that is useable for the uplink transmission and that is determined by the communications apparatus based on the first information.

11. The communications apparatus according to claim 10, wherein the sending unit is further configured to send, on a fourth time-frequency resource in the second time-frequency resource, a reference signal generated based on the configuration information of the first reference signal, wherein an intersection set between a frequency resource of the fourth time-frequency resource and a frequency resource of the overlapping time-frequency resource is empty, and a union set of the frequency resource of the fourth time-frequency resource and the frequency resource of the overlapping time-frequency resource is a frequency resource of the second time-frequency resource.

12. The communications apparatus according to claim 10, wherein an intersection set between the overlapping time-frequency resource and a time-frequency resource that is in the third time-frequency resource and that is useable to send the reference signal is an empty set; and
correspondingly, the sending unit is further configured to:
in response to performing the uplink transmission based on the control information, fails to send a signal on the overlapping time-frequency resource.

13. The communications apparatus according to claim 12, wherein in response to skipping sending a semi-statically configured reference signal on the time-frequency resource that is in the third time-frequency resource and that is useable to send the reference signal, the sending unit is further configured to:
in response to performing the uplink transmission based on the control information, send, on a time-frequency resource that is in the first time-frequency resource and that overlaps the time-frequency resource that is in the third time-frequency resource and that is useable to send the reference signal, the reference signal generated based on the configuration information of the second reference signal,
wherein the semi-statically configured reference signal is the reference signal useable for third time-frequency resource transmission.

14. The communications apparatus according to claim 10, wherein in response to sending a semi-statically configured reference signal on the time-frequency resource that is in the third time-frequency resource and that is useable to send the reference signal, the sending unit is further configured to:
in response to performing the uplink transmission based on the control information, failing to send a signal on a time-frequency resource that is in the first time-frequency resource and that overlaps the time-frequency resource that is in the third time-frequency resource and that is useable to send the reference signal.

15. The communications apparatus according to claim 10, wherein the overlapping time-frequency resource comprises at least a portion of time-frequency resources that are in the third time-frequency resource and that are useable to send the reference signal; and
correspondingly, the sending unit is configured to: in response to performing the uplink transmission based on the control information, send, on the overlapping time-frequency resource, the reference signal generated based on the configuration information of the second reference signal.

16. The communications apparatus according to claim 15, wherein the sending unit is further configured to:
in response to performing the uplink transmission based on the control information, failing to send a signal on a fifth time-frequency resource, wherein the fifth time-frequency resource is a time-frequency resource that is in the overlapping time-frequency resource and that fails to overlap the time-frequency resource that is in the third time-frequency resource and that is useable to send the reference signal.

17. The communications apparatus according to claim 15, wherein the sending unit is further configured to:
in response to performing the uplink transmission based on the control information, failing to send a signal on a sixth time-frequency resource in the first time-frequency resource, wherein the sixth time-frequency resource is a time-frequency resource that is in the first time-frequency resource and that fails to overlap the overlapping time-frequency resource and, the sixth time-frequency resource overlaps the time-frequency resource that is in the third time-frequency resource and that is useable to send the reference signal.

18. The communications apparatus according to claim 10, wherein the sending unit is further configured to:
in response to performing the uplink transmission based on the control information, perform the uplink transmission on the overlapping time-frequency resource based on a configuration parameter numerology corresponding to the third time-frequency resource.

19. The communications apparatus according to claim 10, wherein the sending unit is configured to perform, based on a non-orthogonal transmission technology, the uplink transmission on an overlapping time-frequency resource of a time-frequency resource in the first time-frequency resource, other than the second time-frequency resource and a time-frequency resource in the third time-frequency resource, other than the time-frequency resource useable to send the reference signal.

20. A computer-readable storage medium, wherein the computer-readable storage medium stores an instruction, and in response to the instruction being executed by a processor, a method comprising:
obtaining control information useable for uplink transmission with dynamic scheduling, wherein the control information comprises information about a first time-frequency resource allocated to the uplink transmission and configuration information of a first reference signal useable for the uplink transmission;
determining, based on the information about the first time-frequency resource allocated to the uplink transmission and the configuration information of the first reference signal useable for the uplink transmission, a second time-frequency resource useable to send the first reference signal;
obtaining first information of a semi-statically configured resource useable for the uplink transmission, wherein the semi-statically configured resource comprises a time-frequency resource; and in response to performing the uplink transmission based on the control information, sending, on an overlapping time-frequency resource of the second time-frequency resource and a third time-frequency resource, a reference signal generated based on configuration information of a second reference signal or failing to send a signal, wherein the third time-frequency resource is a semi-statically configured time-frequency resource that is useable for the uplink transmission and that is determined by the communications apparatus based on the first information.

* * * * *

UNITED STATES PATENT AND TRADEMARK OFFICE
CERTIFICATE OF CORRECTION

PATENT NO. : 11,265,903 B2
APPLICATION NO. : 16/938587
DATED : March 1, 2022
INVENTOR(S) : ShuangShuang Xing et al.

Page 1 of 1

It is certified that error appears in the above-identified patent and that said Letters Patent is hereby corrected as shown below:

In the Specification

Column 19, Line 58 – Column 20, Line 5 replace with the following paragraph:
"Specifically, the network device may notify one or more communications apparatuses of information about M (M is an integer greater than or equal to 0) GF transmission resources in one or more GF transmission resources configured in a system. When a quantity of GF transmission resources allocated to a communications apparatus is 0, it indicates that no GF transmission resource may be allocated to the communications apparatus. Therefore, the communications apparatus may be unable to transmit a grant-free service on a GB transmission resource. Alternatively, when $M \geq 1$, the communications apparatus may determine, based on indication information corresponding to each GF transmission resource, whether the grant-free service can be transmitted on at least one GF transmission resource allocated to another communications apparatus."

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*